(12) United States Patent
Uddin et al.

(10) Patent No.: US 12,533,859 B2
(45) Date of Patent: *Jan. 27, 2026

(54) POSITIONING PROFILES FOR PULTRUSIONS IN COMPOSITE BUS BODY

(71) Applicant: TPI, Inc., Warren, RI (US)

(72) Inventors: Ahsan Uddin, Warwick, RI (US); John Perraut, Somerset, MA (US)

(73) Assignee: TPI, Inc., Warren, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/632,904

(22) Filed: Apr. 11, 2024

(65) Prior Publication Data
US 2024/0300194 A1    Sep. 12, 2024

Related U.S. Application Data

(63) Continuation of application No. 17/500,582, filed on Oct. 13, 2021, now Pat. No. 11,981,093.

(Continued)

(51) Int. Cl.
*B29C 70/52* (2006.01)
*B29K 105/04* (2006.01)
*B29L 31/30* (2006.01)

(52) U.S. Cl.
CPC ...... *B29C 70/525* (2013.01); *B29K 2105/043* (2013.01); *B29L 2031/30* (2013.01)

(58) Field of Classification Search
CPC ..... B29C 70/84; B29C 70/845; B29C 70/682; B29C 70/70; B29C 48/2883; B29C 48/15; B29C 48/154; B29C 48/155; B29C 48/156

See application file for complete search history.

(56) References Cited

U.S. PATENT DOCUMENTS 1,377,298 A    5/1921   Wheeler
3,088,166 A *  5/1963   Colombo .............. B29C 48/154
                                                  264/516

(Continued)

FOREIGN PATENT DOCUMENTS

JP      H09184187 A       7/1997
WO      WO-2012/020232 A2 2/2012
WO      WO-2022/081709 A1 4/2022

OTHER PUBLICATIONS

International Search Report and Written Opinion for International Application No. PCT/US21/54786 mailed Jan. 21, 2022.

(Continued)

*Primary Examiner* — Matthew J Daniels
(74) *Attorney, Agent, or Firm* — Stephen J. Kenny; Nicole A. Bustos-Pomerantz; Foley Hoag LLP

(57) ABSTRACT

A method of forming a composite vehicle components (e.g. walls, floor, roof) having interleaved foam core members and pre-pultruded reinforcing pillars by pultruding the cores and pillars into a vehicle component (e.g. bus sidewall formed as integral component front to rear) and cutting apertures therein for insertion of vehicle accessories (e.g. windows). Also, vehicle components can be formed having interlocking profiled edges where a first component is inserted into a second component, and rotated to bring the two components into locking engagement. A plurality of components can be formed with the same geometry, and oriented 180 degrees offset from each other to bring their profiled edges adjacent to each other.

20 Claims, 60 Drawing Sheets

Related U.S. Application Data

(60) Provisional application No. 63/163,487, filed on Mar. 19, 2021, provisional application No. 63/132,109, filed on Dec. 30, 2020, provisional application No. 63/091,112, filed on Oct. 13, 2020.

(56) References Cited

U.S. PATENT DOCUMENTS

| | | | | |
|---|---|---|---|---|
| 3,093,847 | A * | 6/1963 | Strecker | B63B 5/24 |
| | | | | 52/80.1 |
| 3,960,625 | A * | 6/1976 | Simpson | E04B 1/80 |
| | | | | 264/172.19 |
| 4,497,762 | A * | 2/1985 | Meister | B29C 48/34 |
| | | | | 425/114 |
| 5,152,481 | A | 10/1992 | Cote et al. | |
| 5,192,586 | A * | 3/1993 | Mertinooke | B29C 48/12 |
| | | | | 427/209 |
| 5,324,377 | A | 6/1994 | Davies | |
| 5,625,999 | A * | 5/1997 | Buzza | E04D 3/38 |
| | | | | 52/611 |
| 6,659,020 | B1 * | 12/2003 | Ball | B32B 5/18 |
| | | | | 108/57.28 |
| 6,895,881 | B1 * | 5/2005 | Whitaker | E04F 15/02011 |
| | | | | 52/592.1 |
| 9,302,709 | B1 | 4/2016 | Kumar et al. | |
| 10,266,303 | B1 | 4/2019 | Kownacki et al. | |
| 10,357,906 | B2 * | 7/2019 | Johnson, Sr. | B29C 48/12 |
| 11,981,093 | B2 | 5/2024 | Uddin et al. | |
| 2002/0172783 | A1 * | 11/2002 | Hawkins | B29C 70/70 |
| | | | | 428/34.1 |
| 2004/0062915 | A1 * | 4/2004 | Pabedinskas | B29C 48/11 |
| | | | | 428/188 |
| 2008/0313963 | A1 * | 12/2008 | Thorning | F24S 10/502 |
| | | | | 52/204.66 |
| 2010/0140980 | A1 | 6/2010 | Stanton | |
| 2014/0021747 | A1 | 1/2014 | Goettker et al. | |
| 2015/0110988 | A1 * | 4/2015 | Peavey | B29C 48/154 |
| | | | | 29/897 |
| 2016/0304131 | A1 | 10/2016 | Stanton | |
| 2017/0165927 | A1 | 6/2017 | Johnson et al. | |
| 2017/0240215 | A1 | 8/2017 | LaRose et al. | |
| 2022/0111607 | A1 | 4/2022 | Uddin et al. | |

OTHER PUBLICATIONS

Supplementary Partial European Search Report for EP Application No. 21888996.0 dated Oct. 7, 2024.
Supplementary European Search Report for EP Application No. 218880996.0 dated Jan. 13, 2025.

* cited by examiner

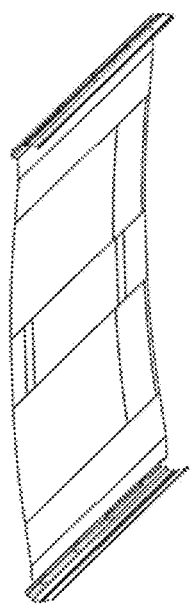
FIG. 2C
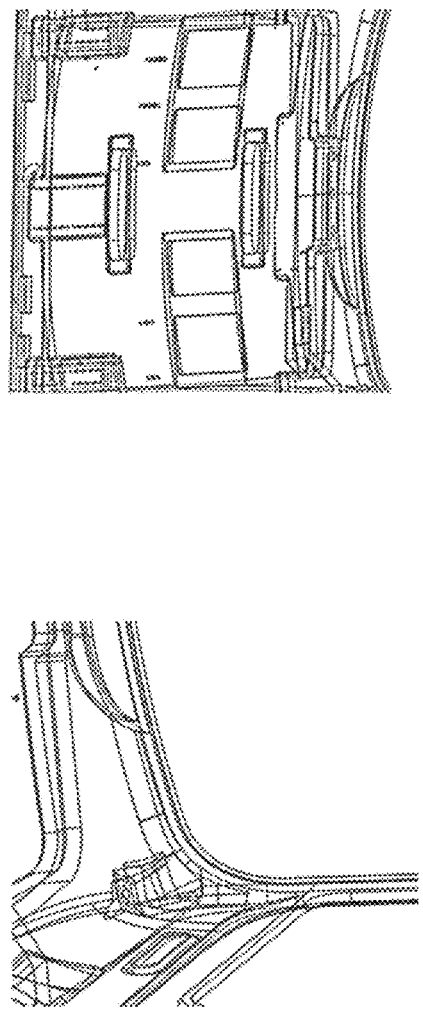
FIG. 2B
FIG. 2E
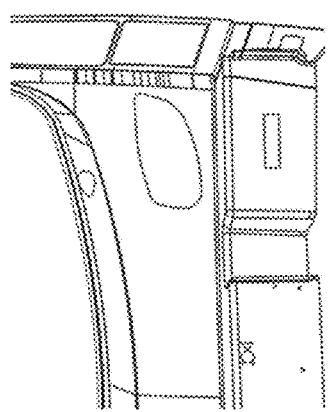
FIG. 2D
FIG. 2A

POSITIONING PROFILES FOR PULTRUSIONS IN COMPOSITE BUS BODY

CROSS-REFERENCE TO RELATED APPLICATIONS

This application is a Continuation of and claims the benefit of priority under 35 USC 120 to U.S. application Ser. No. 17/500,582 filed Oct. 13, 2021, which claims the benefit of priority under 35 USC 119 to U.S. Provisional Application No. 63/091,112, filed Oct. 13, 2020; U.S. Provisional Application No. 63/132,109, filed Dec. 30, 2020; and U.S. Provisional Application No. 63/163,487, filed Mar. 19, 2021, the entire contents of each are hereby incorporated by reference.

BACKGROUND OF THE DISCLOSED SUBJECT MATTER

Field of the Disclosed Subject Matter

The disclosed subject matter relates to a system, and corresponding method, of manufacturing large scale composite structures (e.g. automobiles, buses, tractor trailer, utility vehicles, etc.). These large scale composite structures are typically formed as multi-piece structures, with a plurality of discrete molds required for each separate piece, and require a complex vacuum assisted resin transfer mold (VARTM) fabrication process.

Particularly, the present disclosure provides vehicular structural elements which are formed via a pultrusion process(es) and configured with a profile having various features which facilitate both placement and assembly with additional components of the vehicle.

Additionally, the present disclosure provides pultruded vehicle components with a shaped side(s) that can be built with structural flat wall(s) having reinforcement beam(s) attached to shaped panels.

Additionally, the present disclosure includes adding targeted tailored reinforcement fiber in the skin of a structure, e.g., to enhance strength proximate openings such as windows, and reinforcement included in core and adjoining members.

Additionally, the present disclosure provides exemplary shaped sections with reinforced inserts, e.g. roof arch or other shaped sections, as well as the design, assembly and service (or repair) of a pultruded vehicle body.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method of forming a composite vehicle component comprising: pultruding a first vehicle component, the first vehicle component having a first profiled edge; pultruding a second vehicle component, the second vehicle component having a second profiled edge; inserting the second vehicle component within the first vehicle component; and rotating the second vehicle component with respect to the first vehicle component to bring the second profiled edge into locking engagement with the first profiled edge.

In accordance with another aspect of the disclosure, a method of forming a composite vehicle (e.g. bus) component comprises: pultruding a plurality of reinforcement structures, each reinforcement structure having opposing inner and outer surfaces defining a thickness therebetween; providing a plurality of core members, each core member having opposing inner and outer surfaces defining a thickness therebetween; and positioning a core member between adjacent reinforcement structures. A second pultruding process is performed to pultrude the reinforcement structures and core members together to apply an inner skin layer onto the inner layers of the reinforcement structures and core members, and an outer skin layer onto the outer layers of the reinforcement structures and core members. An opening is then formed in at least one of the inner skin layer and outer skin layer, and positioned between adjacent reinforcement structures.

In some embodiments, at least one reinforcement structure is disposed parallel to at least one core member, and/or at least one reinforcement structure is disposed perpendicular to at least one core member.

In some embodiments, at least one of the reinforcement structures is rectangular.

In some embodiments, the core member is foam.

In some embodiments, the vehicle component has a non-planar profile.

In some embodiments, the vehicle component has a curved profile.

In some embodiments, the vehicle component is a sidewall of a bus, formed as an integral component from a front of the bus to a rear of the bus.

In some embodiments, a window is installed within the opening between reinforcement structures.

In some embodiments, a tapping plate is disposed adjacent at least one of the inner and outer skin layers.

In some embodiments, the tapping plate is disposed within at least one core member.

In some embodiments, the tapping plate is disposed within at least one reinforcement structure.

In accordance with another aspect of the disclosure, a method of forming a composite vehicle component comprises: pultruding a plurality of reinforcement structures, each reinforcement structure having opposing inner and outer surfaces defining a thickness therebetween; providing a plurality of core members, each core member having opposing inner and outer surfaces defining a thickness therebetween; and positioning a core member between adjacent reinforcement structures. Next, an additional pultrusion operation is performed to pultrude a first set of reinforcement structures and core members together to form a first composite vehicle panel; and another pultrusion operation can be performed to pultrude a second set of reinforcement structures and core members together to form a second composite vehicle panel. A composite connector can be provided having a first pair of sidewalls defining a first channel and a second pair of sidewalls defining second channel, with the first composite panel inserted within the first channel of the connector; and the second composite panel inserted within the second channel of the connector.

In some embodiments, the first channel of the connector is oriented perpendicular to the second channel of the connector.

In some embodiments, forming the connector includes forming a third pair of sidewalls defining a third channel and a fourth pair of sidewalls defining a fourth channel; where each of the first, second, third and fourth channels of the connector are orthogonal to each other.

In some embodiments, at least the first composite panel is releasably coupled to the connector.

In some embodiments, an adhesive is dispensed through at least one aperture disposed within at least one of the sidewalls of the first channel.

In some embodiments, the first vehicle component is a sidewall and the second vehicle component is a floor of the vehicle.

In some embodiments, at least one of the first and second vehicle component has a curved profile.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 1A-C and 2A-2E depict various views of a conventional composite bus formed via VARTM, and the prerequisite molds, manufacturing method.

FIGS. 16-17a depict exemplary joint profiles for assembling various composite vehicle components, including a segmented wall, in accordance with an embodiment of the present disclosure.

FIGS. 17b-1 depict exemplary connector profiles for assembling various composite vehicle components, in accordance with an embodiment of the present disclosure.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for large structure construction. The disclosed subject matter is particularly suited for construction of composite vehicle structures.

Figure 1C:
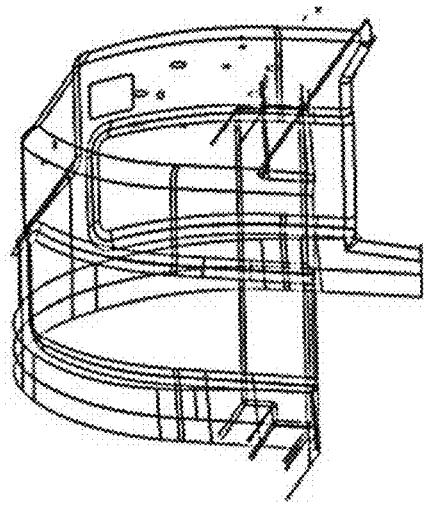
Figure 1B:
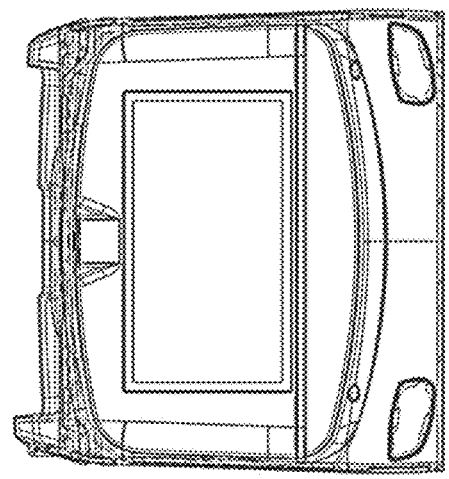
Figure 1A:
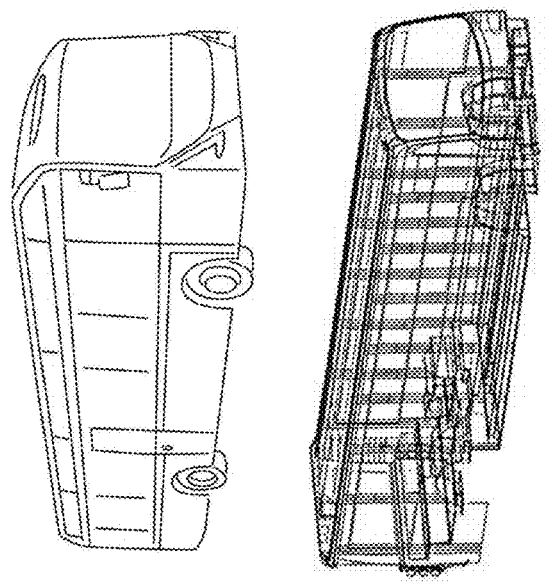

Conventional vehicle (e.g. bus as shown in FIGS. 1-2) composite structures are formed using a VARTM process, which is labor intensive requiring hand-placed layers and application of a resin which is prone to variation and reworking. Also, this conventional process employs tooling that can only control one side of the geometry of the part to be formed. The higher labor content to make, and rework, composite parts formed via VARTM technique result in undesired complexity, cost and excess cycle time.

Accordingly, the present disclosure provides an alternative technique for forming composite vehicle components using pultruded profiles, interlocking joints and incorporating features which provide for a more efficient assembly process and superior finished structure.

For purpose of explanation and illustration, and not limitation, exemplary embodiments of the system in accordance with the disclosed subject matter is shown in FIGS. 3-19. Similar reference numerals (differentiated by the leading numeral) may be provided among the various views and Figures presented herein to denote functionally corresponding, but not necessarily identical structures.

The present disclosure provides for continuously pultruding composite fibers for manufacturing vehicle components (e.g. body panels, weight-bearing frame components, etc.) and includes one or more sources of a fibrous material. Each source of the fibrous materials can be configured as a spool having the fibrous material wound thereon. The fibrous materials can be either a plurality of strands of the same material, or a plurality of strands of different materials. For example, aramid fibrous material can be used to provide impact resistance and high tensile strength. Graphite fibrous material can be used to provide high stiffness. Glass fibrous material can be used as a general filler. The selection of the specific materials will vary with the specific application for the vehicle component to be manufactured.

A resin material can be applied to the fibrous materials by passing the fibers through a resin bath to cause them to adhere to each other. However, other known structures may be used to apply the resin thereto. Following the application of the resin, the fibrous materials are then pulled through a die. The die is formed having an opening therethrough which corresponds in shape to the desired cross sectional shape of the vehicle component to be manufactured. As the fibrous materials are pulled through the die, they conform to the shape of the opening formed therethrough. Because of the resin applied thereto, the fibrous materials adhere to one another to form a pultrusion which retains the shape of the opening formed through the die. The formed pultrusion can then be pulled through a curing oven to heat the resin to a predetermined curing temperature, causing it to harden a rigid condition. As a result, the pultrusion as a whole acquires a desired rigidity.

A pulling device can be employed for drawing the fibrous materials through the adhesive bath and the die to form the pultrusion. Following passage through the pulling device, the pultrusion can be cut to desired lengths by a conventional cutting machine. Additionally, openings of desired sizes and shapes may be formed in the pultrusion by a convention perforation machine. As described in further detail below, the present disclosure includes performing a first pultrusion step/process to form a first component, which can then be rotated, e.g., up to 90°, and then performing a second pultrusion step/process which combines the first (pultruded) component into a pultruded subassembly with another material/component.

In some embodiments, the pultrusion can be formed with a generally solid and uniform cross sectional shape. However, the pultrusion can be formed in any desired cross sectional shape, including cylindrical, square, and oval. Furthermore, it is not necessary that the pultrusion be formed having a closed cross sectional shape. For example, the pultrusion may be formed C-shaped or I-shaped in cross section; as well as hollow and rectangular in cross sectional shape, with uniform thickness side walls. While the exemplary embodiments disclosed herein illustrate bus components (e.g. floor, sidewall, and roof) structures, the apparatus and method of this invention may be practiced so as to manufacture any other vehicle frame component.

In accordance with an aspect of the disclosure, the composite vehicle structures can be formed with a plurality of pultruded parts, where each part is formed with a similar or identical pultruded profile, and rotated (e.g. 180 degrees) such that the profile of a first part forms a complimentary union with the same profile of the second part.

Figure 3:
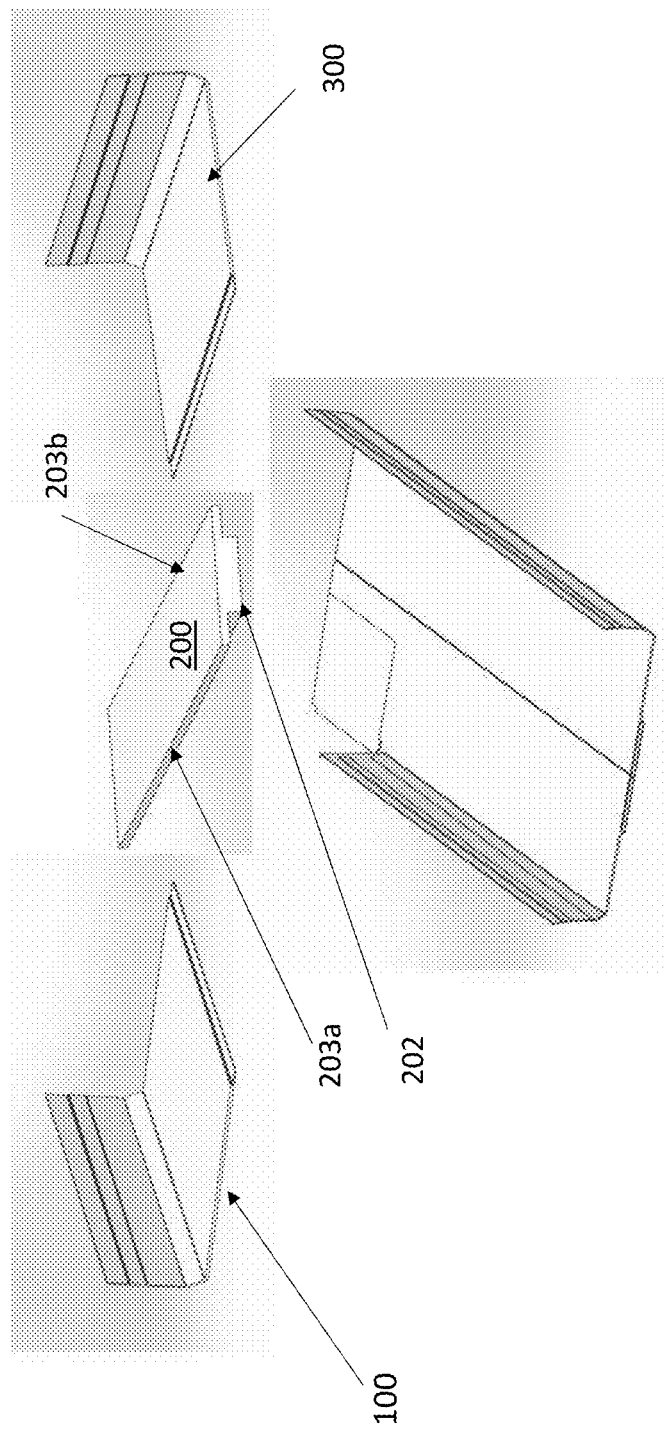
FIG. 3 depicts an exemplary composite vehicle component, a floor pultrusion profile (e.g. mirror driver side and passenger side profiles, with adjoining mid portion), formed in accordance with an embodiment of the present disclosure.

In the exemplary embodiment shown in FIG. 3, a protrusion profile of a plurality of components forming a vehicle (e.g. bus) floor are illustrated. Each of the left 100 and right 300 (or "Driver" and "Passenger" if using the vehicle frame of reference) can be pultruded, as separate components, having similar (but opposing due to the 180° relative rotation) profiles, as shown. The component can have a bottom section and upwardly extending sidewall, formed as a single integral piece. Additionally, a center section 200 can be formed with a generally T-shaped profile where the downwardly extending stem 202 is formed with a greater thickness than the upper and lateral sides 203a,b. The interior edges of the left 100 and right 300 pultruded sections can be joined in an overlapping/interlocking manner along their inner edges, with the center section 200 placed in an overlapping manner with "wings" 203a,b, extending across the inner edges of the left 100 and right 200 sections. In some embodiments, the union of these three components forms a contiguous planar upper surface, as shown.

Figure 4:
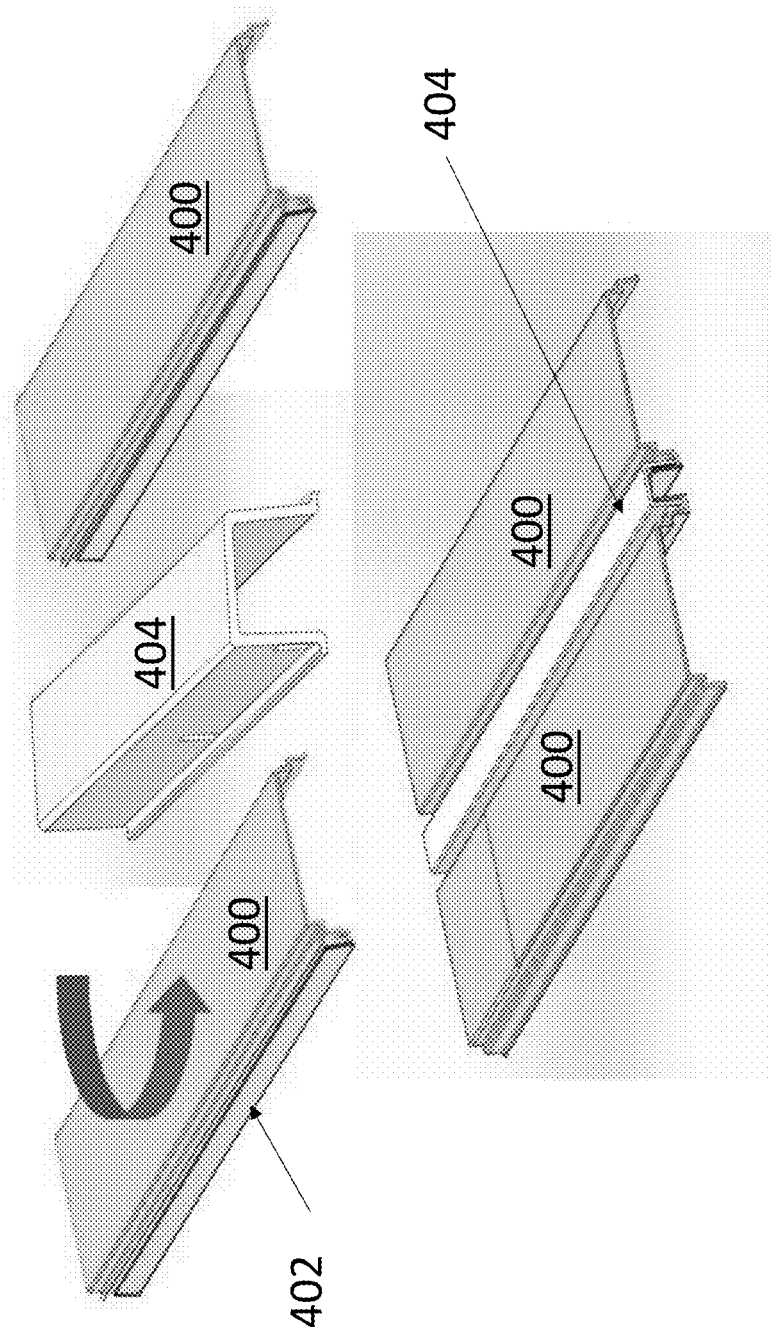
FIG. 4 depicts an exemplary composite vehicle component, a universal battery section pultrusion profile, formed in accordance with an embodiment of the present disclosure.

In another exemplary embodiment shown in FIG. 4, a battery enclosure section can be pultruded where the left and right sides 400 of the battery section have the same profile (i.e. are the same protruded part, but with one rotated 180° relative to the other). An intermediate member 404 can be positioned between the left and right sections 400 and serve as a structural reinforcing member which enhances rigidity of the battery enclosure. Each side 400 can be formed with downwardly extending sidewalls, with the inner sidewall also including a flange and an upwardly extending return sidewall to form a receiving channel. This receiving channel 402 can matingly receive a complimentary flange from the intermediate member 404. In some embodiments, the flange of the intermediate member can be slid longitudinally into the channel 402 to secure the components together.

Figure 5:
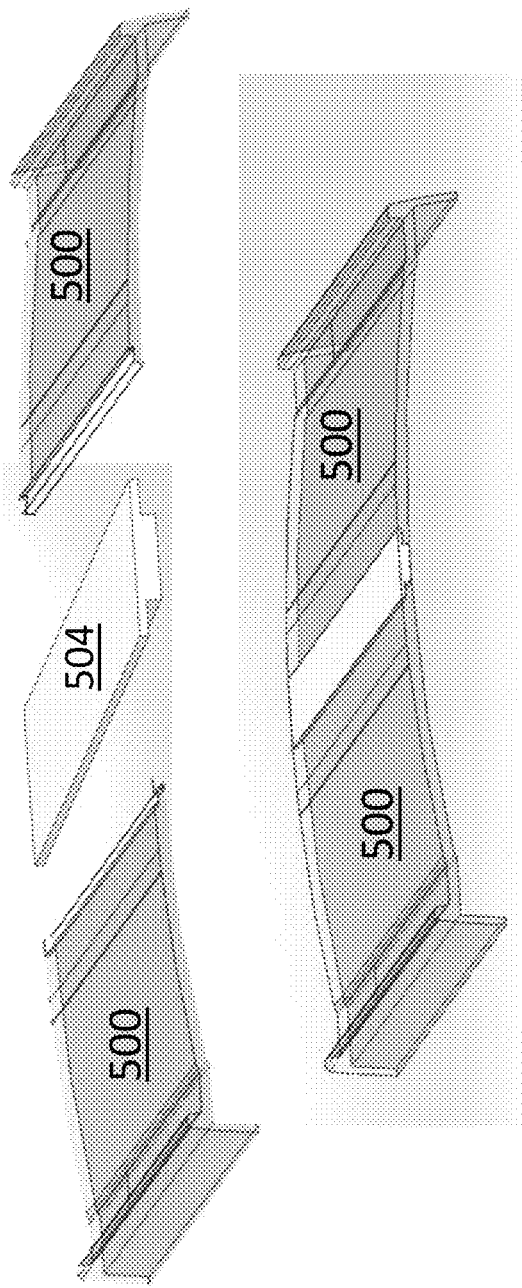
FIG. 5 depicts an exemplary composite vehicle component, a roof pultrusion profile (e.g. mirror driver side and passenger side profiles, with adjoining mid portion), formed in accordance with an embodiment of the present disclosure.

In the embodiment shown in FIG. 5, a section of a roof of the vehicle is shown with the same pultruded component 500 forming both left and right sides—with the right side being rotated 180 degrees to be in an opposing relationship to the left side. Again, an intermediate member 504 can be positioned between the left and right sections 500 and serve as a structural reinforcing member which enhances rigidity of the roof. The roof intermediate member 504 can be formed in a similar manner as the center section 200 in the flooring example described above with respect to FIG. 3.

Figure 6:
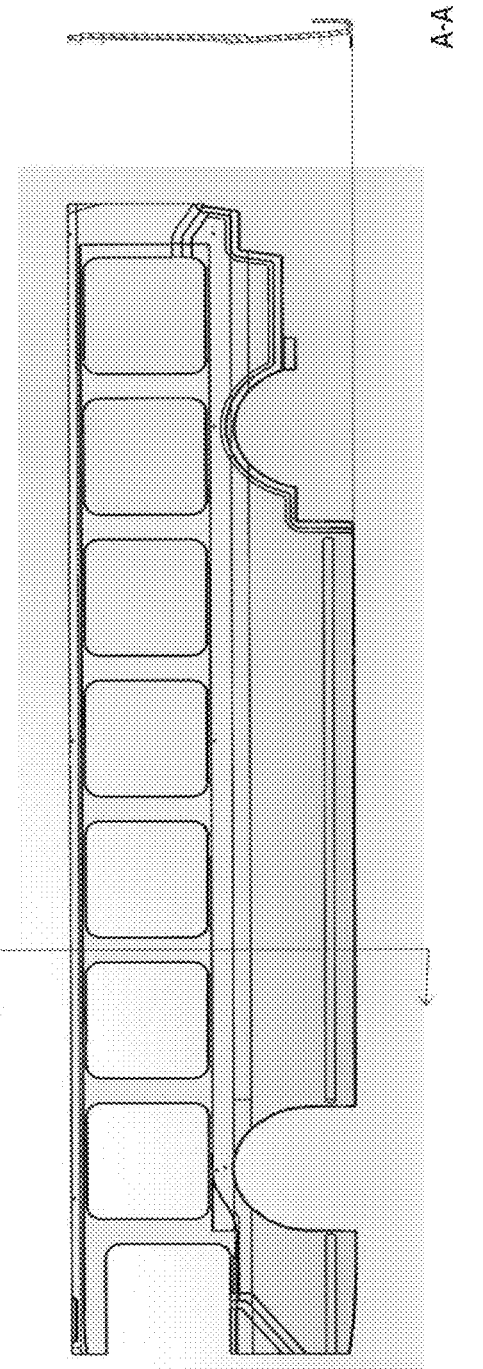
FIG. 6 depicts an exemplary composite vehicle component, a unitary bus sidewall pultrusion profile, with machine-cut openings (e.g. window frames and wheel wells) formed in accordance with an embodiment of the present disclosure.
Figure 7:
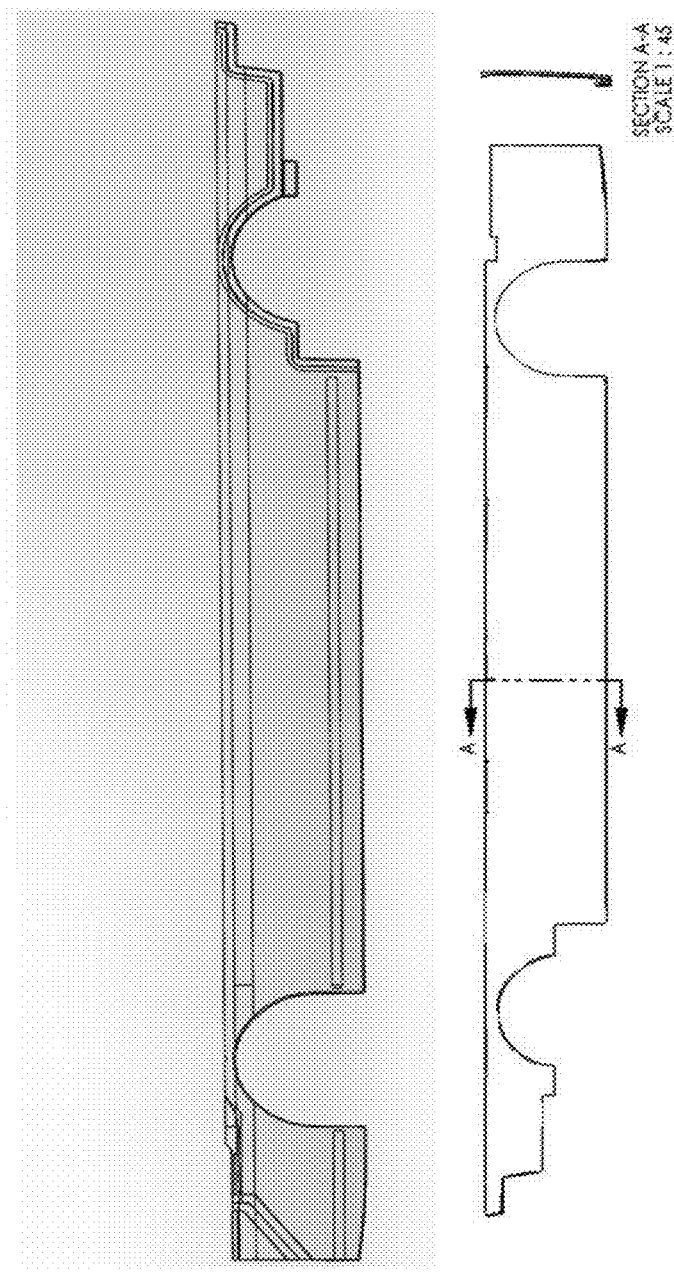
FIG. 7 depicts an exemplary composite vehicle component, a bus sidewall section pultrusion profile having multiple pieces, formed in accordance with an embodiment of the present disclosure.

The vehicle components disclosed herein can be pultruded having such a length as to extend longitudinally throughout the length of the vehicle in which it is to be used. For example, the single/integral pultrusion can extend from a location proximal to the front wheel well (e.g. where a front bumper/windshield is located) to a point distal of the rear wheel well (e.g. where a rear bumper is located). As shown in FIG. 6, the entire side wall can be pultruded as a single integral piece, and the windows machined (e.g. cut with a CNC machine) out of the pultruded sidewall. Alternatively, the vehicle can be divided into zones (e.g. lower or below the window, window frame, pillar, upper or above the window frame, etc.) with the components pultruded to form only individual sections for that particular zone. For example, each of the sides may be formed from as individual sections that are joined together in a manner described further below. As shown in FIG. 7, a lower sidewall section is shown (i.e. below the window frame) as a unitary pultruded part which can be joined to a separate, upper (and/or window frame) pultruded part. Each part can be formed with an edge profile that matingly engages the edge profile of the adjacent part, e.g., as shown throughout the accompanying figures.

Figure 8:
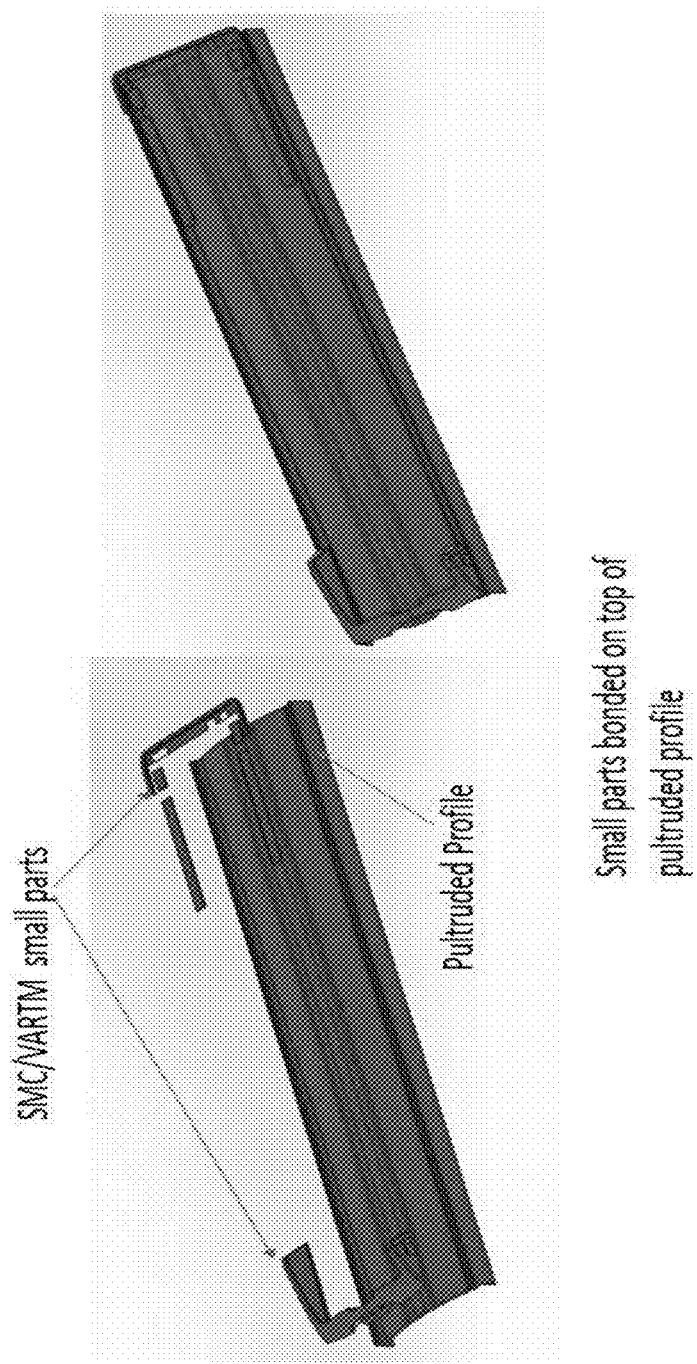
FIG. 8 depicts an exemplary composite vehicle component formed with a pultrusion profile including some VARTM-formed components bonded thereto, in accordance with an embodiment of the present disclosure.

In some embodiments, additional vehicle components, formed via alternative techniques (e.g. SMC/VARTM), can be attached to the profile of the pultruded parts disclosed herein, as shown in FIG. 8.

Connection of Pultruded Components

In accordance with another aspect of the disclosure, the pultruded components disclosed herein can be formed with a profile, or edge(s), which provides for a unique and efficient joining of the respective components. Thus, the structure of the pultruded parts themselves provide for a mating or interlocking engagement—and do not need to rely on adhesives to form a union (though adhesives can be employed in some embodiments). In other words, the parts are pultruded with a specific profile to provide a mechanical union rather than a purely chemical union from adhesives; with the absence of adhesive shortening manufacture cycle/cure time and complexity.

Figures 9A, 9B, 9C:
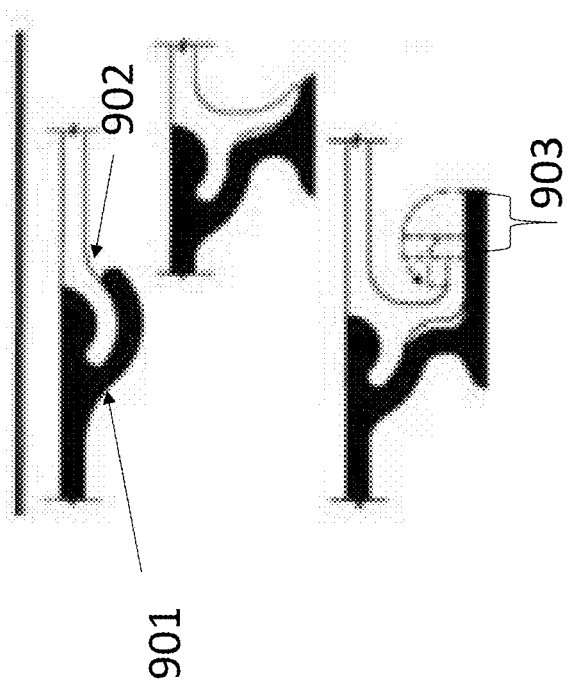
FIGS. 9A-9C and 10-12 depict exemplary joint profiles for assembling various composite vehicle components, including interlocking, nesting, snap-fit and combinations thereof, in accordance with an embodiment of the present disclosure.

An exemplary profile for interlocking of pultruded parts is shown in FIG. 9A with a first component shown in solid black coloring, and a second component shown in white coloring for aid in illustrating the cross sections of the two components. As shown, the first component 901 can be formed with a profile having entirely arcuate surface features for matingly receiving a complimentary profile of the second component 902. As shown the profile of the first component can overlap the second component on two sides (i.e. upper and lower as shown) to increase the surface area and frictional forces forming the union between the two parts.

In the exemplary embodiment shown in FIG. 9B, the first component 901 has a portion 903 which extends beyond the edge of component 902, with this extension 903 being bent or rotated to lockingly engage the flange of the second component 902 (as shown in phantom).

In the exemplary embodiment of FIG. 9C, the first component includes an ankle portion 905 and foot portion 907 that extend downward and laterally to engage a complimentary shaped flange of the second member 902. Additionally or alternatively, the first component 901 can have upwardly extending tongs 909 which engage sidewalls of the second component 902, as shown. The tongs 909 can be positioned laterally inward from the outer sidewalls of the second member 902.

In each of these exemplary embodiments, the two components 901, 902 can be brought into engagement by aligning the interlocking profiles so that the first component 901 can be inserted into the second component (e.g. translated along the z-axis as shown).

Figure 10:
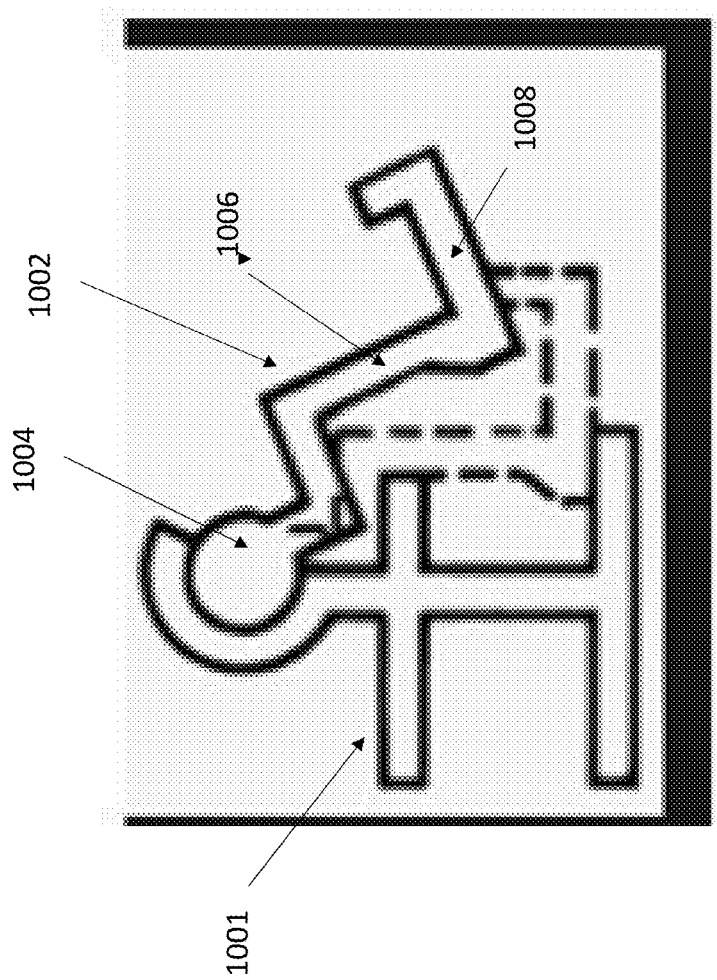

FIG. 10 depicts another exemplary embodiment of an interlocking profiles of first 1001 and second 1002 pultruded components. Here, the second component includes a bulbous member 1004 placed within a cavity of the first component. The second member 1002 can then be rotated or pivot downward to bring the ankle 1006 and foot 1008 portions into abutting and interlocking engagement with complimentary structures on the first component 1001, as shown in phantom.

Figure 11:
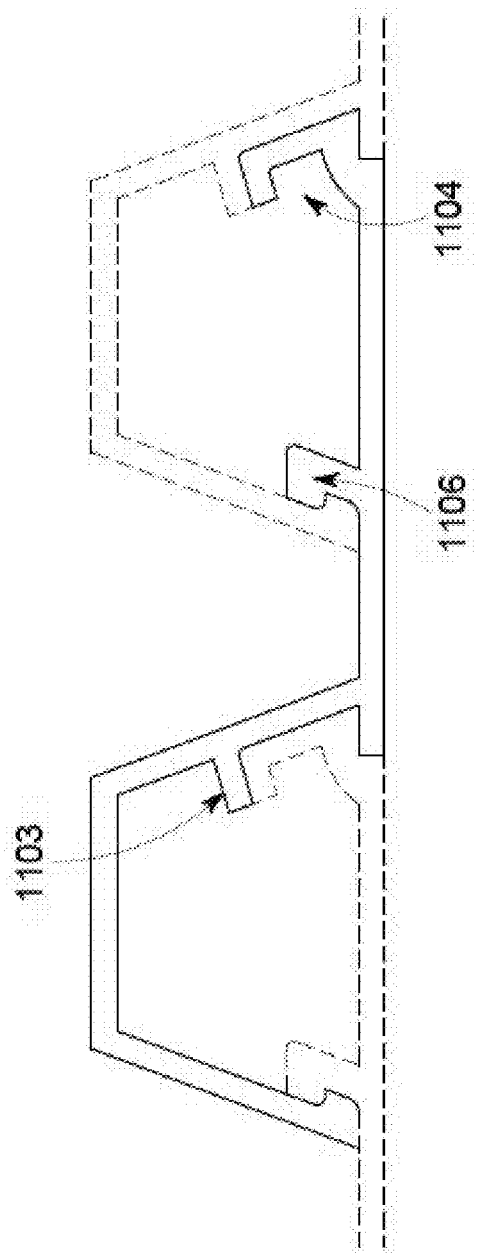

FIG. 11 depicts another exemplary embodiment of an interlocking profile of first 1101 (solid line) and second 1102 (phantom line) pultruded parts. The trapezoidal shape can have a protrusions 1103 on the upwardly extending sidewall to engage an L-shaped leg 1104 of the second part. Additionally, an upwardly extending leg 1106 of the second part can be formed with a faceted edge that engages a similarly contoured facet of the first component.

Figure 12:
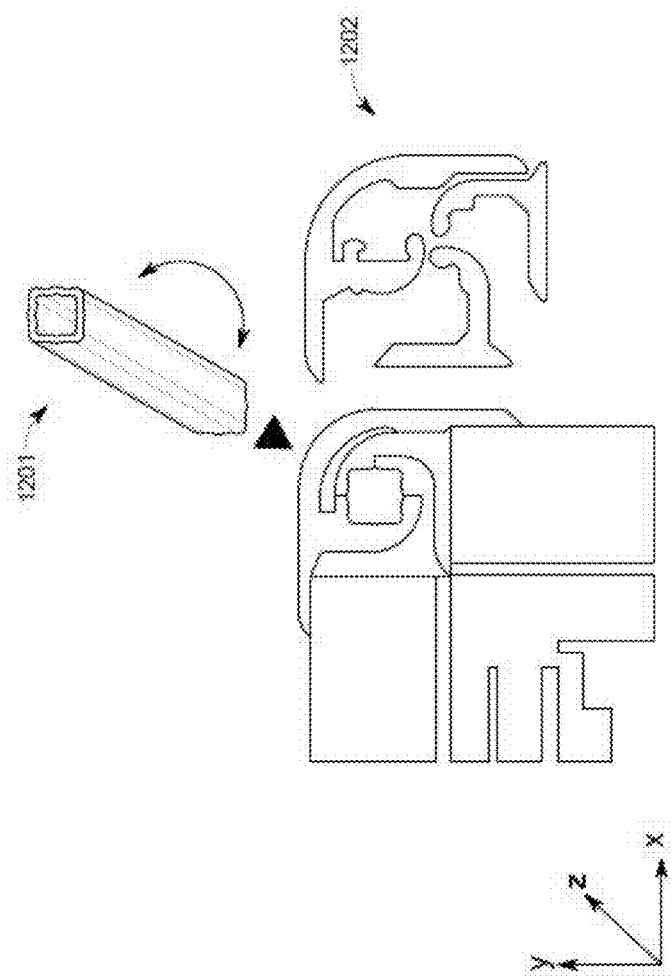

FIG. 12 depicts another exemplary embodiment of an interlocking profile of first 1201 and second 1202 pultruded parts. Here the first part 1201 is formed as an elongated member which is inserted longitudinally (along the z-axis) into the second part 1202, and brought into a locked engagement with the second part by rotating the first part 1201 (about the z-axis). Accordingly, the profiles of the pultruded parts shown in FIGS. 9-12 provide interlocking, nesting, snap fit (and combinations thereof) types of union between pultruded parts.

Figure 13:
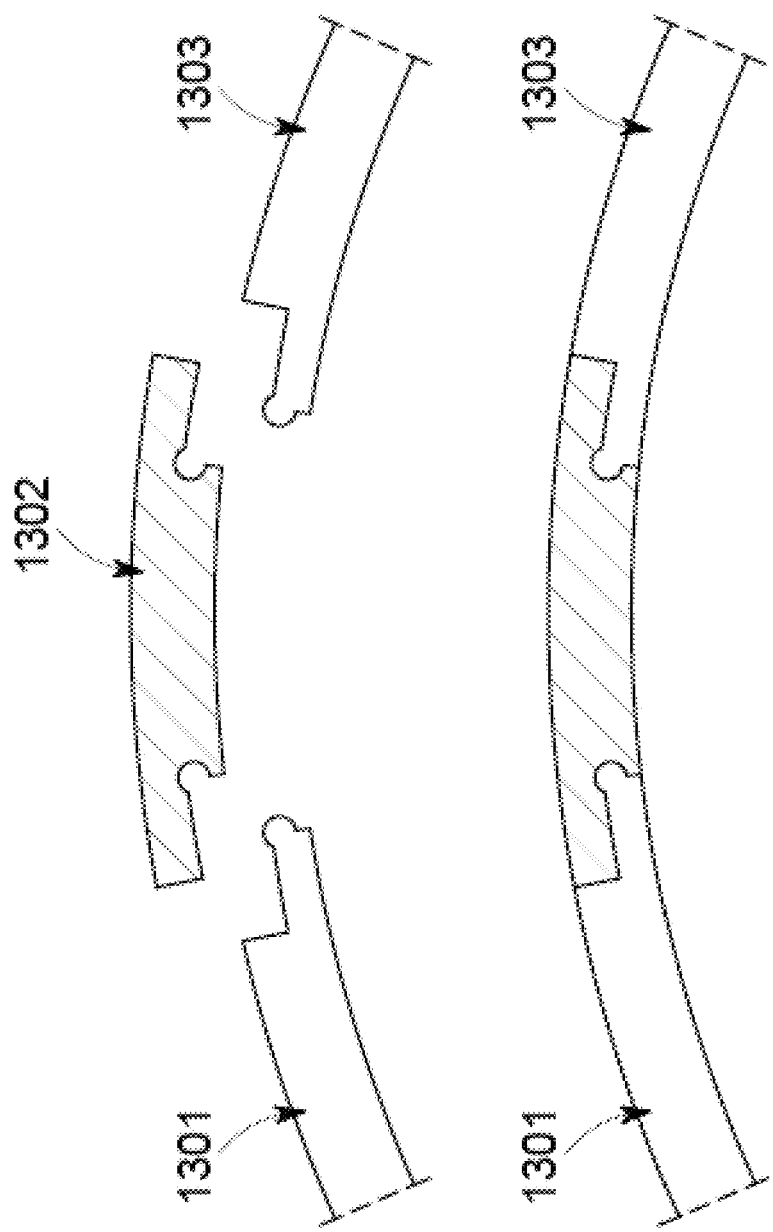
FIG. 13 depicts an exemplary joint profile for assembling various composite vehicle components, including a lap and rotational pultrusion joint, in accordance with an embodiment of the present disclosure.

FIG. 13 depicts another exemplary embodiment of an interlocking profile of a lap and rotational pultrusion joint, applied to a roof portion of a vehicle. The two side members 1301 and 1303 have the same geometry and profile, albeit rotated 180 degrees with respect to each other. Intermediate member 1302 matingly interlocks all three components together. The male interlocking feature (e.g. tongue) of side members 1301, 1303 can be inserted within the female interlocking feature (e.g. groove) of the intermediate member 1302 and slid longitudinally (e.g. along the z-axis). Once fully inserted, the side members 1301, 1302 can be rotated to bring the male interlocking feature in mating engagement with the female interlocking feature to join the component parts.

Figure 14B:
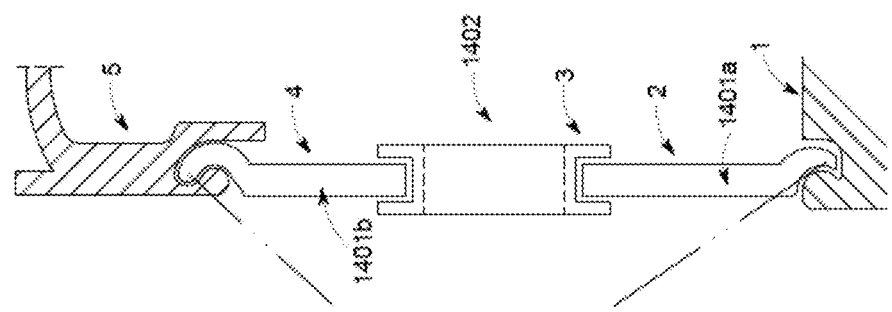
FIGS. 14A-B depict an exemplary joint profile for assembling various composite vehicle side components (e.g. union of roof, sidewall and floor panels) in accordance with an embodiment of the present disclosure.
Figure 14A:
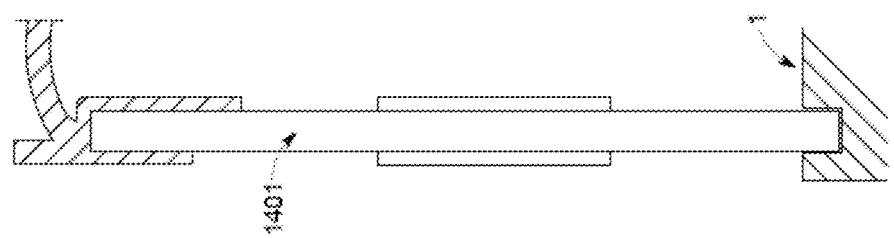

FIGS. 14A-B depict another exemplary embodiment of an interlocking profile of a pultrusion joint, applied to a side portion of a vehicle. In FIG. 14A the side panel 1401 is formed as a single piece extending from the roof to the floor section (1). Alternatively, in FIG. 14B, the side panel is formed from multiple pultruded components (1-6): with component 1401a coupled to the floor and 1401b coupled to the roof. Side panels 1401a,b can be formed with profiles that form an interlocking union with adjacent components upon rotation (with initial orientation of insertion shown in dashed line) of the panels 1401a,b. For example, the interlocking profile of the panels 1401a,b can be formed as an arcuate (e.g. C-shaped) edge. This edge is positioned within a complimentary channel of the adjacent part (e.g. floor 1 and roof 5) to which the panel is to be joined while the panel 1401a,b is oriented at an angle (i.e. not vertical). Then each panel is rotated into the vertical position shown in FIG. 14B, with the arcuate edge lockingly engaging the channel of the adjacent part (e.g. thee floor and roof sections, respectively). Also, an intermediary member (e.g. window frame) 1402 can be positioned between the upper and lower side panels 1401a,b. The dashed lines shown on component 1402 indicate an access point in the event the window needs to be serviced/repaired, the composite panel 1402 can be cut along these lines so the window can be readily removed.

Figure 15:
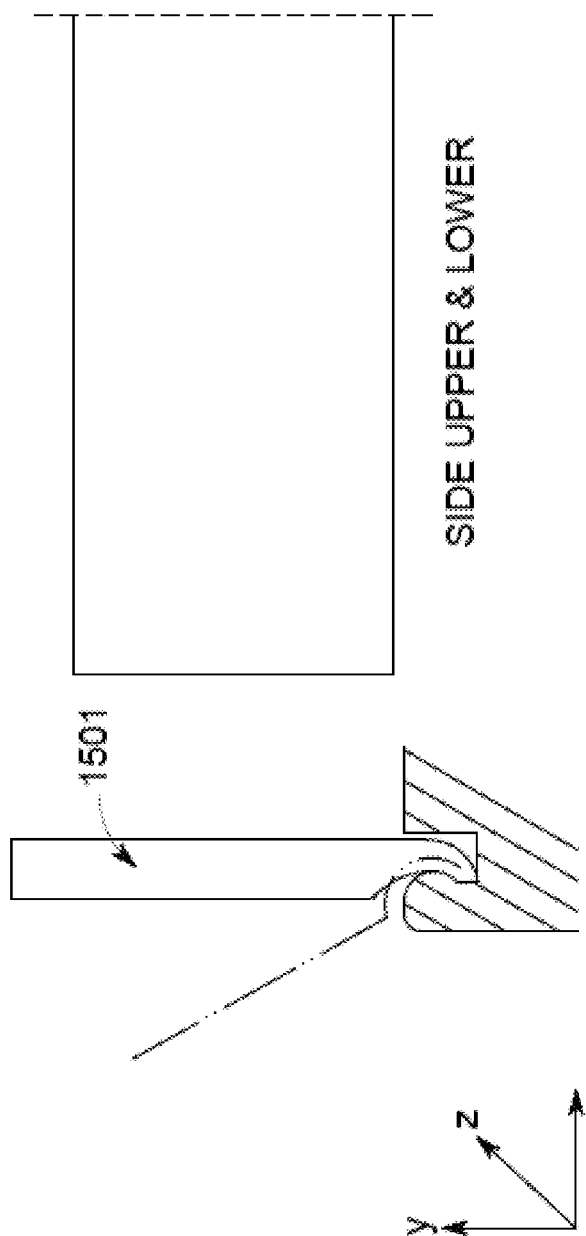
FIG. 15 depicts an exemplary joint profile for assembling various composite vehicle components (e.g. vehicle side panel), in accordance with an embodiment of the present disclosure.

FIG. 15 depicts another exemplary embodiment of an interlocking profile of a pultrusion joint, applied to a roof, upper side, lower side or interior shelf of a vehicle. Here the pultruded part 1501 has its male-profiled edge inserted within a female profile of the adjacent part to which it is to be joined, with the pultruded part 1501 positioned at an angle (i.e. not coplanar) with the adjacent part (as shown in phantom). Once the pultruded part 1501 is slid along the z-axis to be fully inserted within the adjacent part, pultruded part 1501 is rotated about the y-axis to bring the male-profiled edge into locking engagement with the female profile edge of the adjacent part.

Figure 16:
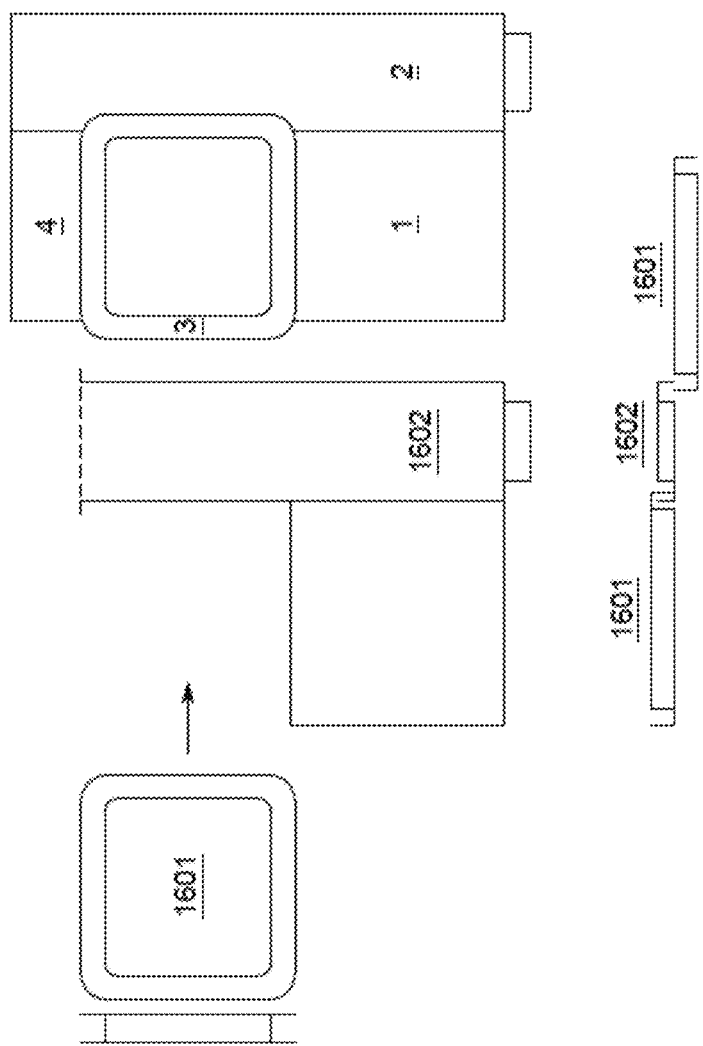

FIGS. 16-17 depict another exemplary embodiment of an interlocking profile of a segmented side wall of a vehicle. Here commonly shaped pultruded parts 1601 are formed with profiled edges that interlock with intermediate pultruded part 1602. As previously described, pultruded parts 1601 have the same profile, but are rotated 180 degrees to each other before joining intermediate part 1602, as shown at the bottom of the figure. In some embodiments, four different pultruded parts (1-4) can be coupled together to form wall panel having a window frame 3, with a single wall panel 2 having a male connector extending downwardly therefrom for insertion into a female connector of the floor component (not shown). In the exemplary embodiment shown in FIG. 17*a*, adjacent wall panels can include window frames therein, and be coupled together with complimentary male/female interlocking grooves on their adjacent edges.

Figure 17A:
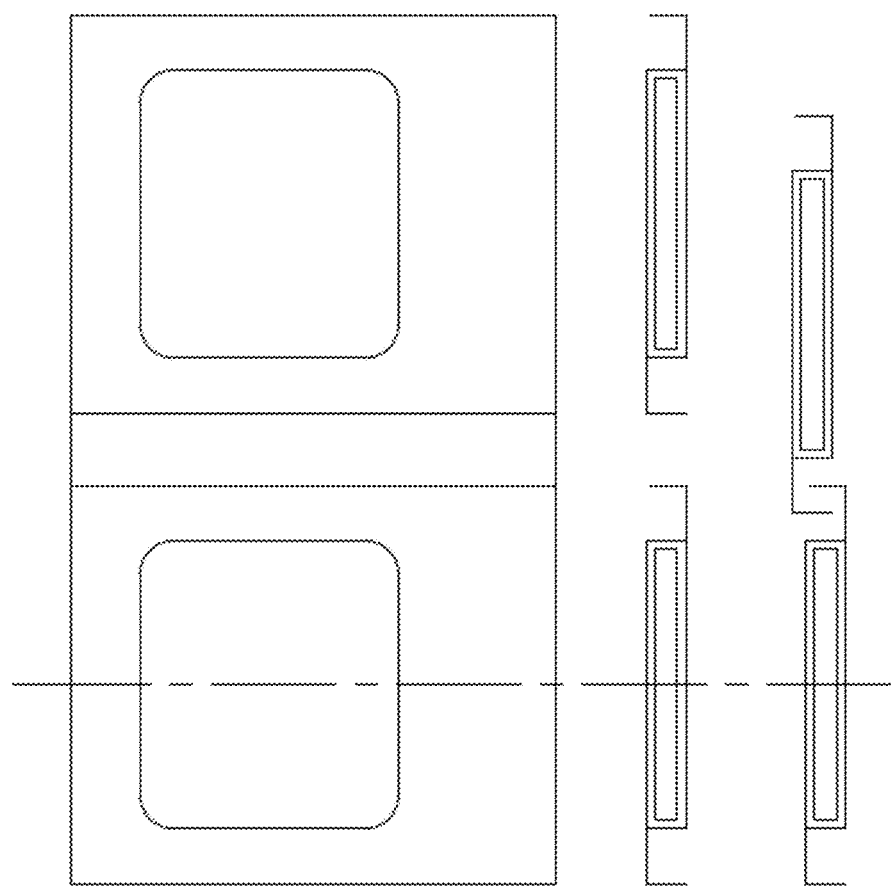
Figure 17D:
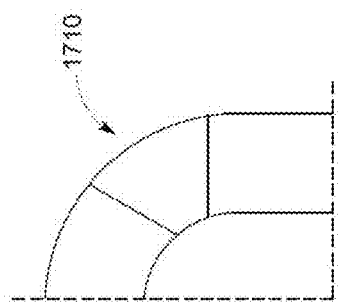
Figure 17E:
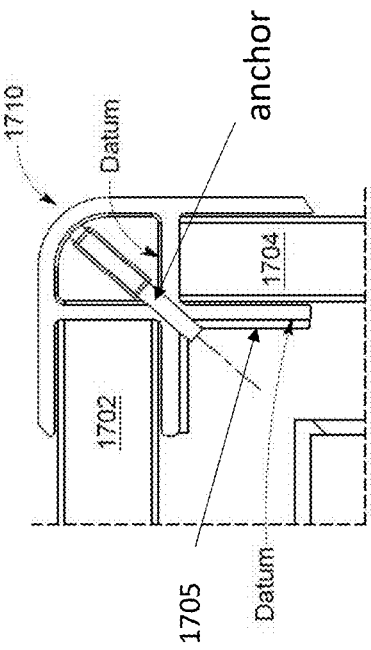
Figure 17B:
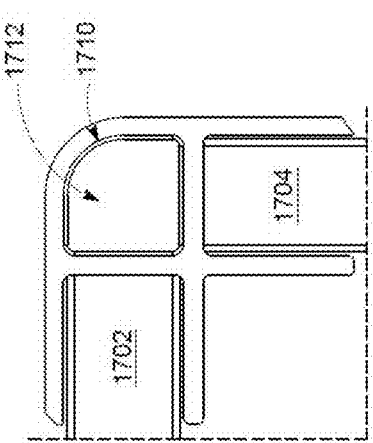
Figure 17C:
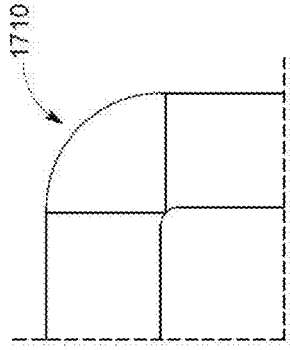

Additional connection configurations for joining two or more pultruded (and/or foam) panels are depicted in FIGS. 17*b-k*. FIG. 17*b* depicts an exemplary connection element for joining two perpendicular panels 1702, 1704 by receiving a portion of each these panels within the corner connector 1710. The corner connector 1710 can have extending sidewalls which overlap/abut the exterior, and interior, walls of the inserted panels 1702, 1704. Additionally, the corner connector 1710 can include a closed cell 1712 between the panels 1702, 1704. The cell 1712 can be hollow and configured to serve as a conduit to pass cables, wires, plumbing, etc. throughout the vehicle, and/or serve as a drainage/gutter. The embodiment shown in FIG. 17*b* has corner connector 1710 with a chamfered edge (i.e. continuous radius of curvature relative to focal point in the middle of the cell 1712), while FIG. 17*c-d* depict an alternative, smaller, radius of curvature. Additionally, the corner connector 1710 can be formed with a planar/faceted edge. In some embodiments, these corner connectors 1710 can be flexible (e.g. made of rubber) to allow for relative motion between the connected panels while maintaining the union.

Figure 17G:
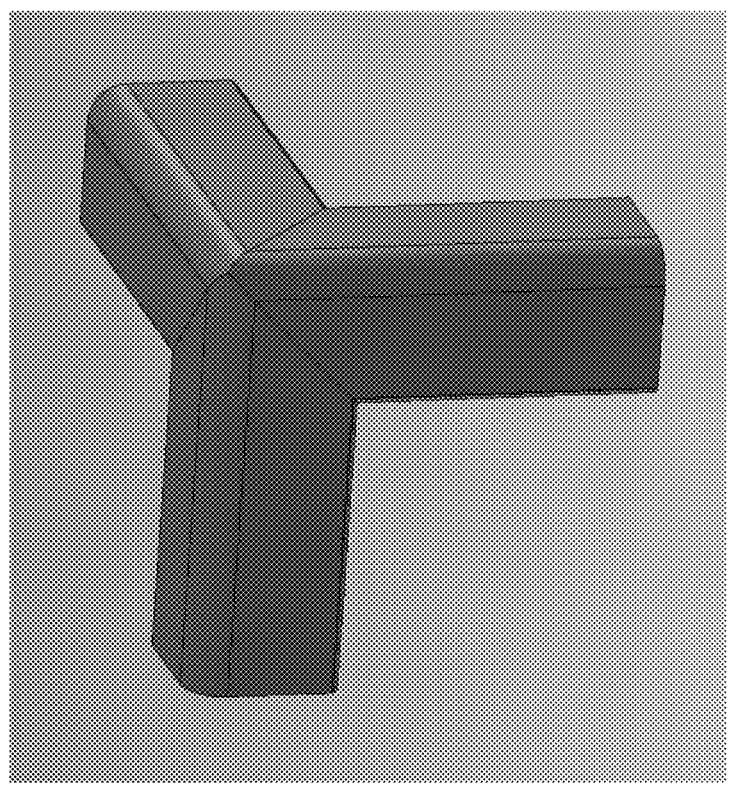
Figure 17F:
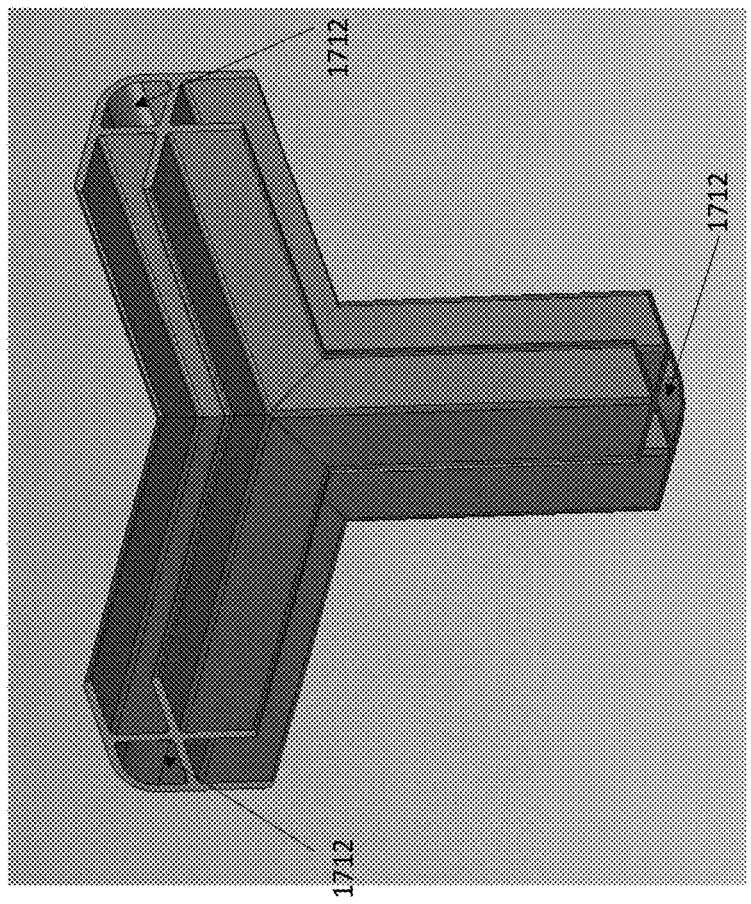

A benefit of the corner connector 1710 disclosed herein is that the datum, or reference point/plane, of the panels can be located at an external surface, as shown in FIG. 17*e*, which allows for enhanced precision and control as compared to datum points on interior surfaces of the panels 1702, 1704 themselves. Another benefit of this embodiment is the anchor can be spring loaded to provide a force (e.g. oriented along the dashed line shown) which holds the connector 1710 in fixed position with respect to one (or both) panels 1702, 1704. This facilitates assembly of the pultrude panels in that a connector can be coupled to a first panel and hold that panel in a fixed orientation (e.g. upright) while the second panel is inserted. In the embodiment shown in FIGS. 17*e* and 17*l*, a plurality of datum points are identified (both interior and exterior of sides of panels 1702, 1704) to maximize the precision in placement of the connector. A fastening plate 1705 is positioned on an interior corner of the connector 1710 and panels 1702, 1704 with a fastener anchored to the plate and placing a tensile force, e.g. pulling the connector 1710 diagonally inwardly along the axis shown. Additional examples of a corner connector are shown in FIGS. 17*f-g*, where the connector can extend along three edges of the panels to be joined, thereby increasing surface area contact and thus strengthening the bond.

Figure 17I:
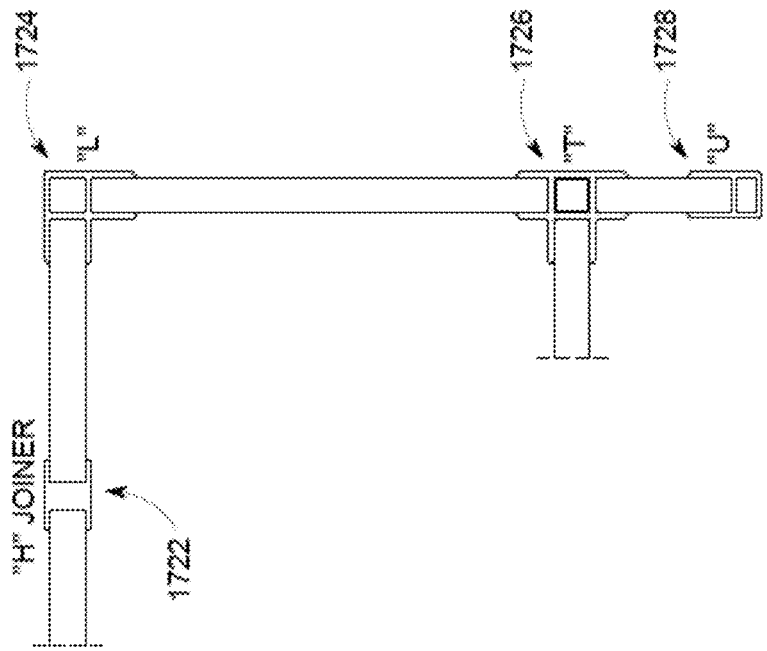
Figure 17H:
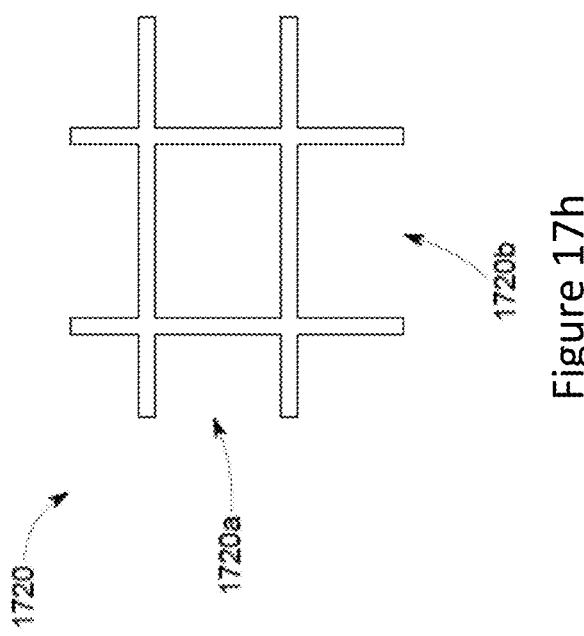
Figure 17J:
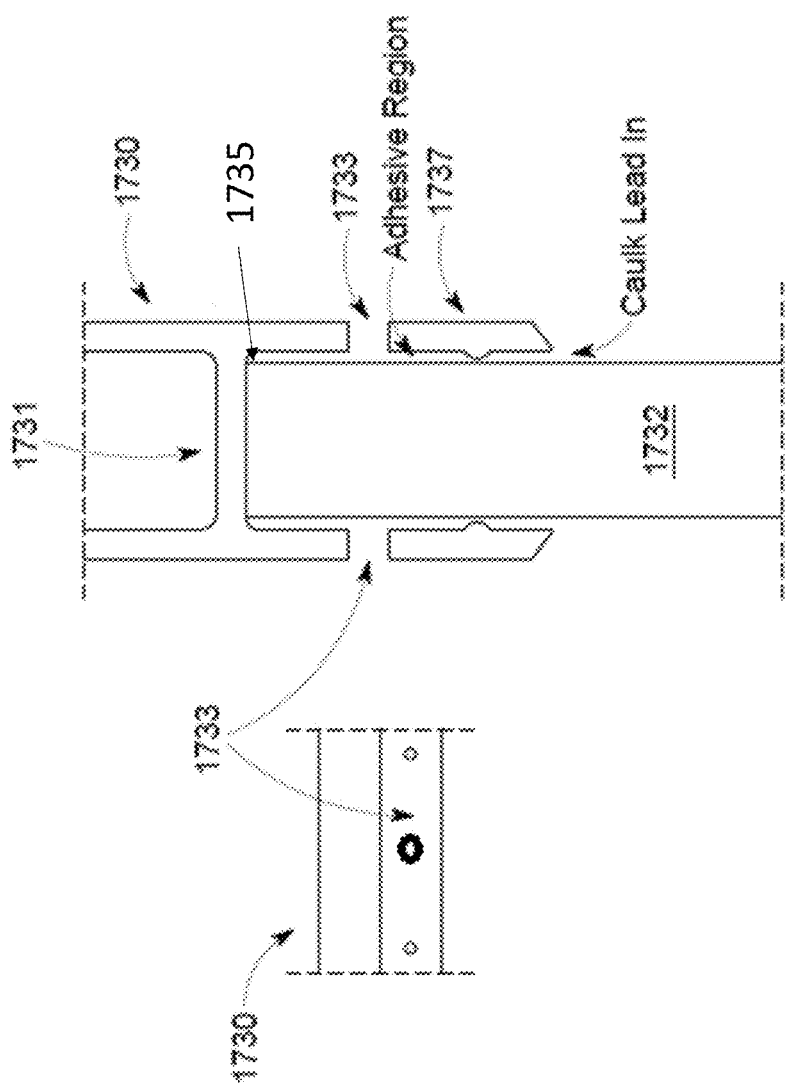
Figure 17K:
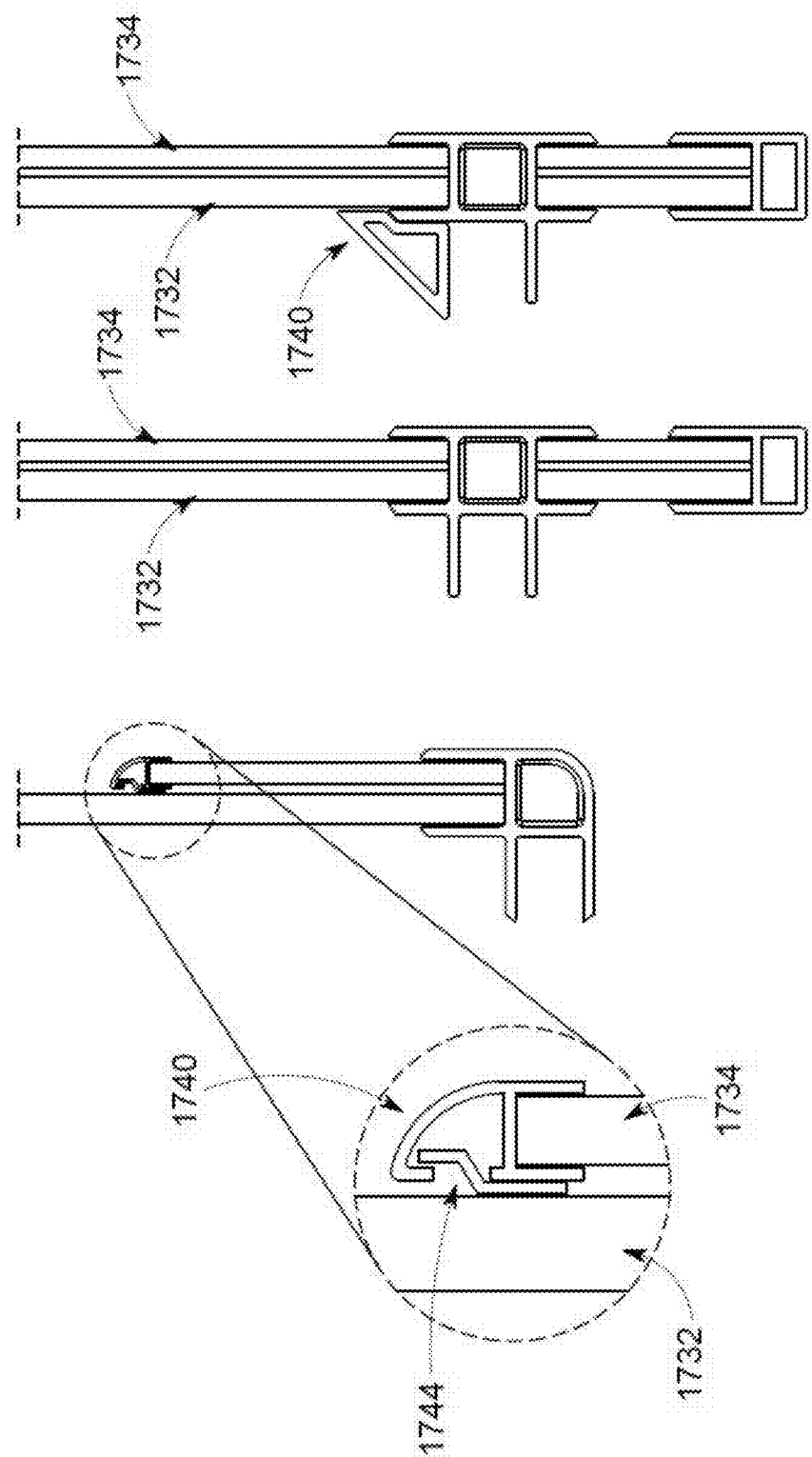
Figure 17L:
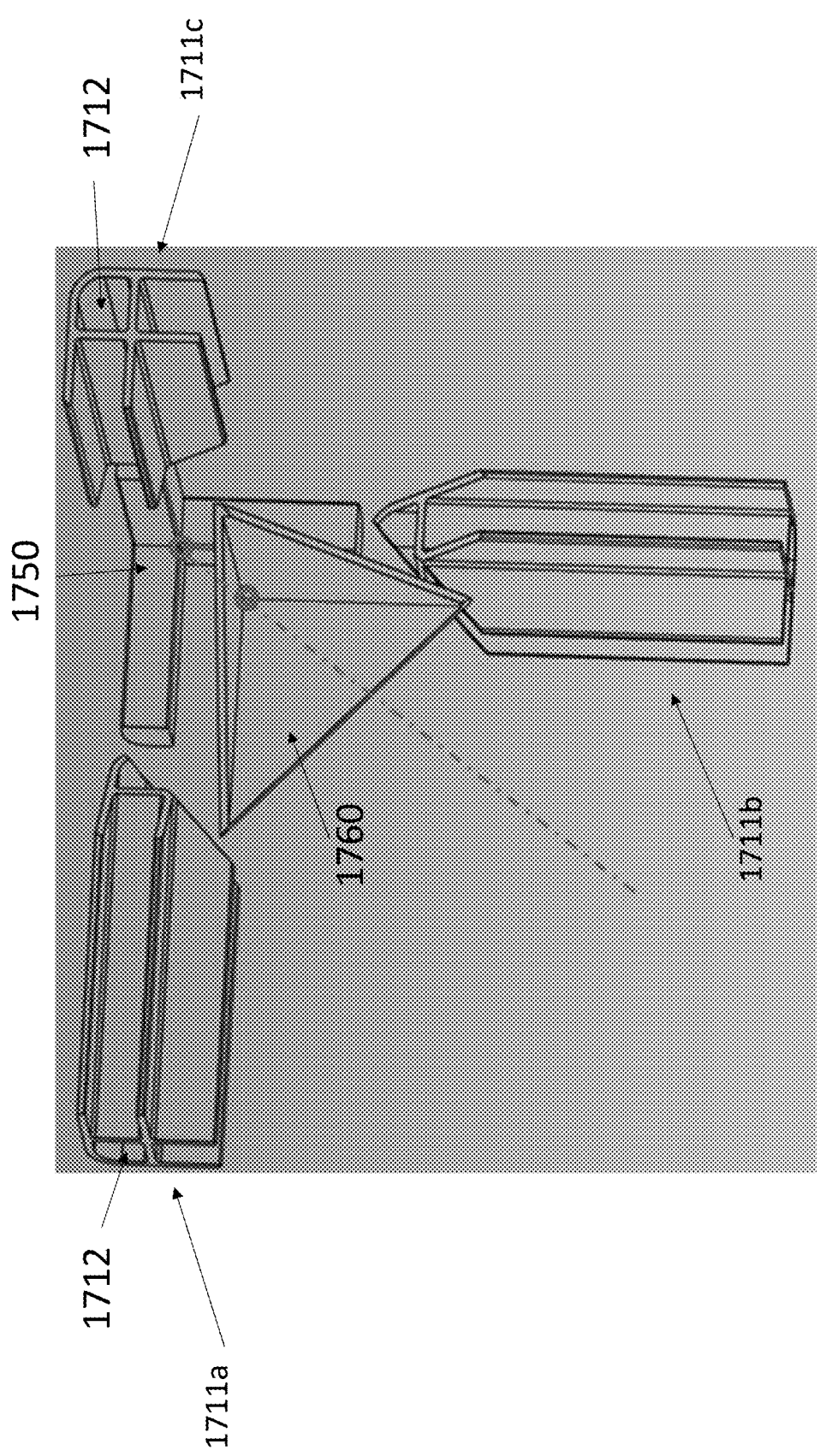

In the corner connector embodiment of FIG. 17*l*, the connector can be formed from three discrete components 1711*a-c*, each having at least one pair of sidewalls for receiving a panel to be inserted therein, and a channel 1712. A rigid junction 1750 can be included with three arms to be received within the connector channels 1712 (with the sidewalls remaining open to receive the pultruded panels). An anchor, as described above in connection with FIG. 17*e* can also be employed here, with its orientation shown in broken line, which affixes the apex of inner pyramid shaped plate 1760 against the corner of the rigid junction 1750 as highlighted in FIG. 17*l*. This configuration provides added rigidity and stability to the corner of the vehicle and facilitates assembly as it allows for panels to be positioned within the channels of the connector, without the panels collapsing or falling out of the connector sidewalls due to their own weight prior to application of adhesive (is employed).

The connector(s) disclosed herein can be formed of metals (e.g. aluminum) or composites, as desired.

In accordance with another aspect of the disclosure, a universal connector is provided which can be machined into the particular size/shape needed for the two (or more) panels to be joined (e.g. ½ roof panel+½ roof panel; floor+side; etc.). As shown in FIG. 17*h*, a universal connector 1720 can be provided which includes sidewalls defining openings 1720*a*, to connect to aligned panels, as well as perpendicular sidewalls defining an opening 1720*b* to connect intersecting/perpendicular panels. This universal connector 1720 can be modified, e.g. machine cut, to remove any unnecessary sidewalls, as shown in FIG. 17*i*, and result in an "H" connector 1722 for connecting aligned panels, a "T" connector 1726 for joining perpendicular panels, and a "U" shape connector 1728 for floor connections. This single/universal design for the connector reduces inventory burden and allows for rapid tailoring of the connector to achieve the particular shape desired for connecting multiple panels throughout the vehicle. The connector disclosed herein can also be employed when connecting curved panels, in which case the angle of the connector sidewalls can be oriented as desired between 0°~90°, and or having a complimentary arcuate shape, to accommodate the radius of curvature of the panel to be inserted therein.

In some embodiments the connectors are located in positions likely to withstand impact (e.g. fenders, bumpers, floor, etc) during vehicle use. Accordingly, the material properties of the connectors can be tuned for impact by, e.g., incorporating carbon into the connector walls, and or wrapping in polypropylene, to increase tensile strength. For example, the connectors can include protective coatings to resist breakage and/or scratching, such as nanometer thick layers of Aluminum oxide, Titanium, Carbon (graphene) etc. Additionally or alternatively, the foam core received within the connector sidewalls can be modified, e.g. packed more densely, to increase its Young' modulus. Also, the connectors 1720 can allow for repair/servicing of the vehicle components in that a technician can cut through a portion of the connector, e.g. cut into cell 1710 shown in FIG. 17*a*, to remove/replace a damaged vehicle panel. Furthermore, the sidewalls of the connectors 1710 which receive the panels to be joined together are shown to be planar and extend in a linear direction in the exemplary embodiments of FIG. 17. However, the edges of the side panel may have mechanical structures such as bumps or detents to mate with corresponding mechanical features formed in the inserted panel in order to increase surface area for bonding, provide a friction fit, and supplement a bonding agent in attaching the compartment/side panels.

The connectors can be bonded to the panels with a mechanical union and/or adhesive (e.g. resin) union. In the exemplary embodiment shown in FIG. 17j, the connector 1730 (configured as a "U-shape" connector) receives an end of the panel 1732. The connector sidewalls extend downwardly and overlap with the sides of panel 1732, and include holes 1733 for delivery of an adhesive between the panel 1732 and the interior of the connector sidewalls. The holes can be drilled into the connector sidewalls (prior to, or after, insertion of the panel 1732) and spaced equidistantly distributed along the length of the connector. However, the panel 1732 is fully inserted until the upper edge of the panel engages the inner edge of the connector 1731. The abutment of the inserted panel 1732 against the connector surface 1731 prevents adhesive from occupying this space (i.e. the upper surface of the panel 1732 and lower surface of connector 1731 remain free from adhesive).

The intersection of the vertical and horizontal legs of the connector 1730 can form a radius of curvature which forms a protrusion or bump 1735 at the edges of the channel which receives the panel 1732. The maximum size radius of these corner protrusions 1735 is the thickness of the bond to be formed by the adhesive (i.e. the thickness of the adhesive present between the panel 1732 and the downwardly extending sidewalls of the connector, which is injected through apertures 1733). During insertion of the panel 1732, the presence of these corner protrusions 1735 can serve as a ramp or guide to direct the panel into alignment with the connector sidewalls. The protrusion 1735 also serves as a seal to prevent adhesive from drifting toward the center section of the connector and engaging surface 1731.

The downwardly extending sidewalls can include a protrusion 1737 near the ends which serve to ensure a space is maintained between the panel 1732 and the connector sidewalls. In some embodiments, after the adhesive is dispensed between the connector 1730 and panel 1732 a caulking can be applied to seal the adhesive in place. For example, a caulking can be applied adjacent (e.g. below in FIG. 17j) the protrusion 1737. This caulking can be applied prior to injecting adhesive to further prevent the adhesive from leaking out beyond the adhesive region between the panel and connector sidewalls. The distal end of the connector sidewalls can remain free of adhesive bond to the panel 1732 which can be advantageous in that it allows for disassembly for service/repair, e.g., by cutting through the adhesive where present between the panel surfaces 1732 and the connector 1730.

Serviceable Connectors

In accordance with another aspect of the disclosure, the connectors described herein can be at least partially removable to facilitate repair/service of the vehicle components. Some panels in high service areas (e.g. floor/corners of vehicle) can be replaceable and separated from structural wall sections. In the embodiments shown in FIG. 17k, two panels 1732 and 1734 (e.g. vehicle sidewall panels) can be joined by the connector 1740 which releasable couples to a mating structure 1744. The mating structure 1744 can be located on a panel (e.g affixed to the panel wall, as shown on the left in FIG. 17k), or on a connector (coupled to the "H-shape" connector as shown on the right side of FIG. 17k); the H-shape connector in FIG. 17K having a laterally oriented channel for receiving a floor panel, and the bottom of vehicle sidewall panel 1732 being received within a U-shape connector. Referring attain to the left-side of FIG. 17k, the mating structure 1744 can project upwardly and outwardly to create a lip or overhang for the connector 1740 to matingly receive. In some embodiments, the connector 1740 can be removed by deflecting/deforming the mating structure 1744 (e.g. bending the upper flange downwardly) to release engagement with the connector, and hence removing panel 1734 from the first panel.

The connector can be reusable, or in some embodiments sacrificial—e.g., the connector is severed/ruptured to disengage the panels. The mating structure 1744 can be permanently affixed to panel 1732, so that if a replacement connector 1730 is introduced, the replacement connector can be coupled to the mating structure 1744.

Figure 18:
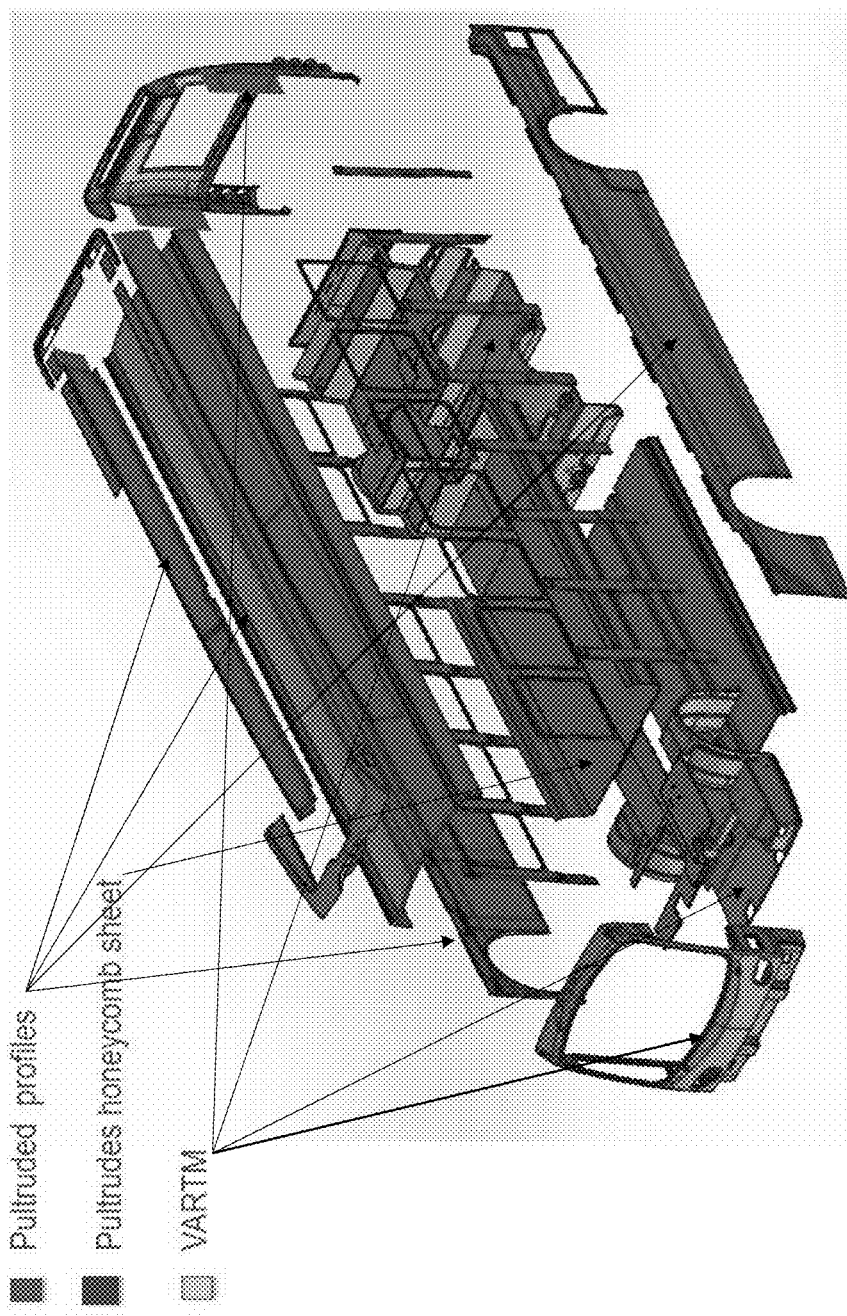
FIGS. 18-19 depict exemplary views of various composite vehicle components having pultruded profiles, pultruded honeycomb sheet structure, and VARTM-formed components, in accordance with an embodiment of the present disclosure.
Figure 19:
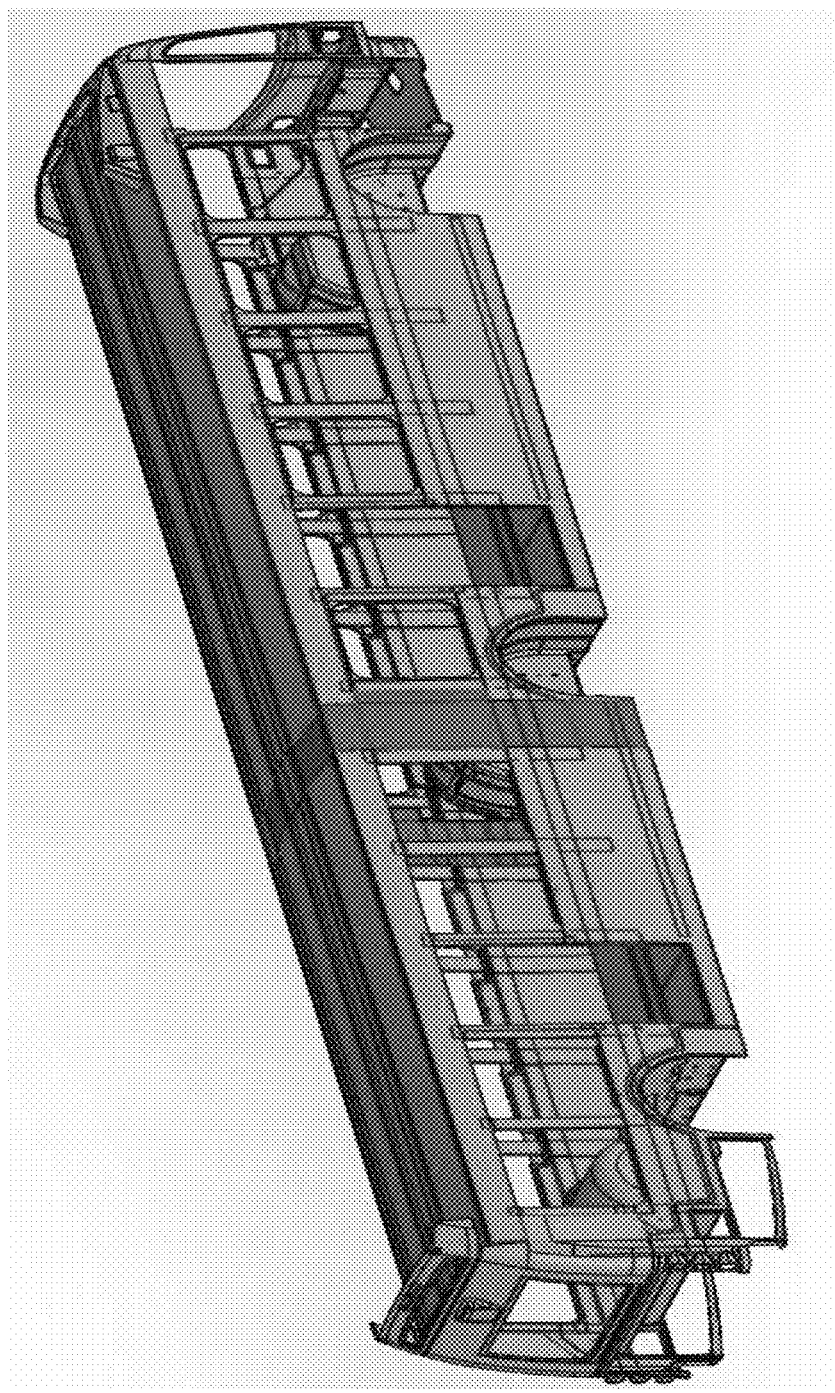

In accordance with another aspect of the disclosure, and as noted above, the pultruded vehicle components disclosed herein can be joined with other non-pultruded components. FIGS. 18-19 illustrate exemplary embodiments of a bus having a combination of VARTM and pultruded profile parts.

Optionally, the pultruded components disclosed herein can (in addition to the mechanical union afforded by their profiled edges) can be permanently secured to each other by use of an adhesive material. The adhesive may be embodied as a conventional resin, such as a polyester resin or an epoxy resin. Alternatively, the adhesive may be embodied as an induction cured adhesive or an electromagnetically sensitive adhesive.

In some embodiments, the surface of the interlocking features can include depth markings to indicate the distance, or degree, the first part is inserted within the adjoining part, thereby allowing an operator to visually confirm the desired depth (and thus stabilization and reinforcement) is achieved. Also, the outer edges of the interlocking features can be chamfered or rounded so as to provide smoothed arcuate surfaces to reduce risk of injury to personnel and/or damage to other components during manufacture and assembly of the vehicle component.

Reinforced Pultruded Components (e.g. Pultrusion-within-a-Pultrusion)

Figure 20:
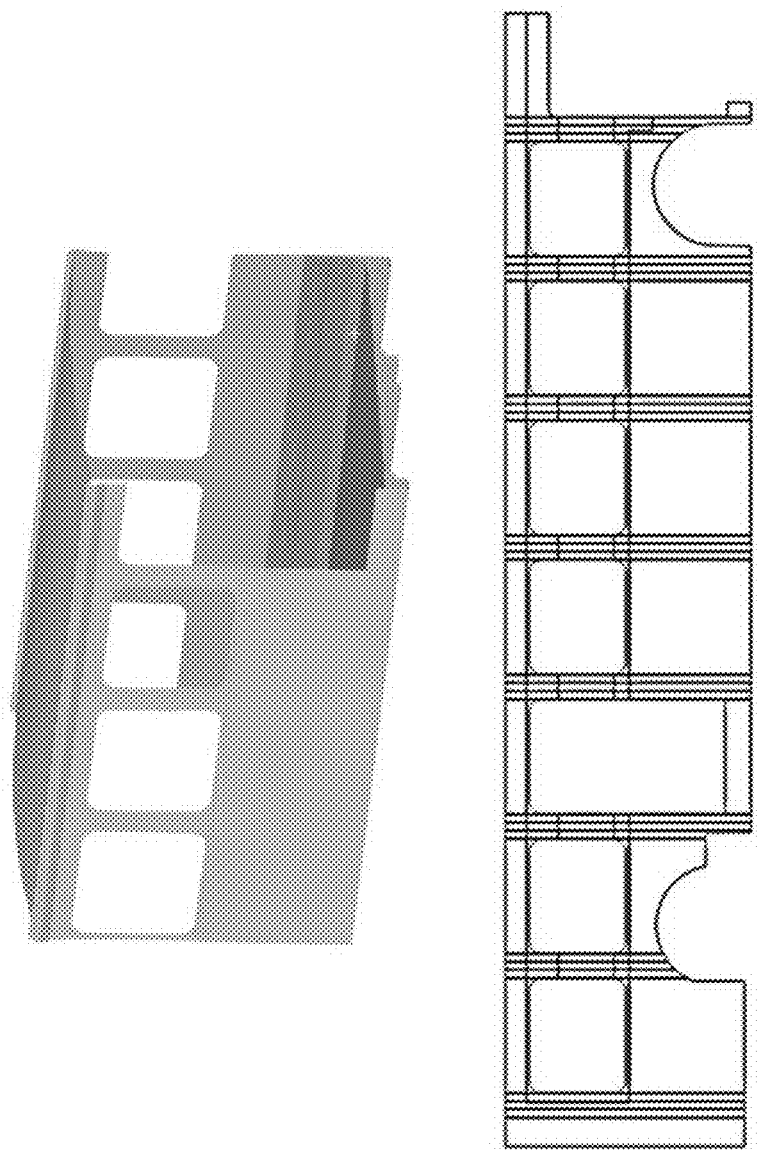
FIG. 20 depicts another exemplary view of a composite bus body wherein the entire bus side is formed as a single pultruded member.

In accordance with another aspect of the disclosure, wherein the entire side wall is pultruded as a single integral piece, as shown in FIG. 20, a plurality of cores (e.g. foam) can be incorporated into the pultrusion, as shown in FIG. 21-26.

A foam core 2100 can be aligned parallel with a previously formed pultruded structural component (e.g. window pillar) 2200. Although the exemplary embodiment shown depicts a pultruded pillar 2200 as having a square or rectangular cross-sectional shape, these can have other cross-sectional shapes (e.g. triangular, trapezoidal, or other polygonal cross-sections that have appropriate strength and surface area). The pultruded pillar 2200 can be formed of a pultruded combination of fiberglass reinforcements and thermosetting polyester or vinyl ester resin. The pultruded pillar 2200 can provide corrosion resistance, low thermal conductance, low electrical conductance, electromagnetic transparency, light weight, high strength, fire resistance, and/or dimensional stability to the composite panel. Additionally or alternatively, the pultruded pillar 2200 may also be formed of aluminum, steel, wood, acrylonitrile butadiene styrene (ABS), or a like durable material, for example.

The core material 2100 may be a foam or other material, e.g. foam sheets, polymer sheets, honeycomb polymer or metal, injectable foam or polymer. The core material 2100 can also be polyurethane, polystyrene or other light weight polymer in any form (foam, honeycomb, sheet, injectable, etc.), balsa wood, and other lightweight materials. In some embodiments, the core material 2100 can also be selected to provide certain properties (e.g. provide additional strength, corrosion resistance, thermal insulation, etc.). Additionally or alternatively, the core 2100 itself can also be a pultruded component.

Figure 21:
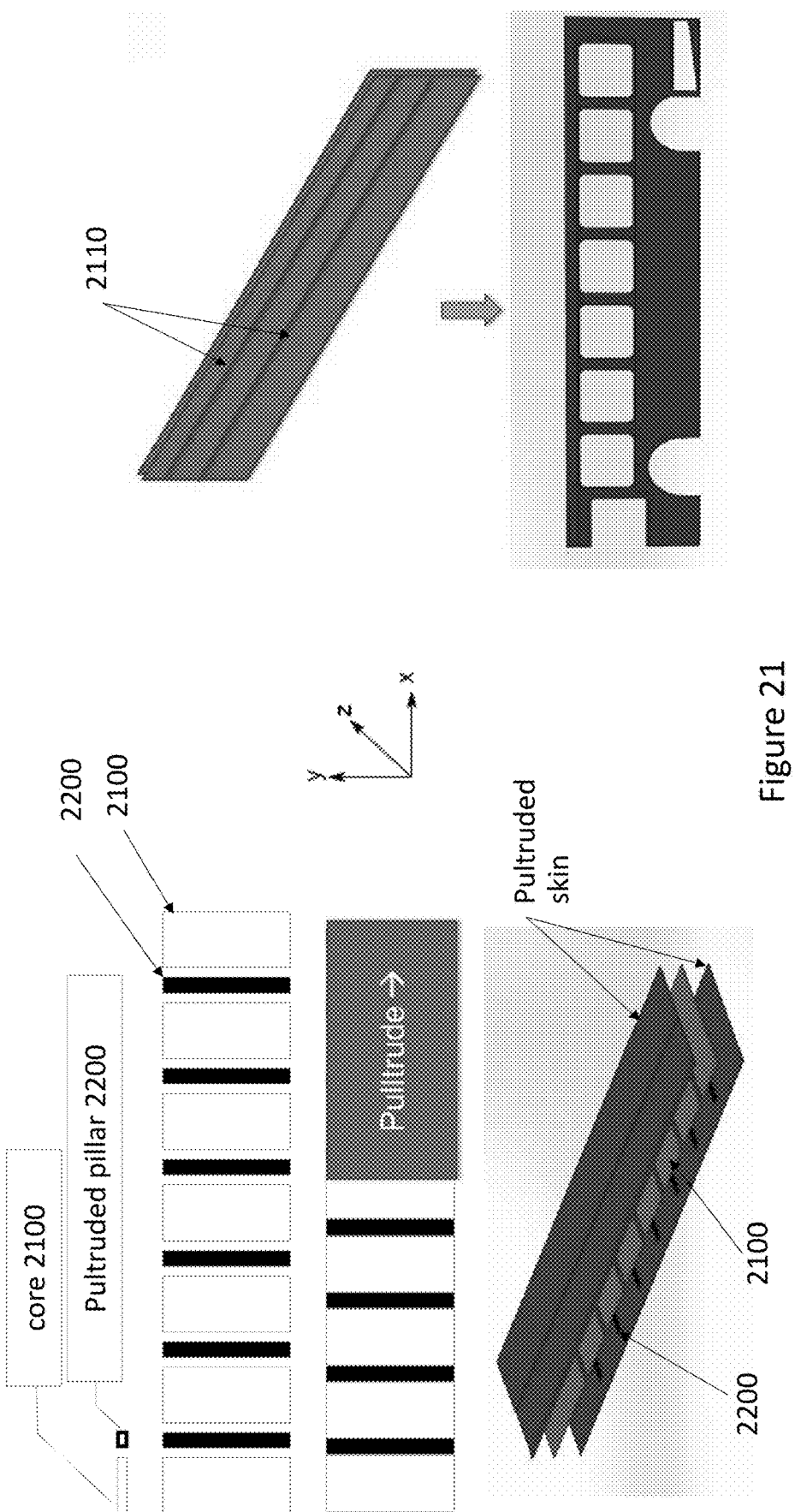
FIG. 21-26 depicts the interleaving of a foam core and pultruded structural members (e.g. window pillars).

These two components 2100, 2200 can then be joined, e.g. via an adhesive layer or film, to inhibit/prevent relative movement therebetween. Next, the combination of foam core 2100 and pultruded structural member (e.g. window pillar) 2200 is, again, pultruded through a pultrusion die which applies a skin to the 2100, 2200 combination, resulting in a permanent union of these components. Thus the present disclosure provides a pultrusion-within-a-pultrusion to create a composite automotive assembly. In some embodiments, additional structural reinforcements (e.g. pillars, roof bows, door frames, etc.) can be incorporated into the foam core 2100 prior to pultrusion. Moreover, these structural components can be inserted into the foam core prior to the (second) pultrusion step shown in FIG. 21, or inserted within foam core cut-outs after the (second) pultrusion step is performed. The pultrude reinforcing structural components 2200 can be oriented perpendicular to the direction of (second) pultrusion. For example, the structural components 2200 can be oriented along the y-axis or z-axis while the second pultrusion operation is performed along the x-axis, as shown in FIG. 21.

The outer skin layers can be monolithically formed as single pieces, e.g. fiber reinforced plastic or fiber reinforced polymer (FRP) which can also be coated, embossed, laminated, or otherwise provide decorative appeal to the skin exterior.

Figure 23:
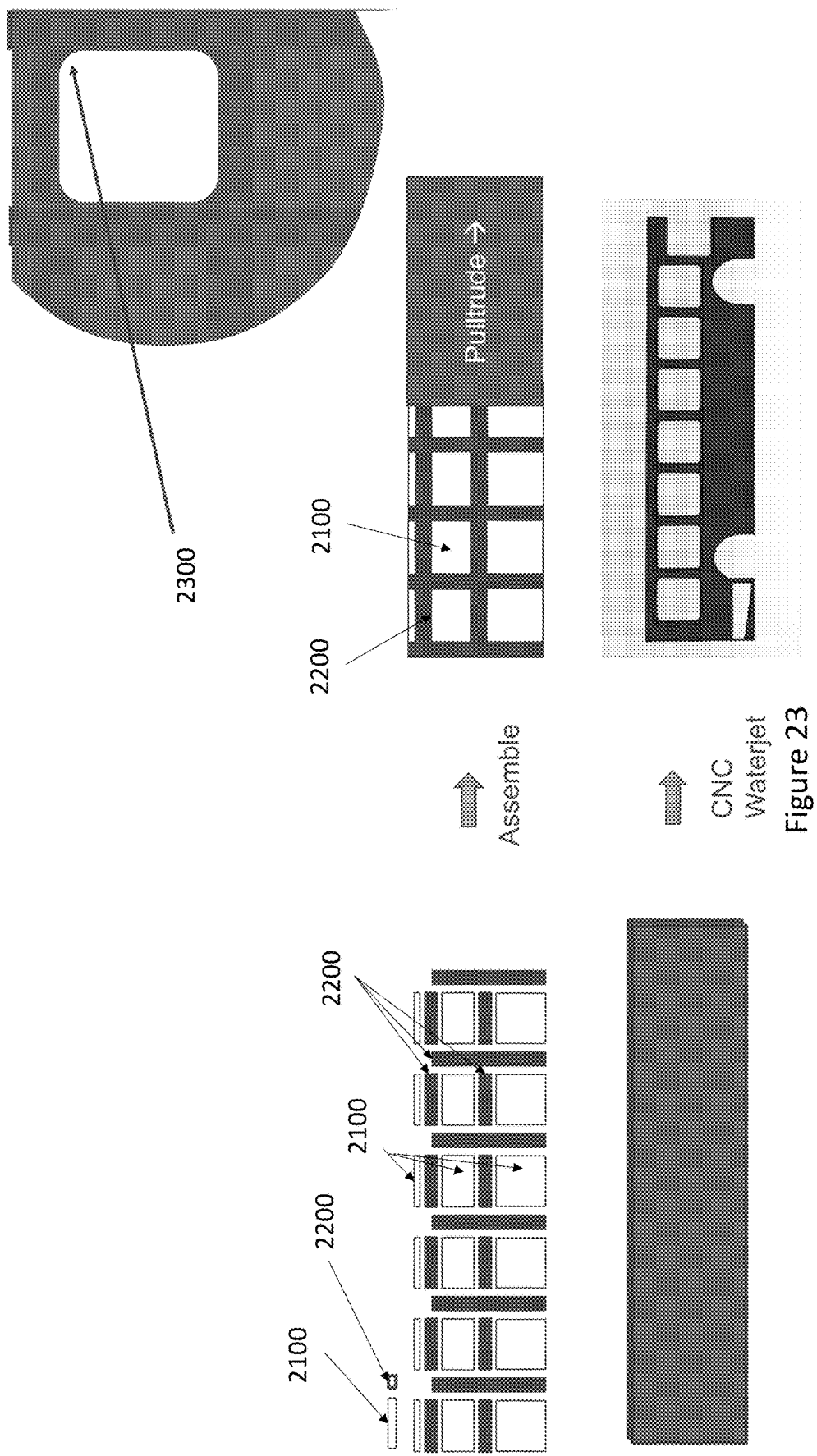

Windows 2300 can be cut out (e.g. via programmable CNC machine, water jet, etc.) cells from the single-piece bus side to form radiused, as shown in the top of FIG. 23. This allows for windows and other features of a side of the vehicle to be formed utilizing the load carrying characteristics of the pultruded pillars 2200 without the weight and complexity of welded metal framing.

Figure 24:
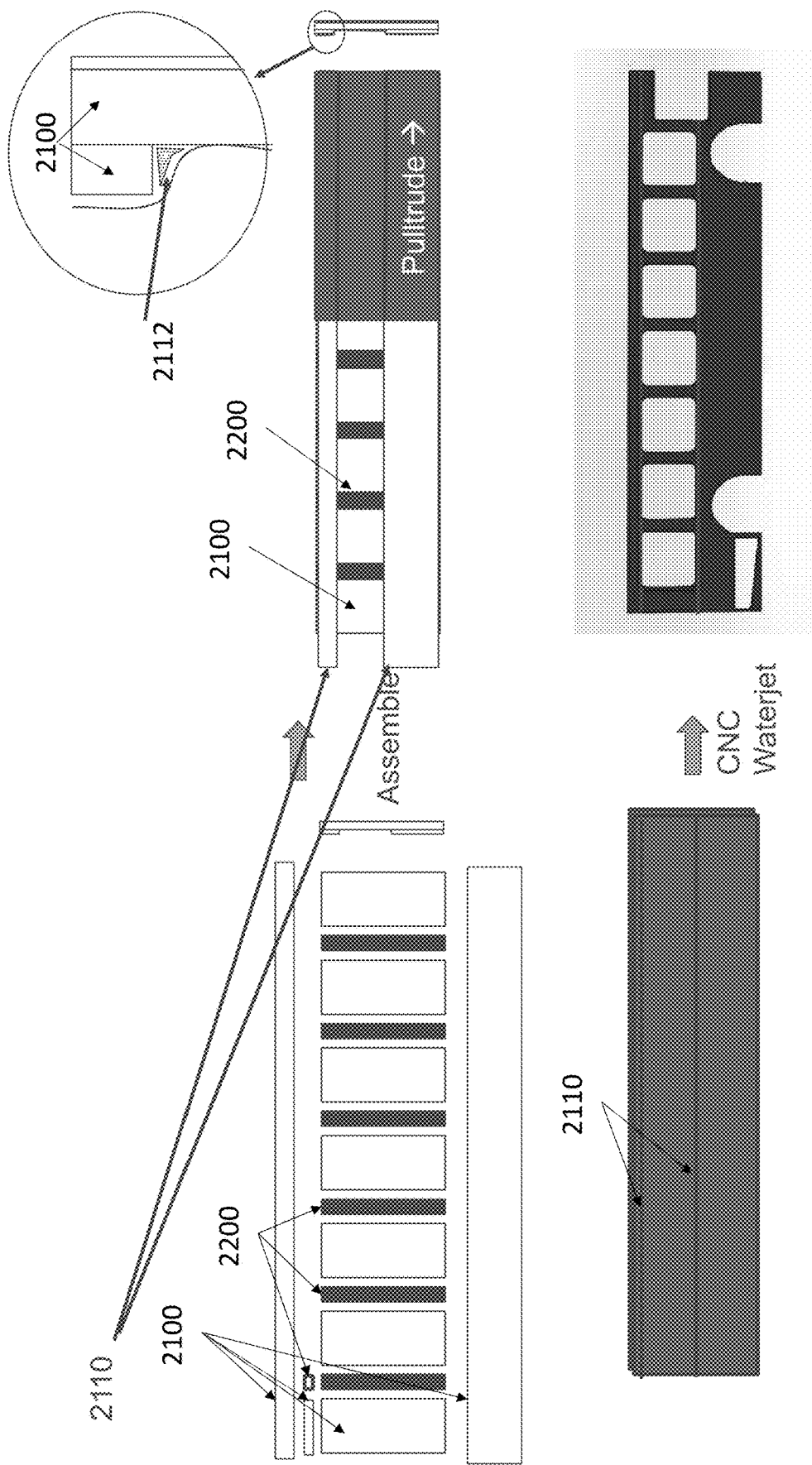

Additional features (e.g. wheel well) can also be formed in the single-piece bus side. In some embodiments, structural features can be imparted onto a single, e.g. interior, surface of bus side. For example, upper and lower recesses 2110 can be formed in the bus side which correspond to the top and bottom edge of the (yet to be inserted) windows. Additionally or alternatively, the window recess 2110 can be formed by placing an additional layer of foam core 2100, perpendicular to the initial layer of foam core 2100 and overlapping the reinforcing pillar 2200, as shown in FIG. 24. In order to bridge the difference in thickness from these additional horizontal layers of foam 2100, and reduce wrinkling or buckling, a roving material can be added to fill in the transition region, as shown in the cross-sectional view. In the exemplary embodiment shown, the roving 2112 has a generally triangular shape with a curved face in contact with the outer skin applied during the second pultrusion process.

Additionally, in some embodiments the window can be formed where the core insert 2100 is a clear material (e.g. ABS transparent plastic). In such embodiments the window core insert 2100 can include a sacrificial coating/film and is positioned adjacent to the reinforced (pre-pultruded) pillars 2200 and then pultruded with layers of external skin applied thereto. After the second pultrusion step, the skin can be removed (e.g. peeled off) from the underlying window, with the sacrificial film deposited over the window facilitating removal of the skin only around the surface area of the window (i.e. the skin remains attached to the neighboring pillars 22000). The window can also include a variety of aesthetic properties (e.g. tint, frosting, fracture resistant coating, etc.). Further, for embodiments in which the panel exhibits a non-linear profile, the window core 2100 can be thermally formed to have a curved or bent profile, complimentary to that of the panel it is formed.

Figure 22:
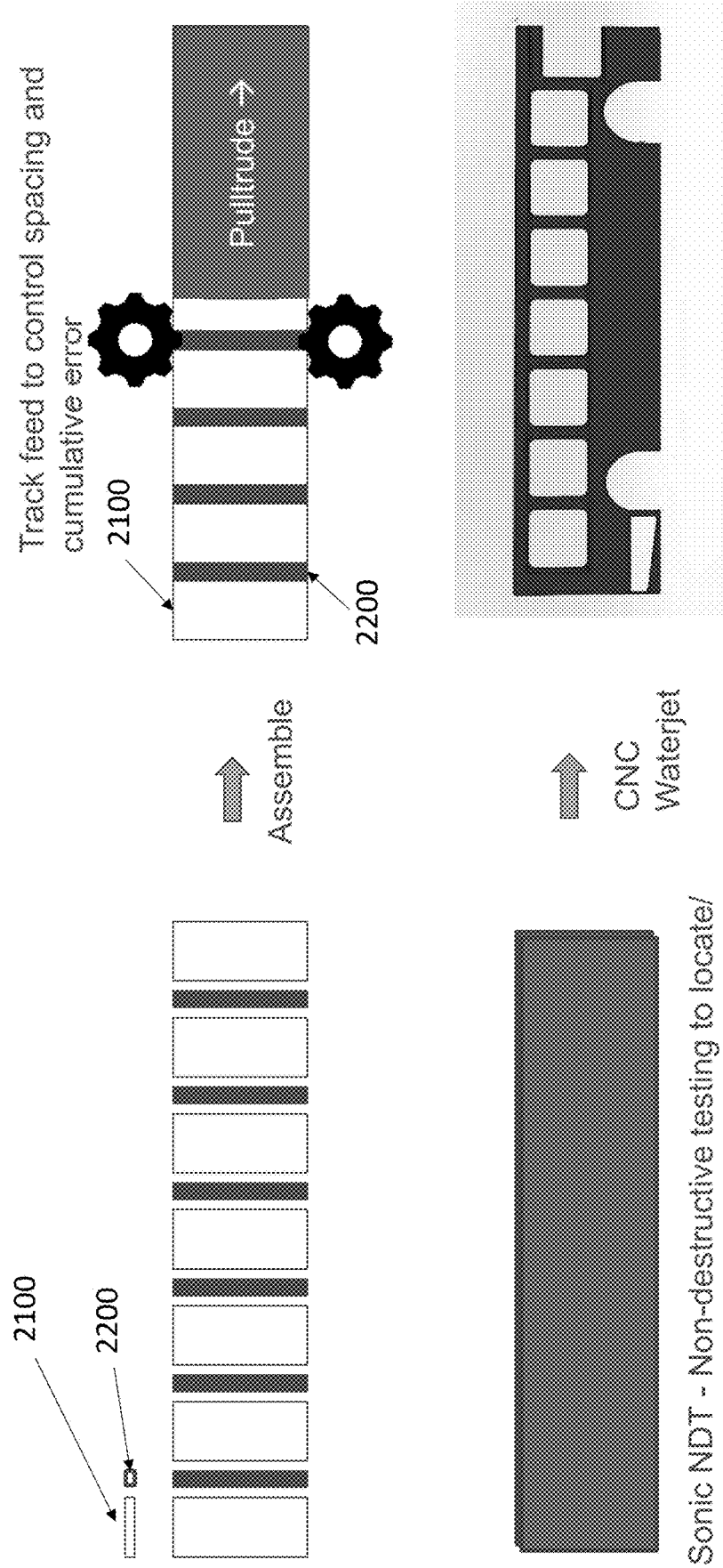

As shown in FIG. 22, the core 2100 and pre-pultruded reinforcement structure 200 are arranged with the desired spacial arrangement (e.g. abutting engagement). The combination of the core 2100 and pillar 2200 is then fed under a controlled speed to maintain that desired spacial arrangement. This can be accomplished with a track feed sprocket (on both sides of the track) with sprockets that register/confirm the spacing of the core 2100 and pillar 2200 prior to the (second) pultrusion process. After the second pultrusion step is performed, wherein the newly applied layers of skin obscure the view of the foam 2100 and pillar 2200 components, a non-destructive testing (e.g. ultrasound) can be performed to locate/confirm the positions of the cores 2100 and pillars 2200. Next, the desired cutouts (e.g. window frames, wheel well, etc.) can be cut (CNC machine or waterjet) through the panels, as desired. Also, in some embodiments, the surface skin (i.e. the outer layers applied by the second pultrusion process) can be reinforced in the direction of pull, e.g. with braided or woven-in biaxial off angles with a variety of materials (e.g. glass, carbon, etc.).

As shown in FIG. 23, the core 2100, and/or the reinforcing pultruded structural component (e.g. window pillar) 2200, can have multiple orientations (e.g. parallel, perpendicular) to the pultrusion direction (indicated by the arrow). Accordingly, the reinforcing pillars 2200 can form boxes/cells of reinforced compartments within the vehicle panel.

Figure 25:
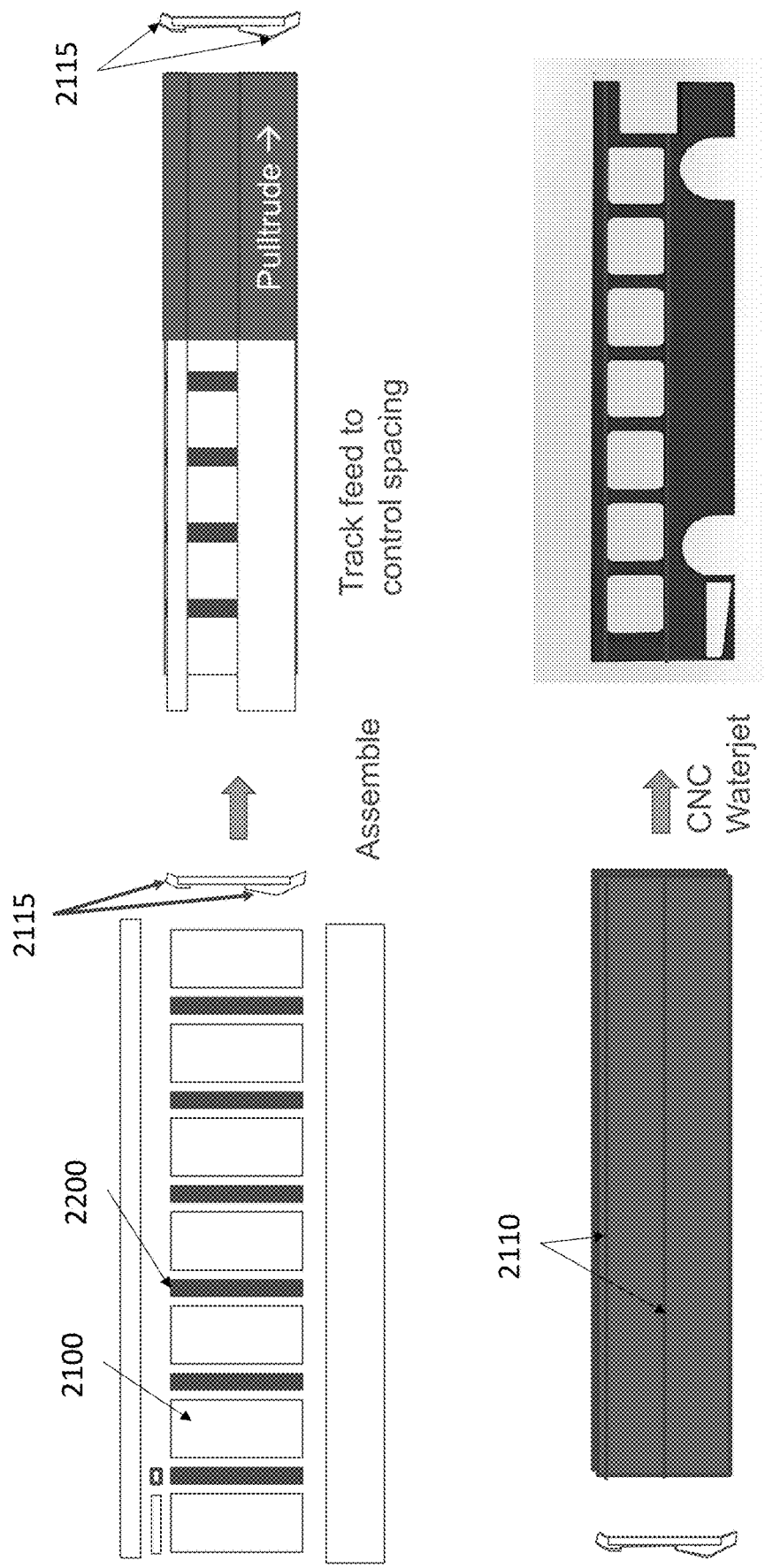

As shown in FIG. 25, the foam core 2100 can be formed with any particular geometry desired for the vehicle design. This underlying foam core geometry can then lead to the pultruded panel (which includes foam core+pultruded pillar) to be formed with a similar shape. In the exemplary embodiment shown, the lower portion of the pultruded sheet (which coincides with the bottom of a vehicle wall) has a foam core shape 2115 that protrudes both vertically and laterally a greater distance than the foam core located at the upper portion of the pultruded sheet.

Figure 26:
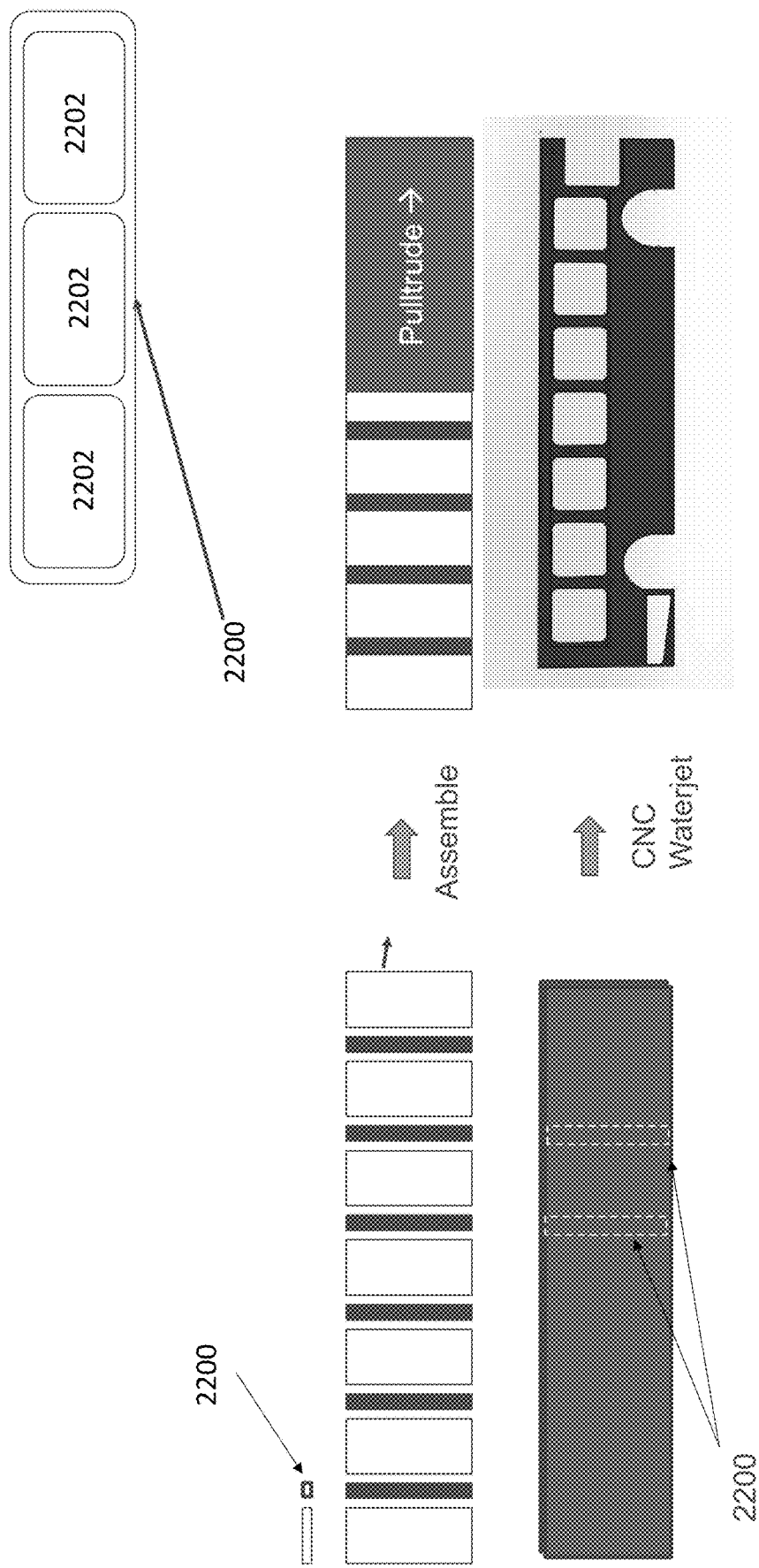
Figure 27:
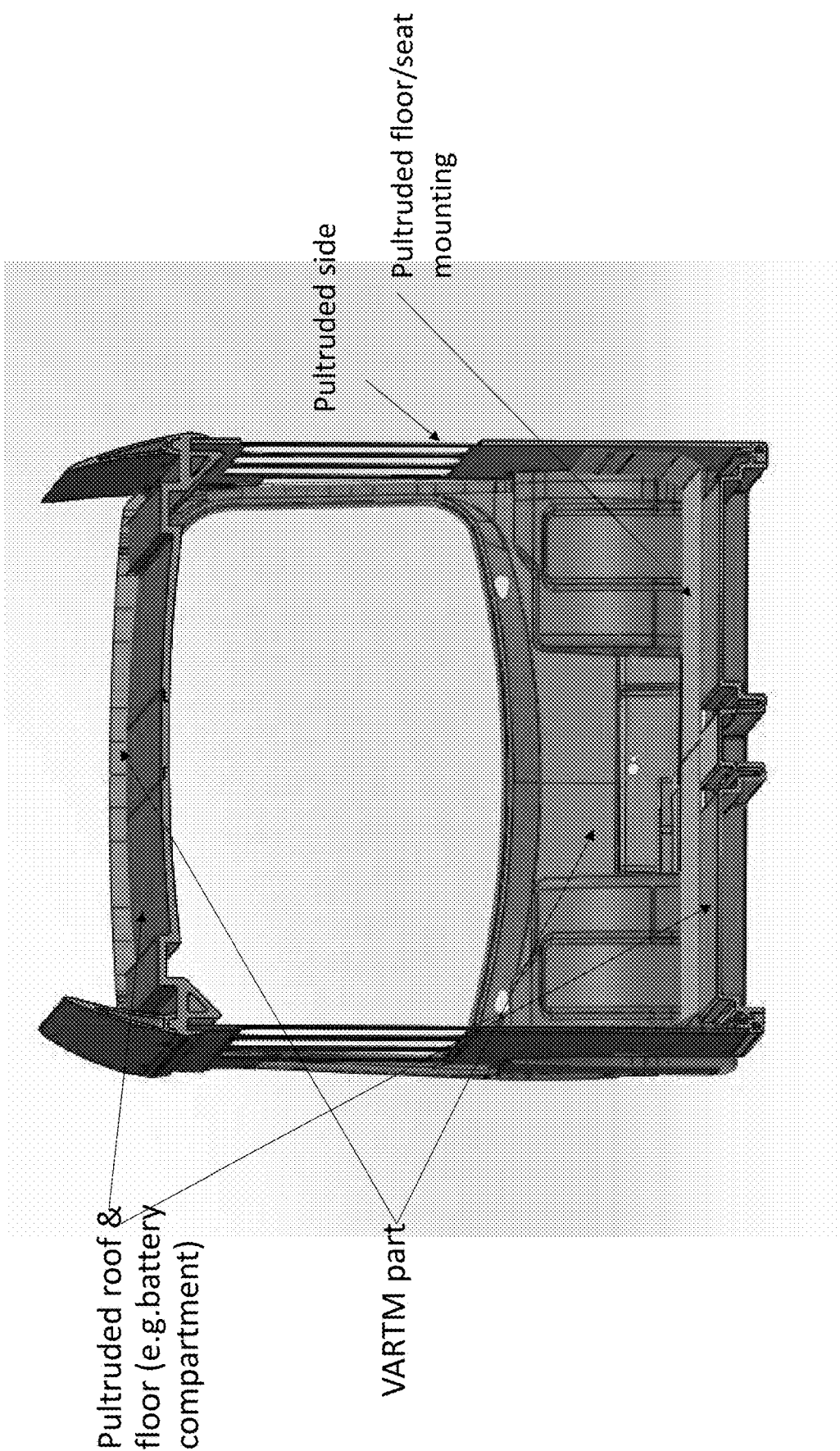
FIG. 27 depicts a cross sectional view of the composite bus body wherein the entire bus side is formed as a single pultruded member.
Figure 28:
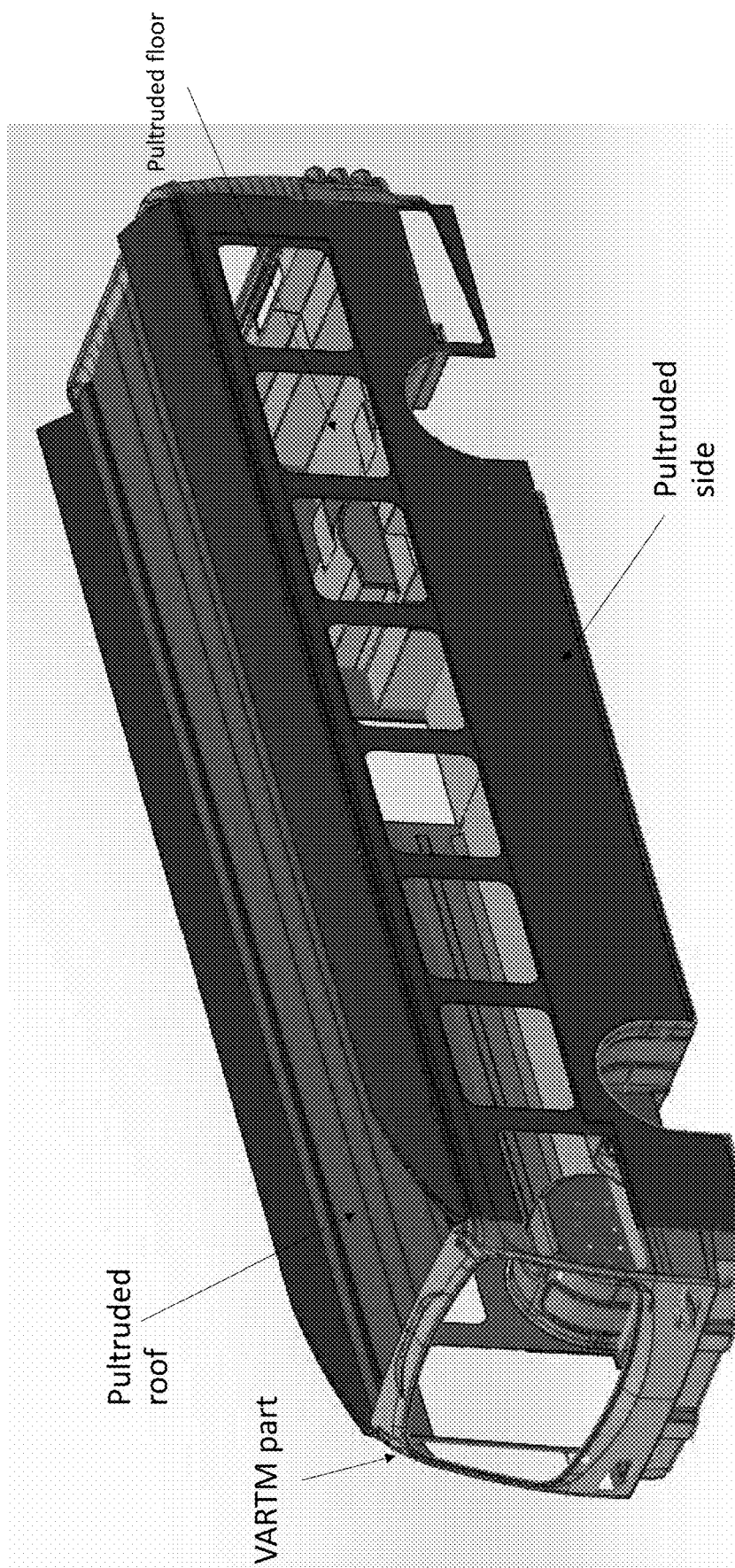
FIG. 28 is a perspective view of the composite bus body wherein the entire bus side is formed as a single pultruded member.

In the embodiment shown in FIG. 26, the pultruded window pillar 2200 can be formed as a hollow rectangular structure that is subdivided for increased strength. The cavities 2202 shown can be used for routing harnessed wiring (e.g. high/low voltage, sensor data, antennae, etc.), heat transfer materials, HVAC, and/or water drainage. These sections 2202 can be open and harness pulled through or fully opened and harness laid in. In the case of water ducting, the channel can be open at the roof and under the bus. These can be uniform through the bus or placed at various points in the sequence. The exemplary embodiment shows three, uniform, cavities but other numbers and configurations can be employed as desired. In some embodiments, the seat mounting structure can also be pultruded as a single, or multiple, pultrusion(s) with respect to the bus floor. Again, non-destructive testing (e.g. ultrasonic waves) can be employed to confirm/locate the location (e.g. edges) of the reinforcements 2200 after the second pultrusion step, thereby allowing for the CNC cutting to be performed though the final product without intersecting or compromising the reinforcements 2200 embedded therein (shown in phantom in the final pultrusion view at the bottom of FIG. 26).

As shown in FIGS. 27-33, the single piece side panel of the bus can be joined to the (pultruded) floor, (VARTM formed) front/rear panel, and (pultruded) roof via the interlocking mechanisms described above. In the exemplary embodiment shown, the floor, roof and sides of the bus can be formed as unitary pultruded members, which are then assembled together to form the bus body. Also, in order to maximize efficiency and reduce cost/waste, the wall and floor panels can be formed with the same thickness to increase linear footage in a given panel pultrusion manufacturing cycle, and edge profile (for fit with the connector as described herein), thereby using the same pultrusion die set-up for both floor and wall components. Furthermore, batch processing can be performed of vehicle components (e.g. roofs, walls, floors) with each batch having a distinct thickness, geometry, and composition (e.g. reinforcement and/or foam materials). As another material/cost saving measure, the core 2100 can be reusable or recyclable across multiple panels.

Figure 29:
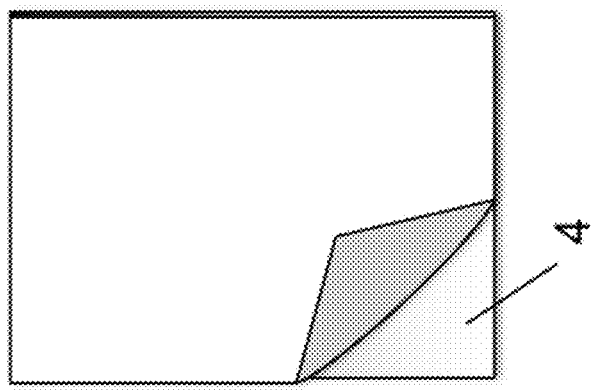
FIG. 29 is a cross-sectional view of a pultruded bus body side with reinforcement inserts and a foam core.
Figure 29:
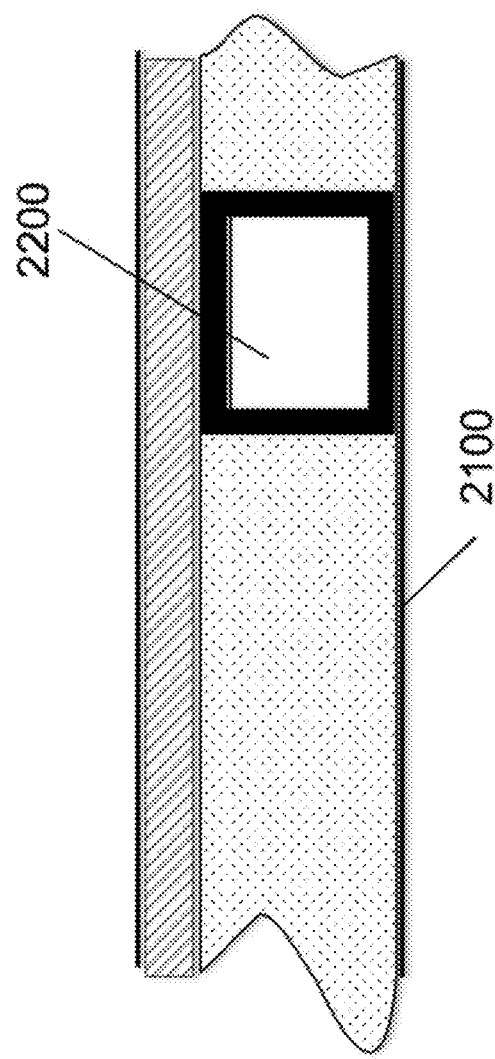
Figure 30:
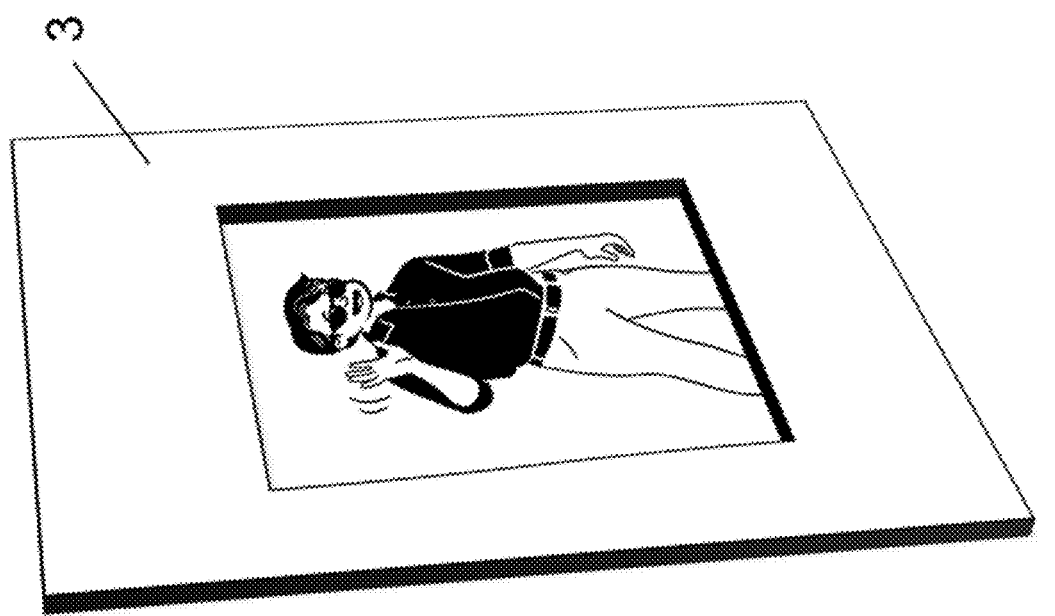
FIG. 30 is an exemplary pultruded side with a window cut out.
Figure 31:
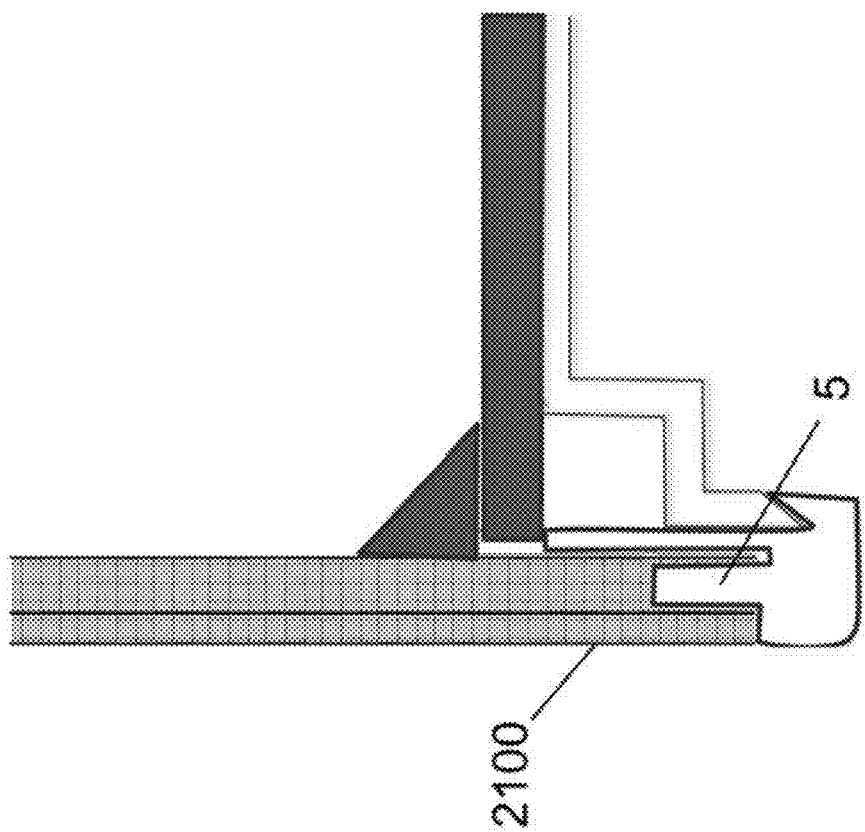
FIG. 31 is an isolated view of an undercut foam and bonded pultruded joint of the lower corner of the bus body.

As shown in FIG. 29, a pultruded pillar reinforcement 2200 can be positioned between two layers of foam 2100. This combination can then be pultruded to form a complete side panel of the bus (a section of which is shown in FIG. 30; the present disclosure illustrates a bus side panel but the disclosure could be employed to pultrude roof and floor sections of a bus as a single component as well). The pultruded combination (foam 2100 & reinforcement 2200) can be painted or "wrapped" in a film for further surface treatment, as desired, as shown by reference numeral 4 in FIG. 29. In the exemplary embodiment shown in FIG. 31, the foam 2100 can be formed with an undercut and bonded to a pultruded joint (the joint "5" can be formed from 3D printing).

Figure 32:
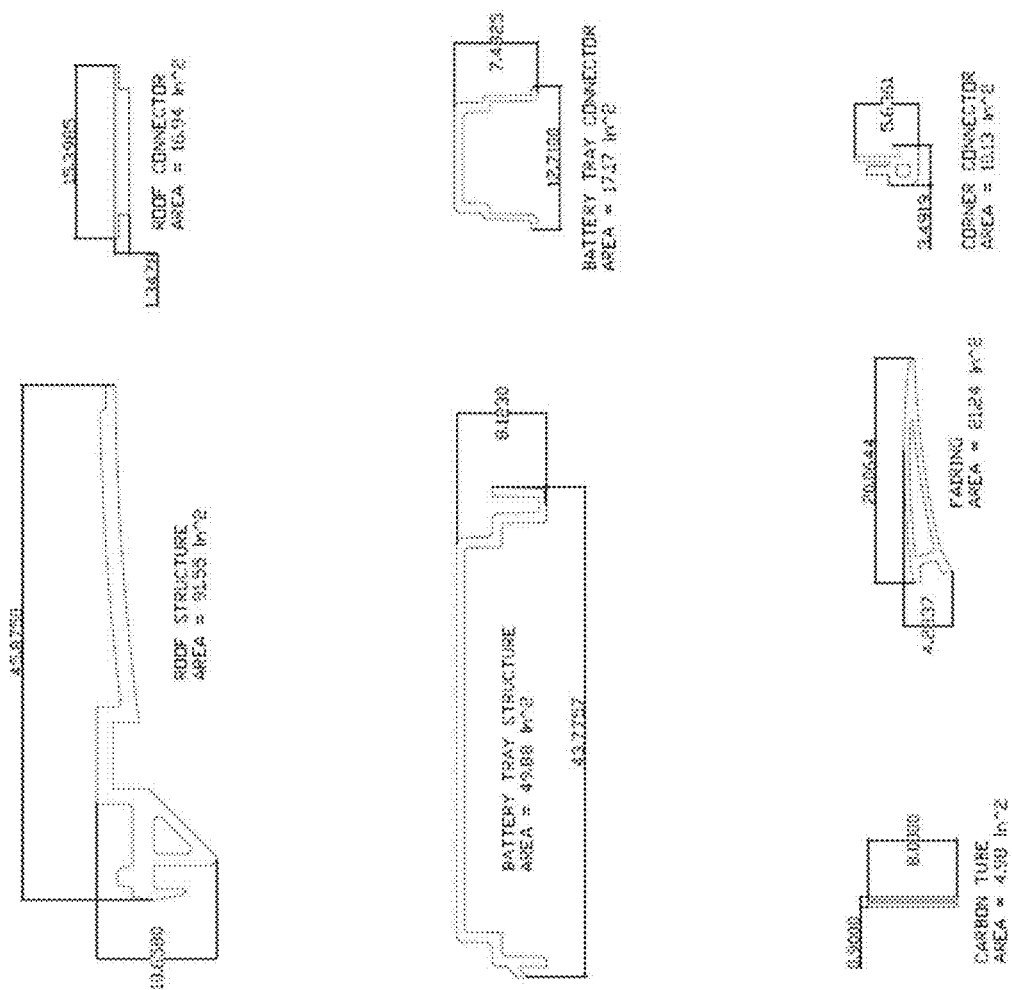
FIG. 32 are exemplary views of various pultrusion profiles that can be employed in accordance with the present disclosure.
Figure 33:
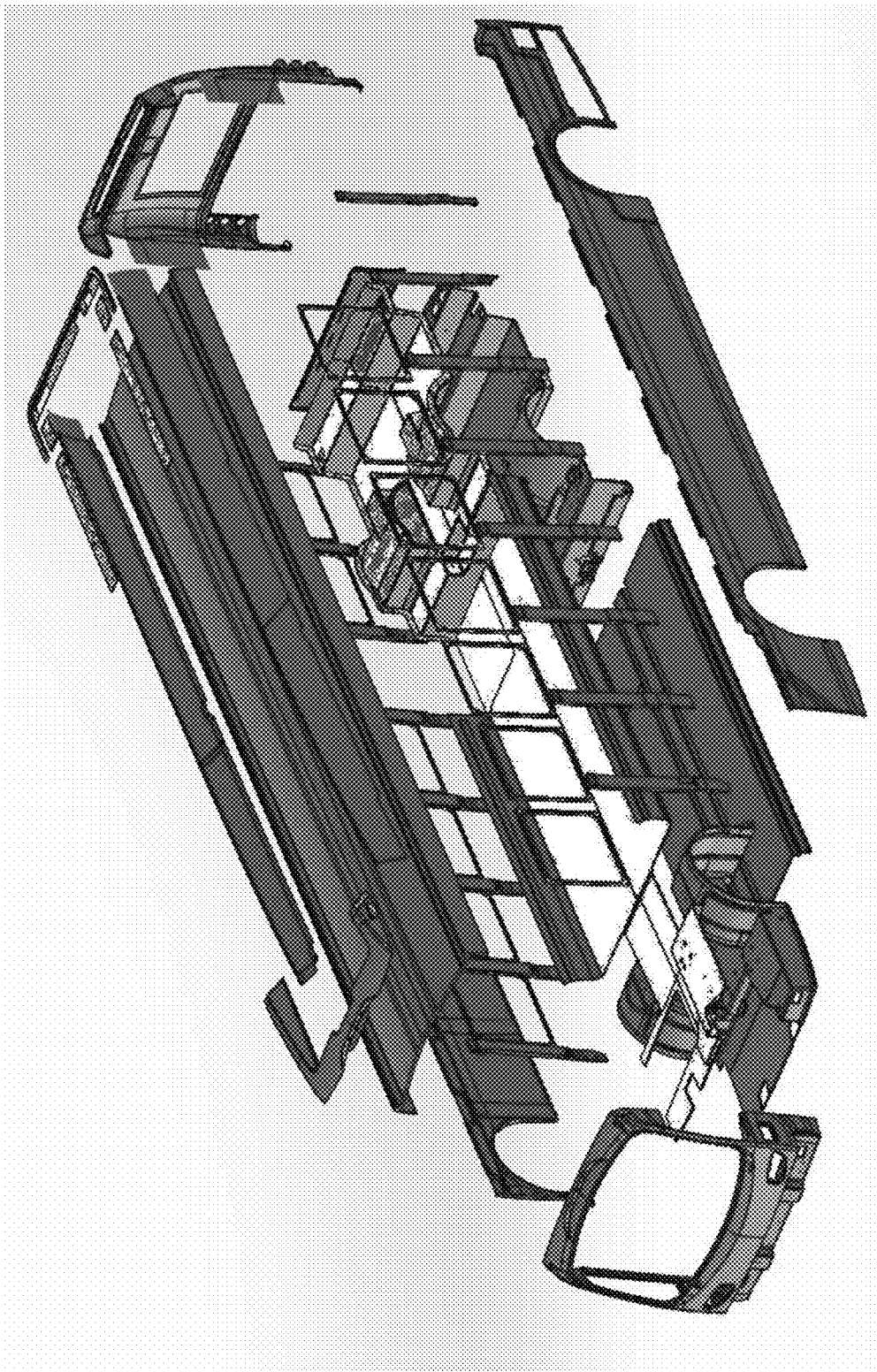
FIG. 33 is an exploded view of the composite bus in accordance with the present disclosure.

FIG. 32 illustrates a variety of connectors that can be employed in accordance with the present disclosure to joining the various (pultruded, VARTM and foam) components to assemble the vehicle body (with FIG. 33 depicting an exploded view of those various components joined by one or more of the connectors shown in FIG. 32).

Figure 34:
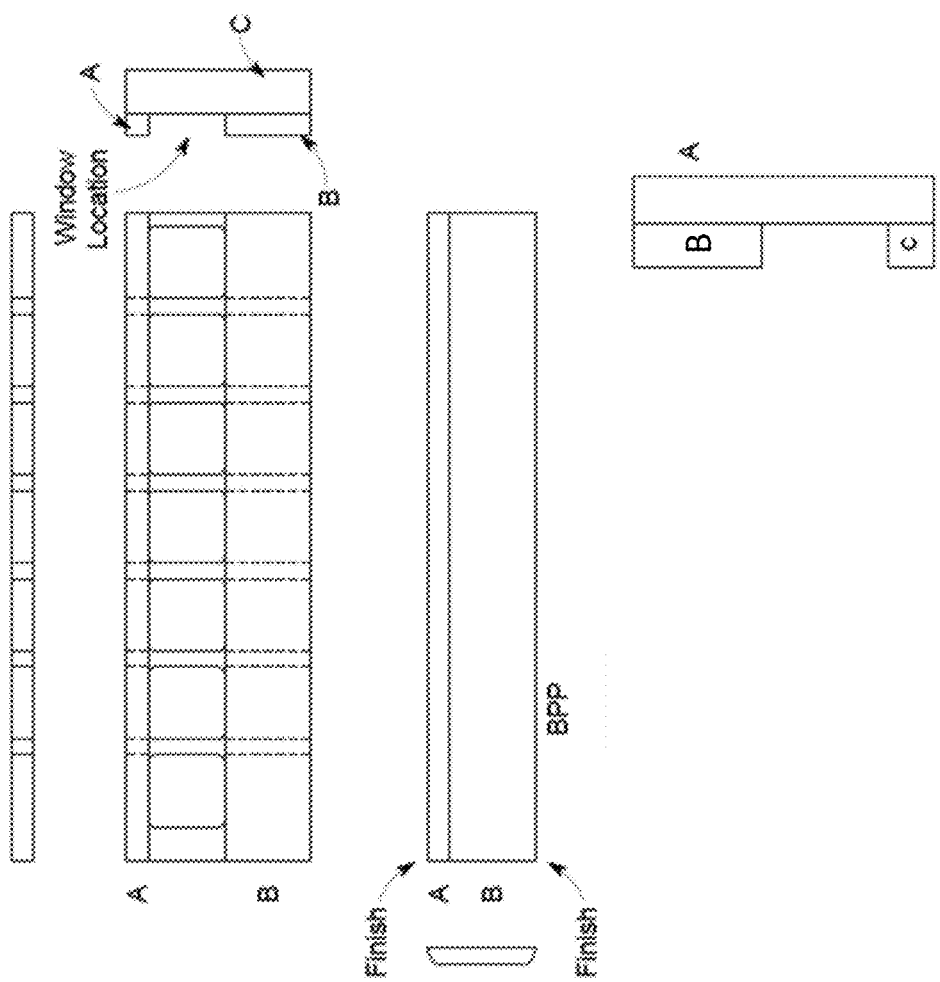
FIGS. 34-50 are exemplary embodiments of additional pultrusion, and reinforcement incorporating, techniques in accordance with the present disclosure.
Figure 35:
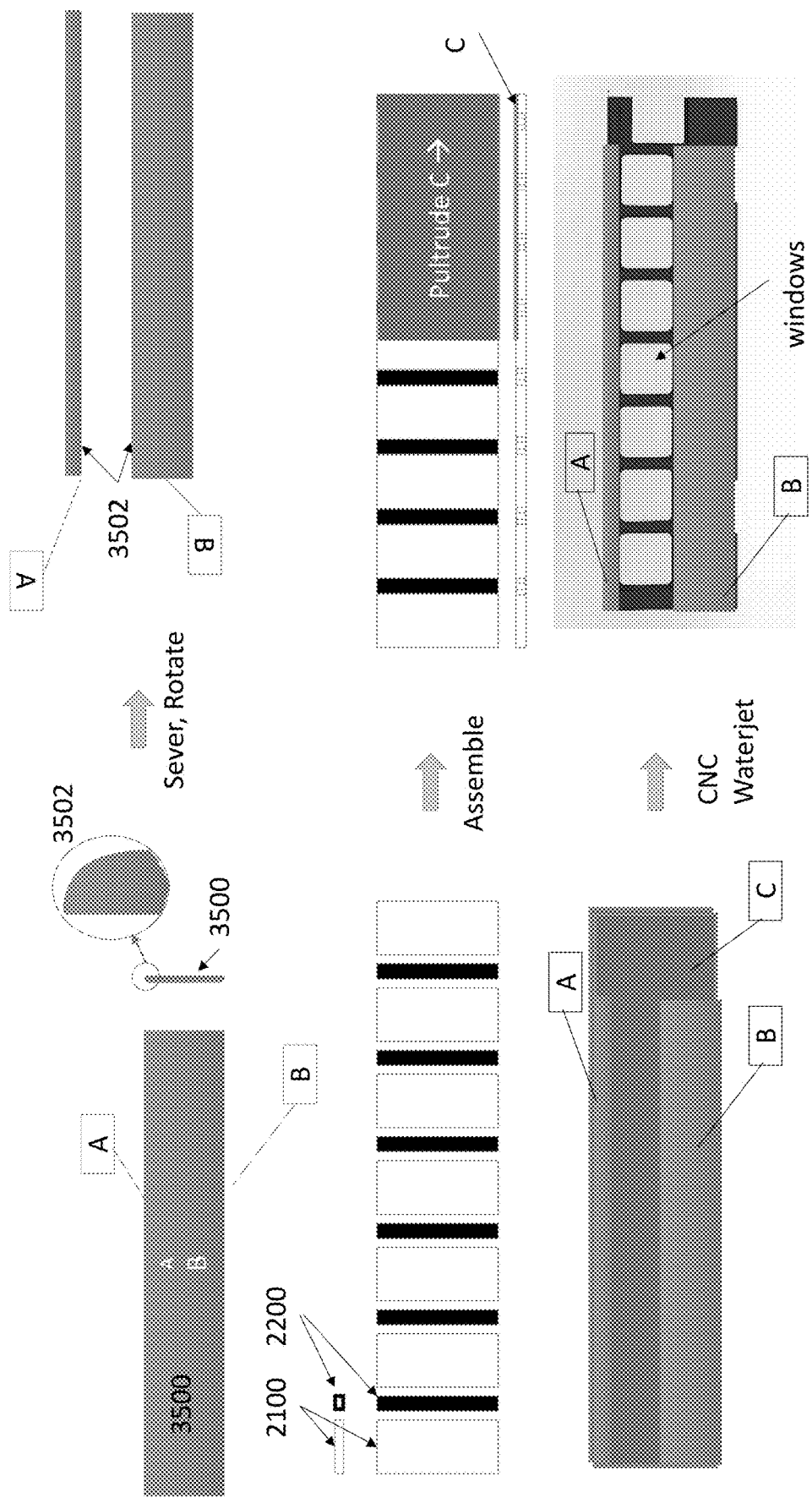

In accordance with another aspect of the disclosure, as shown in FIGS. 34-35, the side(s) of a vehicle (e.g. bus) can be formed by pultruding sheets "A" and "B" with finished or contoured edges that correspond with openings, e.g. window locations. Initially, the sheets "A" and "B" are pultruded as a single/integral component 3500, then cut or split into two discrete sheets and rotated/inverted (as denoted by the inverted "A" and "B" in FIG. 35). The outer edges of the (integral sheet, i.e. prior to cutting & flipping) can be formed with a non-linear e.g. chamfered, edge 3502 as shown. The edges 3502 can be formed with a variety of radii of curvature and configured to receive the vehicle windows, once installed. In some embodiments, this splitting of sheet 3500, and flipping to form inverted sheets "A" and "B" with finish edges along the top and bottom of window, can be superficial, e.g. not structural or load bearing, but instead provide access point for vehicle service and repair.

A structural member "C" can be joined to the aforementioned (split and inverted) sides "A" and "B", as shown, to provide structural support to the assembly. As shown in FIG. 34, member "C" can be located on an internal side of the vehicle and extend between the gap or space formed between the (finished) edges of sheets "A" and "B" (where "A" and "B" are on the outside and form the window relief). Also, the structural member "C" can be a pultruded sheet including interwoven, e.g. alternating, segments of foam 2100 and reinforcement pillar 2200, as described above. This "A"+"B"+"C" assembly can then be laminated together, and then a plurality of openings (e.g. windows) can be formed (e.g. CNC waterjet) as shown.

Figure 36:
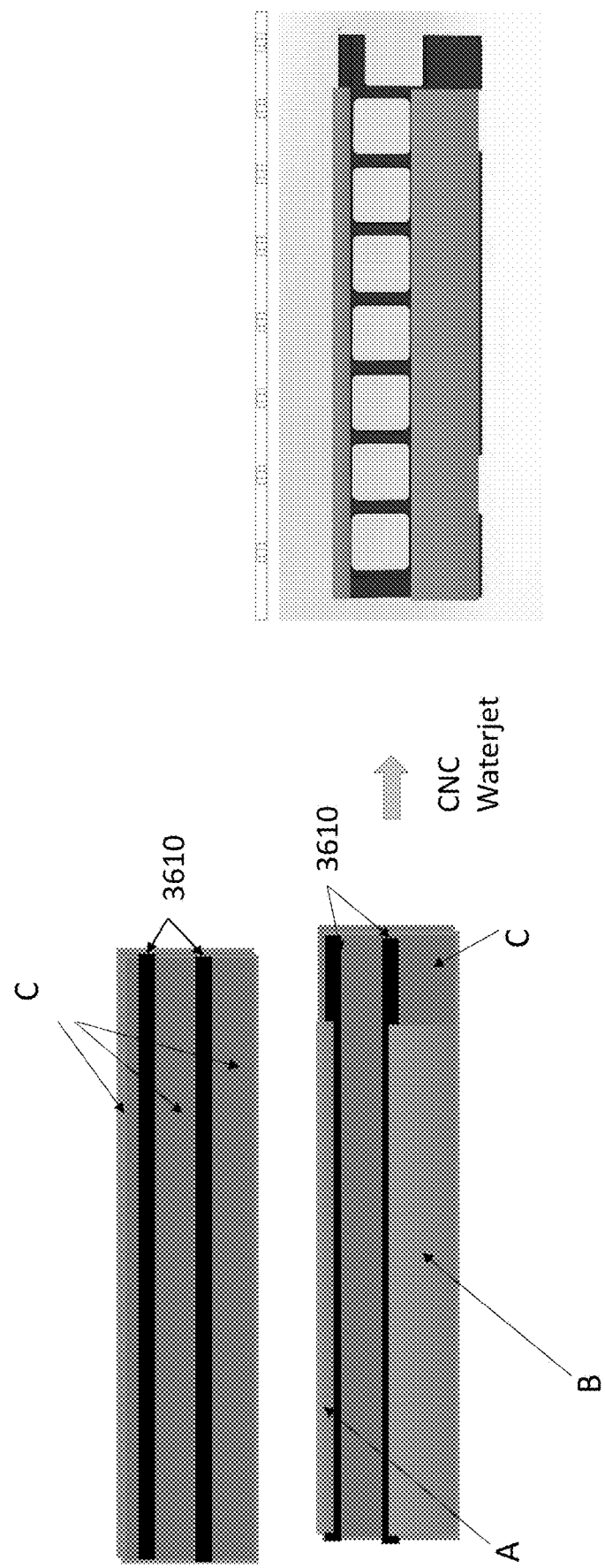

In accordance with another aspect of the disclosure, a targeted tailored reinforcement fiber can be added in the skin of sandwich structure. The example shown addresses the opening (e.g. window), working with a pillar reinforcement included in the core, as shown in the exemplary embodiment of FIG. 36.

Pultruding walls with a contoured shape can make it difficult to get the reinforcement of the skin around the window openings and on the inserted pillars. In accordance with another aspect of the disclosure, a rectangular pultrusion die can be used for the main part of wall (i.e. planar sections) and the shape can be added by layering "A" and "B". This enables reinforcement to be strategically placed in fabric which is pultruded to form the skin—in this exemplary embodiment, the top and bottom of the window. Reinforcements 3610, such as carbon fiber bands using roving, woven fabric, non-crimped fabric (NCF) or braided fabric are incorporated in the skin of pultrusion above and below window structurally ties pultruded pillars together to improve performance. In some embodiments, the reinforcement 3610 has a uniform diameter along its entire length. Some overlap with the window opening would reinforce the corner of the opening and further reduce the stress concentration in the corners of the opening. This construction allows the inclusion of tailored fiber placement in the skin of the pultrusion to be directly adhered to pillar substructure providing structural optimization opportunities.

Figure 37:
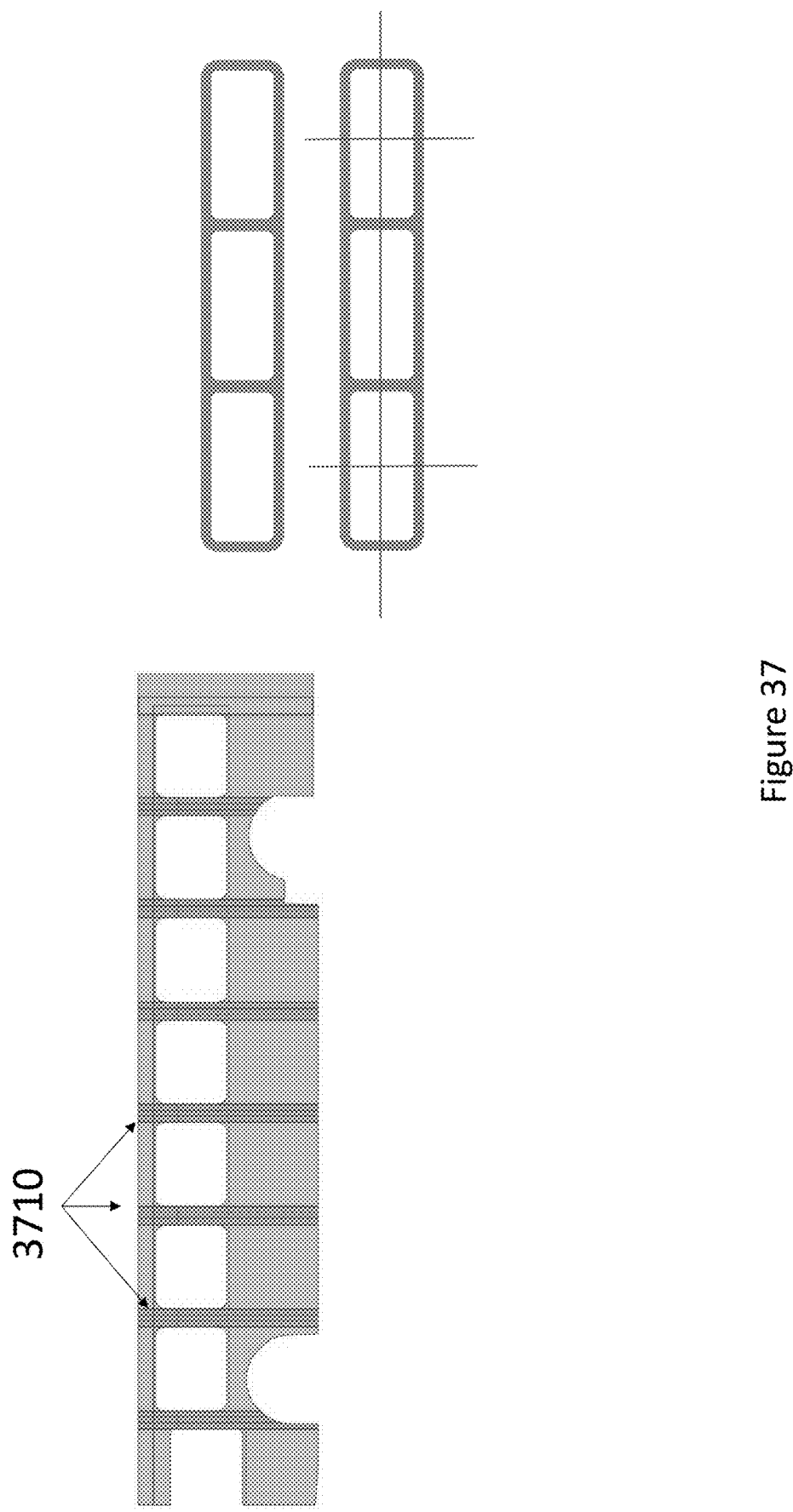

FIG. 37 illustrates an exemplary pillar 3710, oriented in a vertical manner, or perpendicular to the pultrusion direction. The pultrusion process is one of the best available solutions for the most economical and consistent lightweight vehicle construction. A structure may have a core of foam with a skin of resin and fiber pultruded together for uniform lightweight structure. The strength may be insufficient in local areas around holes or localized loads. Increasing the strength of material of the entire surface maybe be inefficient, heavy and expensive. Thus, to address the localized structural requirement, a geometric shape can be add in the core material that is cost-effective and enables many design options. The geometric shape can be another pultrusion, and formed from a variety of materials including wood, metal, or any other suitable isotropic or anisotropic material.

Figure 38A:
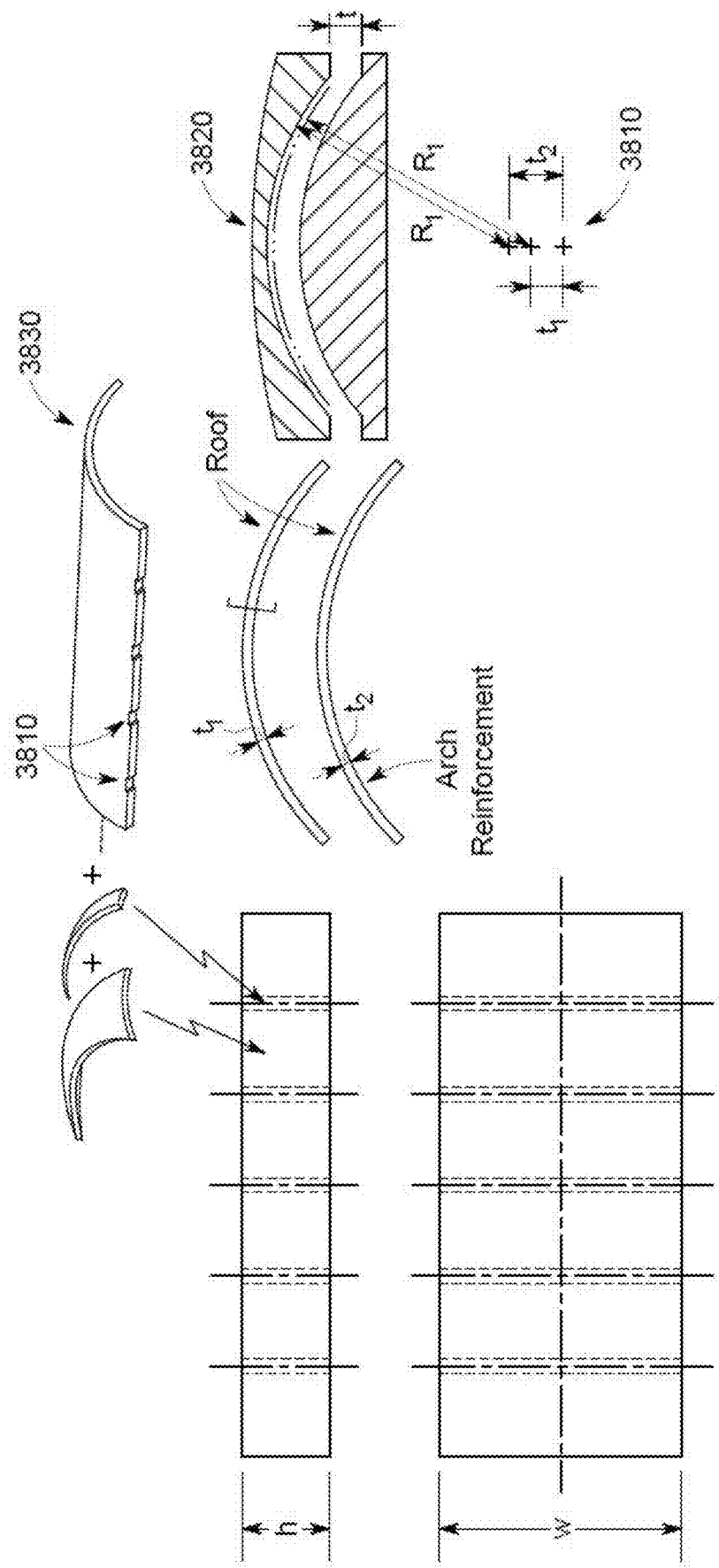

FIG. 38a illustrates a process for forming a shaped (e.g. arcuate) section with reinforcing inserts that can be used as a roof arch or other contoured portion of a vehicle. Thus, adding a pultruded (or other reinforcements) to the pultruded core is not limited to flat or planar structures. In the exemplary embodiment shown, a pultruded roof with arched reinforcements or ribs 3810 is provided. The ribs 3810 can be formed (e.g. via pultrusion) first then placed in die 3820 and pultruded with the arched roof (having a complementary arch/radius) 3830. In the exemplary embodiment shown, the ribs 3810 extend the through the entire lateral width of the roof (e.g. from driver to passenger side); alternative dimensions can be employed if so desired.

A benefit of this approach is that structures with parallel, or complementary, curved surfaces can be formed with the reinforcement and the structure (e.g. roof) made in the same die by pultruding the rib 3810 at thickness, t1. The ribs can then be cut to the desired length, placed within the die again 3820, and a subsequent pultrusion process can be conducted to form structure 3830 at (greater) thickness t2 (with the ribs 3810) formed within the structure 3830. The ribs 3810 can be positioned at a midpoint of the structure thickness t2. Additionally or alternatively, the rib for a continuous single radius in the major fiber direction can be made in the desired direction in a dedicated die—e.g., as in a radius pultrusion.

Furthermore, these reinforcing ribs 3801 can be formed from techniques other than pultrusion, such as a series of stacked laminations (akin to bent wood). The ribs shown in FIG. 38 are symmetrical (e.g. round), but additional/alternative rib geometries can be employed, such as ribs having "V", "S", Trapezoid, etc., cross-sectional shapes.

Figure 38C:
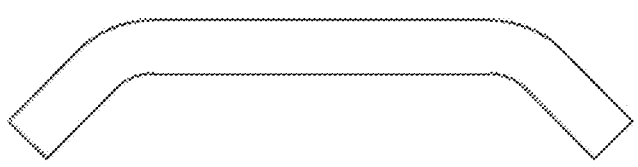
Figure 38B:
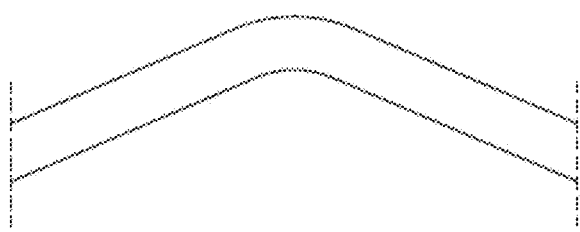

Additionally or alternatively, a shaped (e.g. faceted, angular) section with reinforcing inserts can also be formed in accordance with the present disclosure. FIG. 38*b-c* depict an exemplary embodiments in which the pultruded panel (which can include inserts as described above, but not illustrated here for clarity) is first formed as a planar member-similar to the embodiments described in connection with FIGS. 21-26. Thereafter, the planar product is pressed against a die (which can be heated to expedite formation) and bent or deformed into a non-planar shape, as shown in FIG. 38*b-c*.

Figure 39:
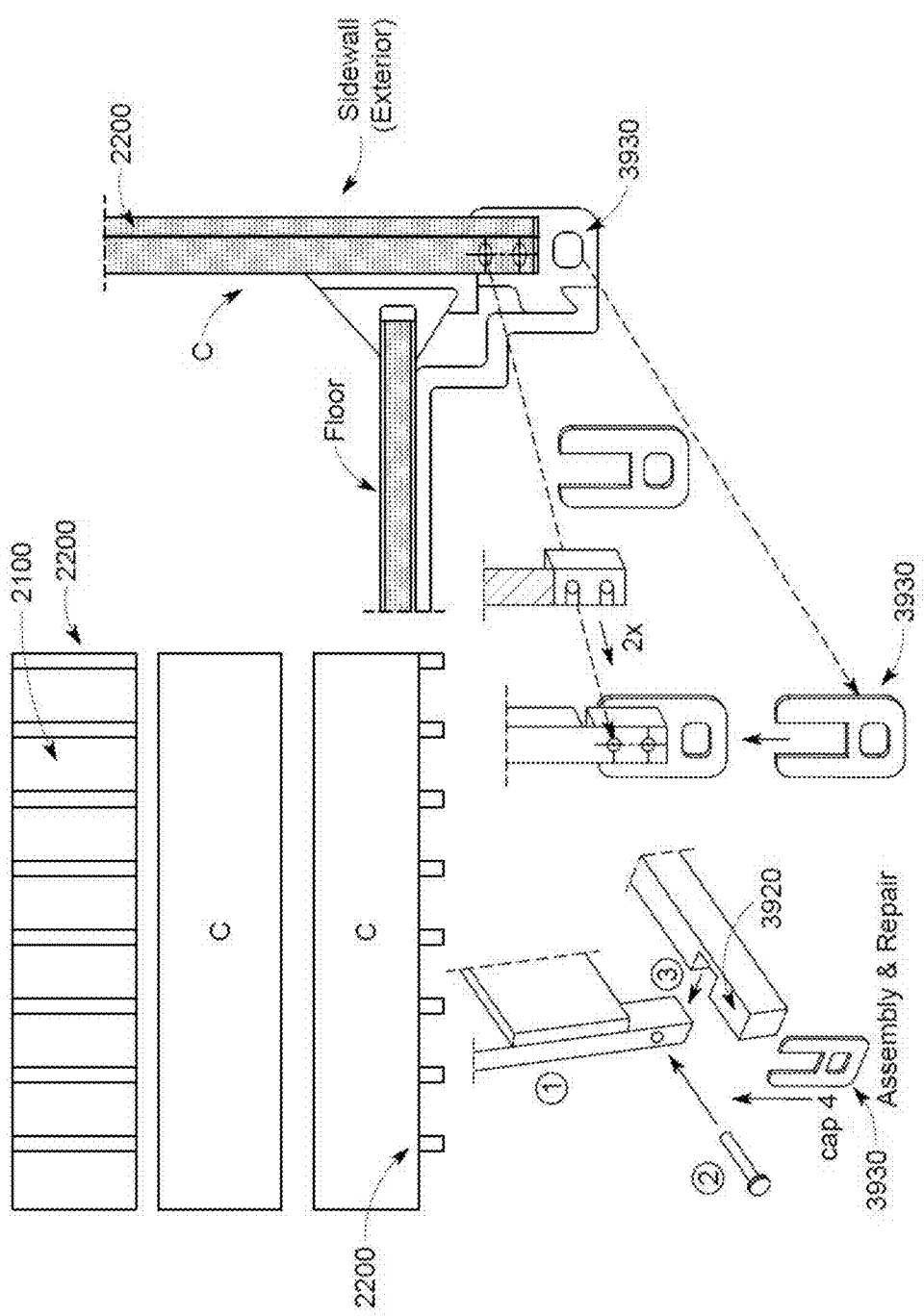

In accordance with another aspect of the disclosure, the vehicle body can be designed and formed for ease of assembly of the various components, as well as providing access points for subsequent service/repair during the lifecycle of the vehicle. FIG. 39 depicts a pultruded vehicle side including repeating core 2100 and reinforcements 2200, as described above, and an overlying panel "C", as shown. Select portions (e.g. bottoms) of panel "C" (and optionally core 2100) can be removed (e.g. cut out) to expose the bottom portion of the reinforcement pillars 2200, as shown. This exposed area can be used to assemble a lower sidewall wall and/or vehicle bottom/floor using either adhesives or fasteners that can be oriented parallel, or perpendicular, to the centerline of the vehicle. Additionally or alternatively, the exposed pillars can be used to assemble to a chassis. The exterior B may be added or remain off and assembled later. A lower matting "castle wall" mating shape 3920 can then be coupled to the exposed pillars 2200. The castle wall 3920 can include a recess having a complimentary shape to the exposed pillar to facilitate proper placement of the pillar with respect to the castle wall 3920 (e.g. the exposed pillar 2200 can be received within the recess). A cap 3930 can then be placed over the union of the (previously exposed) reinforcement pultrusion 2200 bottom and castle wall 3920 to cover the seam and provide an attractive, continuous robust lower edge. Additionally or alternatively, this combination of interlocking components can be used as an access point which can readily be disassembled to facilitate repair or replacement of internal vehicle components.

Figure 40:
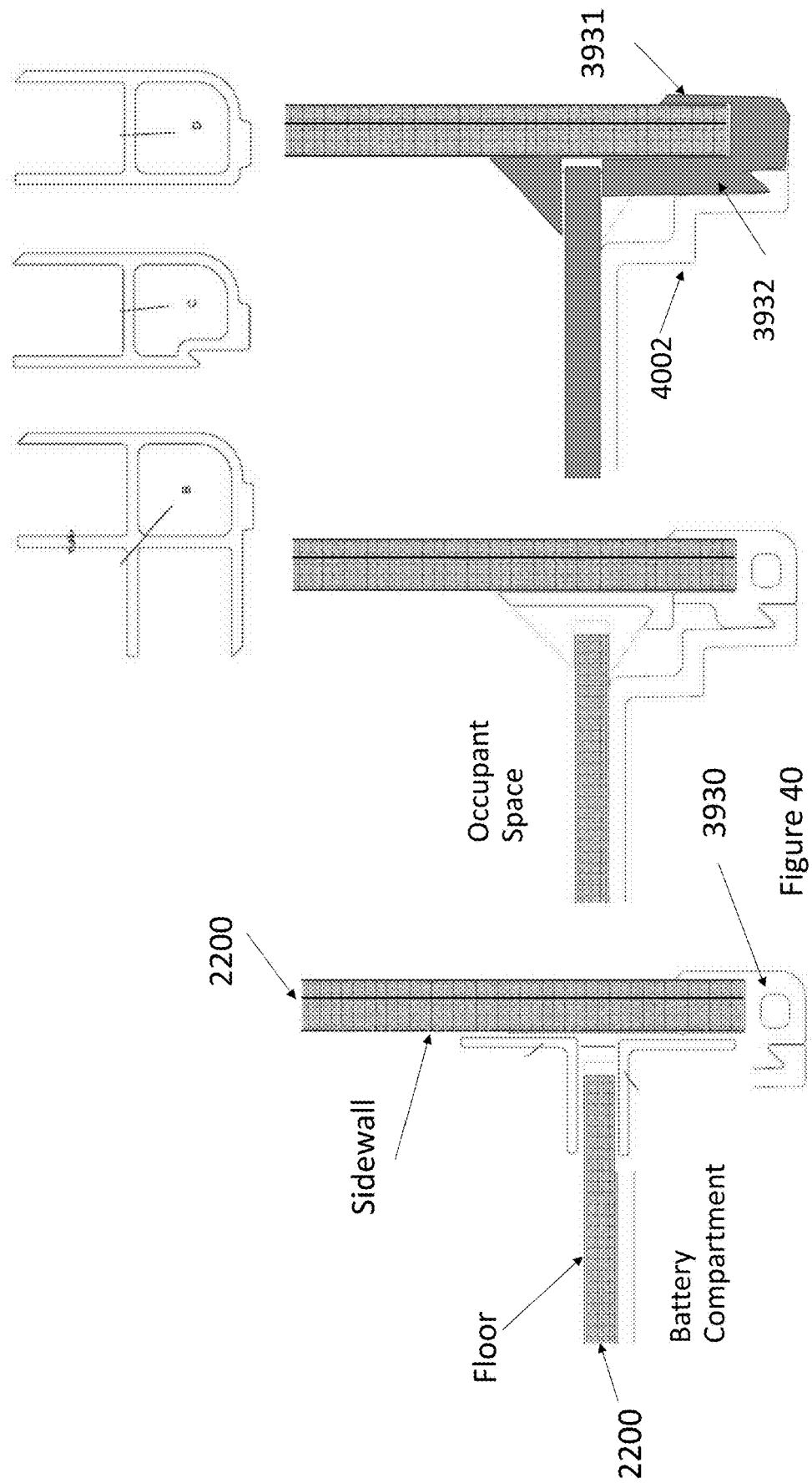

FIG. 40 illustrates a variety of caps, and floor-wall union geometries that can be employed in accordance with the present disclosure. For example, the cap can be formed as a trap edge and surface of the pultruded panel (e.g. wall) such that the cap surrounds the exposed edges and extends up a portion of the sidewall. In some embodiments, the portion of cap 3931 on the outer surface of the vehicle can extend up the sidewall a distance sufficient to provide protection from roadway debris that may hit the vehicle walls during transit. Additionally or alternatively, these components can be formed with planar or tapered edges to fit in the pultruded lower corner of the vehicle, and/or roof. A battery tray 4002 can be formed to couple with the cap 3930, e.g. the batter tray 4002 can have an upwardly facing hook that receives a complimentary shaped downwardly facing hook of the cap 3932, as shown on the right hand side of FIG. 40. Thus these components are discrete members that can be removably coupled to form an assembled vehicle, and detached to permit access for repair/service as desired.

Figure 41:
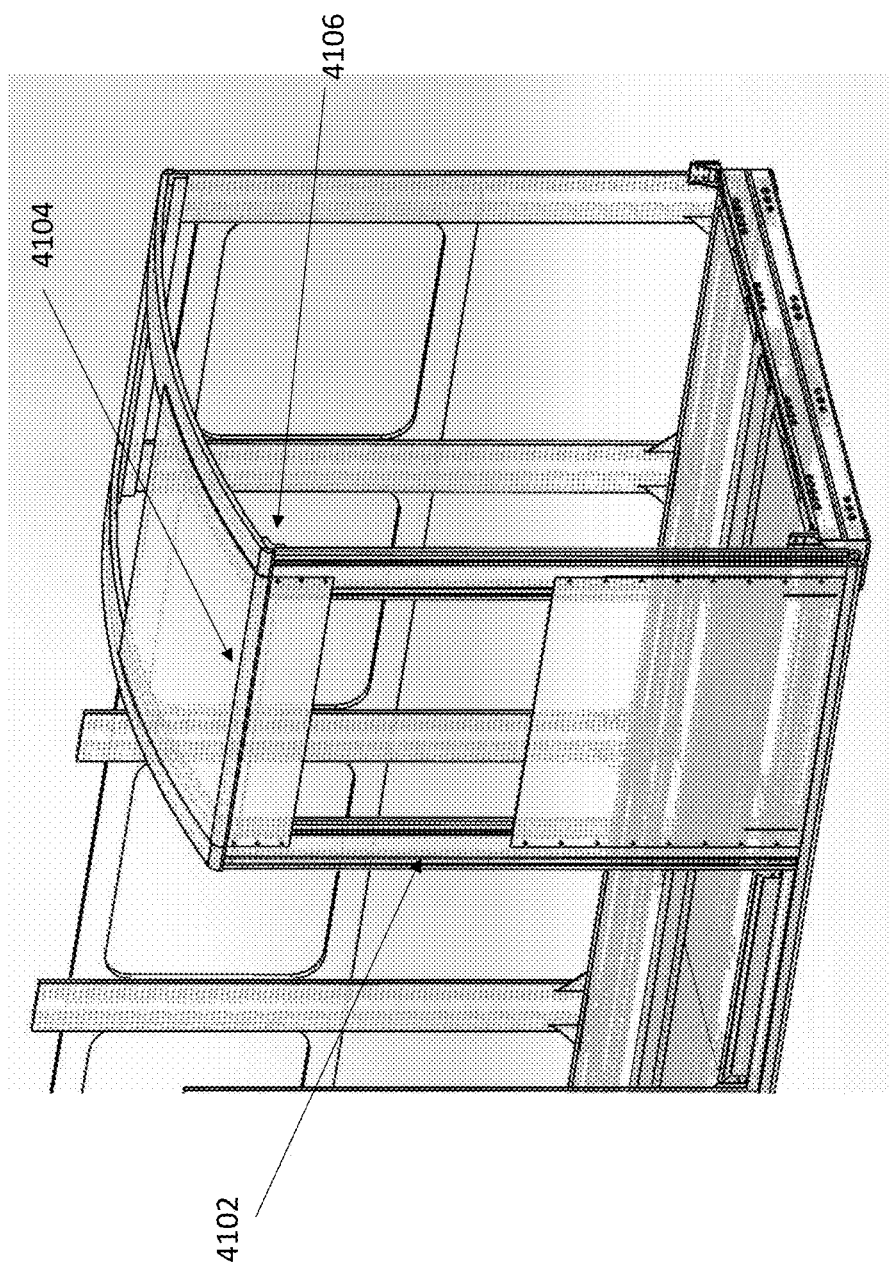

FIG. 41 illustrates another aspect of the disclosure in which a stick-built concept can be employed, wherein pillar 4102 and ribs 4104 are joined through a corner section 4106 which is the load carrying element. Additionally or alternatively, the side panel can be attached through mechanical fasteners (e.g. rivets). Additionally, the components can be configured with complimentary/interlocking geometries that serve as a self-locating design (e.g. each panel only has one acceptable installation location/orientation, which can be recognized by the edge profile or other indicia) which facilitates side panel assembly.

Figure 42:
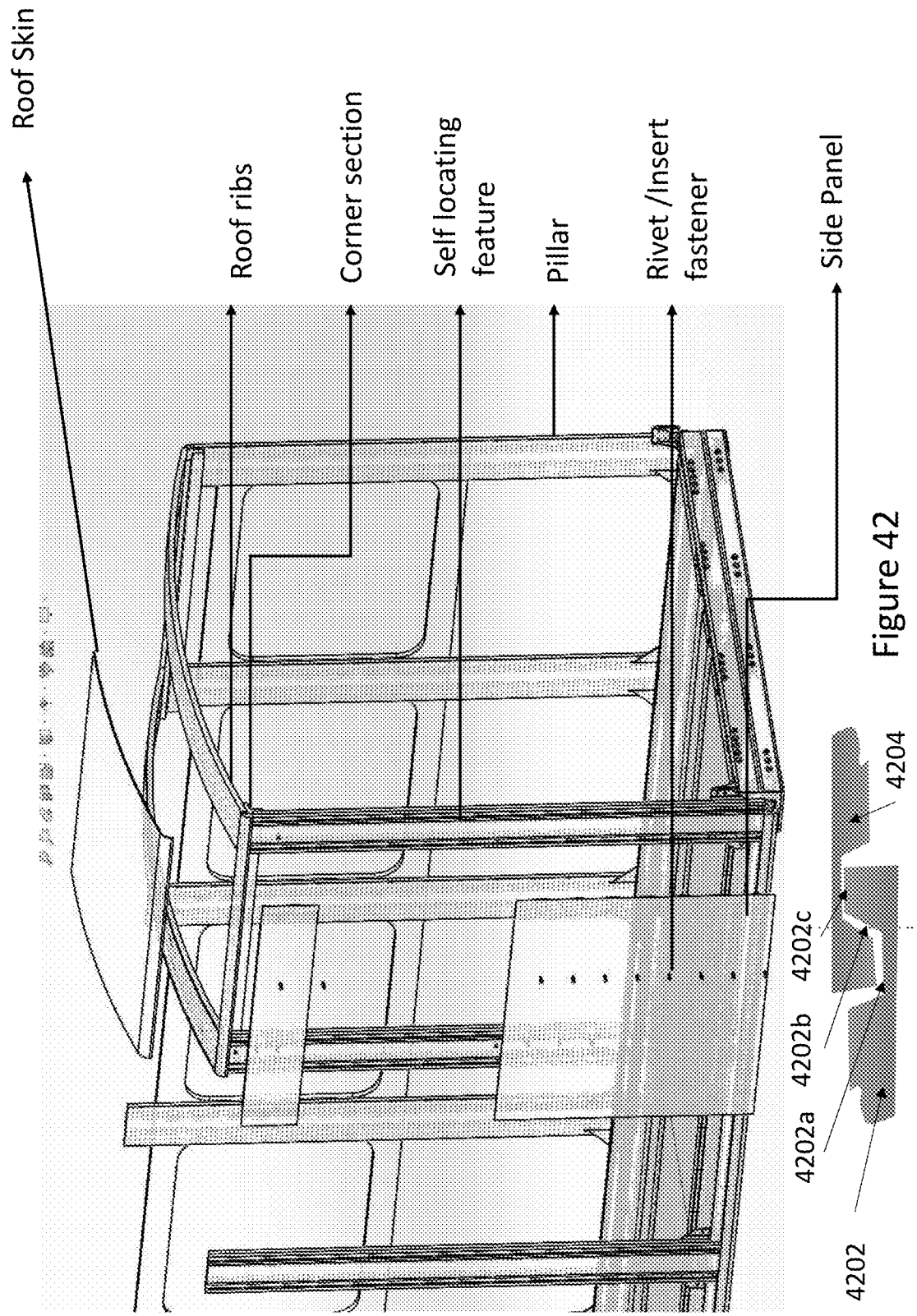

An example of the self-locating feature is shown in FIG. 42, where the upper part 4202 includes a plurality (e.g. three) of facets 42*a-c* having planar walls that are sized to matingly engage complimentary facets of the lower part 4202. Thus, the self-locating design provides an interlocking geometry that, due to the multiple planar facets, distributes load over a greater surface area and thereby increases load bearing capabilities of the vehicle.

Figure 43:
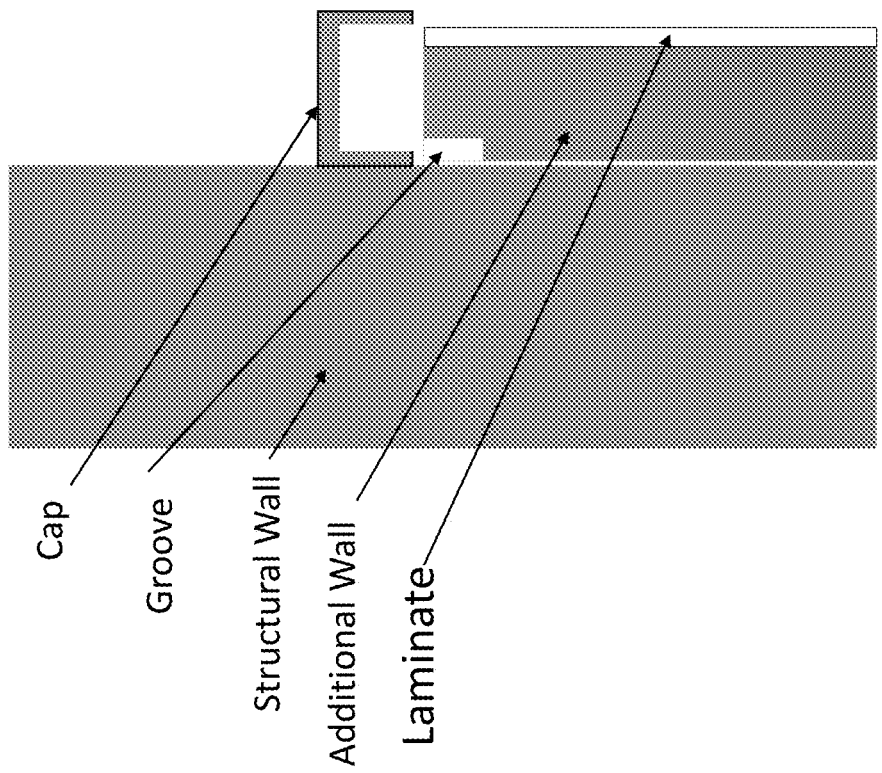

In accordance with another aspect of the disclosure, a window treatment can be included wherein in order to coat with Class A ultraviolet light stable material protection, a laminate can be added—an exemplary embodiment of which is shown in FIG. 43. To capture the edge at the relief window ledge, an additional wall can be joined to the structural wall (which contains the pultruded reinforcements 2200 described above), with a laminate disposed on the exterior surface thereof. A groove, or notch, can be formed on the upper edge of the additional wall at the side proximate to the structural wall, as shown. A cap can then be attached with its inner leg residing within the groove, and the top of the cap covering the ledge of the additional wall, as shown. This additional wall is added to accommodate the window pane, and can be replaced without requiring a new structural wall.

Figure 44:
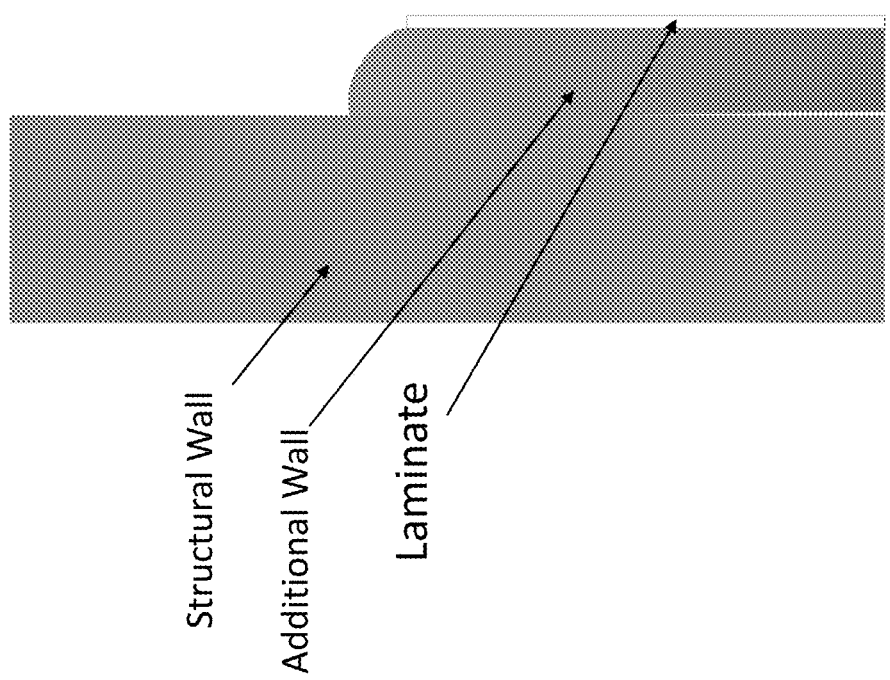

As shown in FIG. 44, the top edge of the additional wall can be chamfered or rounded to provide a bezel lip. This provides a contoured wall shape that may be desired for aesthetics e.g., a window relief, which overcomes the drawbacks of conventional techniques for forming shaped wall sections-expense and tooling lead time is prohibitive. Furthermore, it can be difficult to impart the reinforcing effect of the skin on the inserted reinforcing pillar using conventional techniques. Also, commercial passenger vehicle are damaged from road hazards and minor accidents on the outside surfaces of a vehicle, requiring service/repair and subsequent safety checks which can be expensive and time-consuming.

In some embodiments, a rectangular pultrusion tool/die can be used for the main (planar) part of wall and the contoured shape added by layering of material to create a tailored/tapered construction. This allows the pultruded reinforcement(s) to be strategically placed in the pultruded skin, e.g., along the top and bottom of the window.

To better address this need, an added cosmetic non-structural surface can be attached to the structural side body. This additional outer panel is cost-effective and easy to install. Having damage on the outside non-structural surface may be easily serviced by repairing or replacing. Depending on the attachment method the structure underneath is protected, can be inspected.

Figure 45:
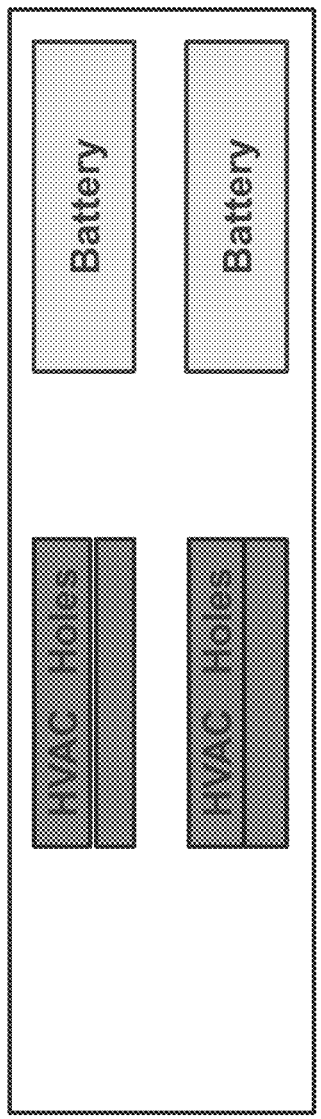

In accordance with yet another aspect of the disclosure, the roof can be designed to accommodate various components of the vehicle, such as the Heating Venting and Air Conditioning (HVAC) unit(s), and auxiliary batteries (each of which can weigh approximately 600 kg), as shown in FIG. 45.

Figure 46:
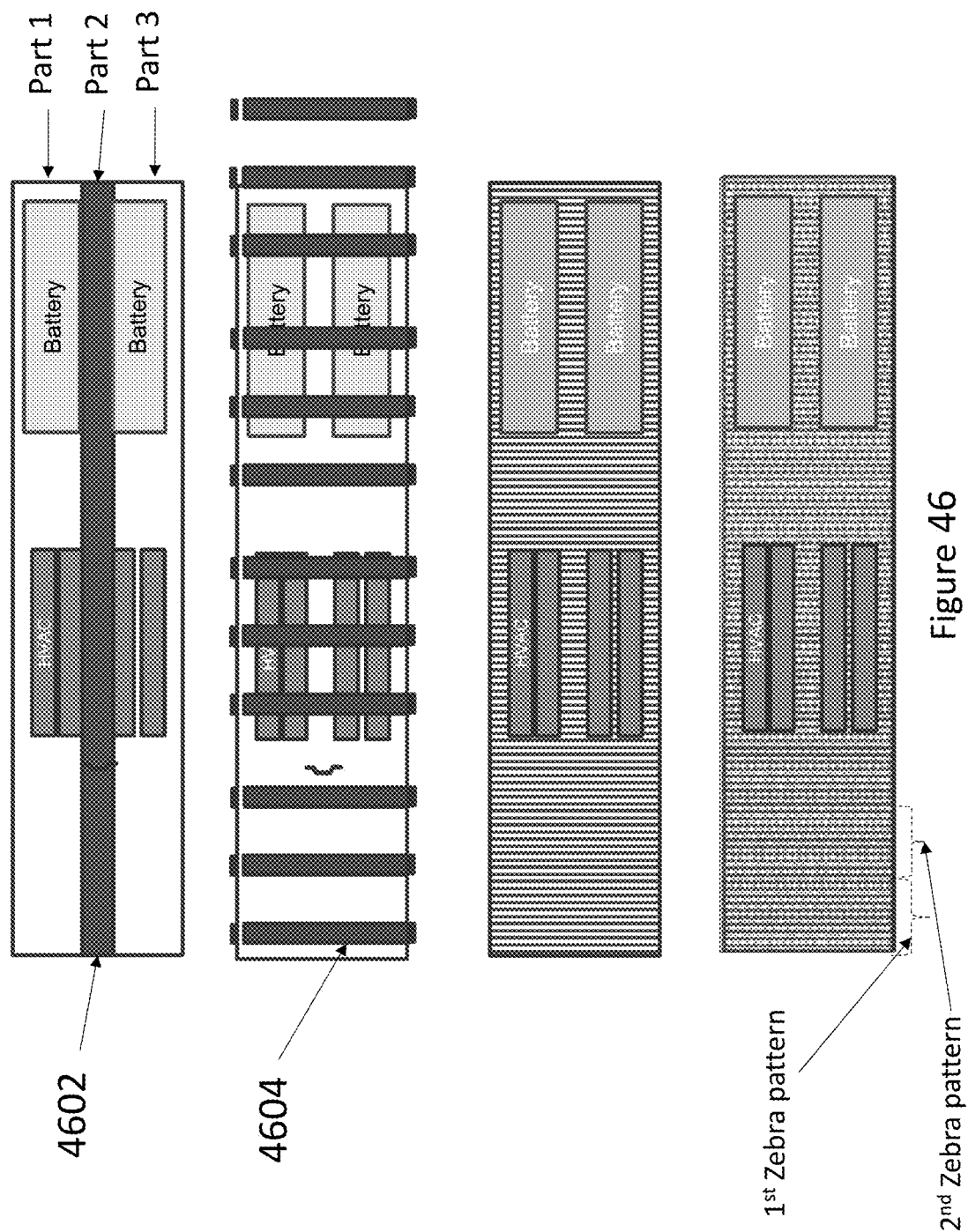

In the exemplary embodiment shown in FIG. 46, the roof is configured as a three (3) part design having a carbon reinforcement 4602 positioned in the middle and extending along the length of the roof, as shown. The holes or openings for the HVAC and batteries are positioned on both sides of the carbon reinforcement. While the relative positioning of the components can vary with vehicle dimensions, the exemplary embodiment shown depicts a configuration for a six foot arched roof. Alternative heights, e.g., eight foot (single) arch is also within the scope of the present disclosure.

Additional reinforcing members 4604 can be positioned perpendicularly to the carbon reinforcement 4602 and extend the length of the roof. In the exemplary embodiment shown, these reinforcement members 4602 are disposed in subsets of three uniformly spaced members, which repeat along the length of the roof, with each subset spaced a distance greater than the space between members of any one subset. However, alterative spacing can be employed as desired to impart the degree of rigidity desired for the particular vehicle requirements. Also shown in FIG. 46, a "zebra" strip or pattern of alternating reinforcing fabric is incorporated and woven perpendicularly to the pultrusion direction.

Figure 47:
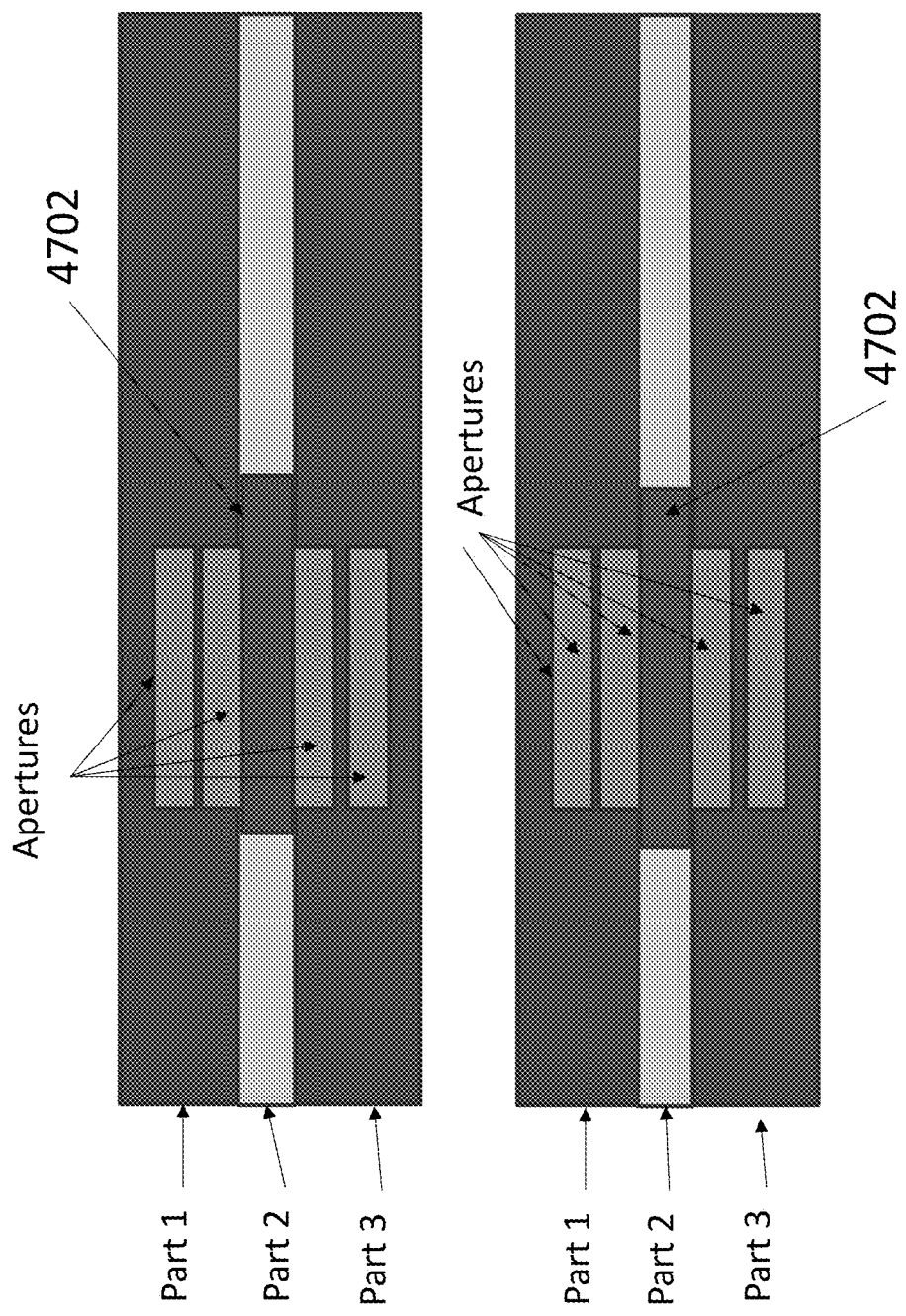

FIG. 47 illustrates an exemplary embodiment of a the three-part roof design, where each part is pultruded and the left (part 3) and right (part 1) sides are mirror images, rotated 180 degrees and joined in the middle, as described above. Also, in this exemplary embodiment, the left and right sides are of equivalent size. The second/middle part can include a carbon reinforcement section 4702 incorporated therein. For example, some or all of a section (e.g. middle) of the second part can be cut and spliced with the carbon reinforcement 4702. Also, carbon is named here for purpose of illustration and not limitation as other materials can be employed.

Figure 48:
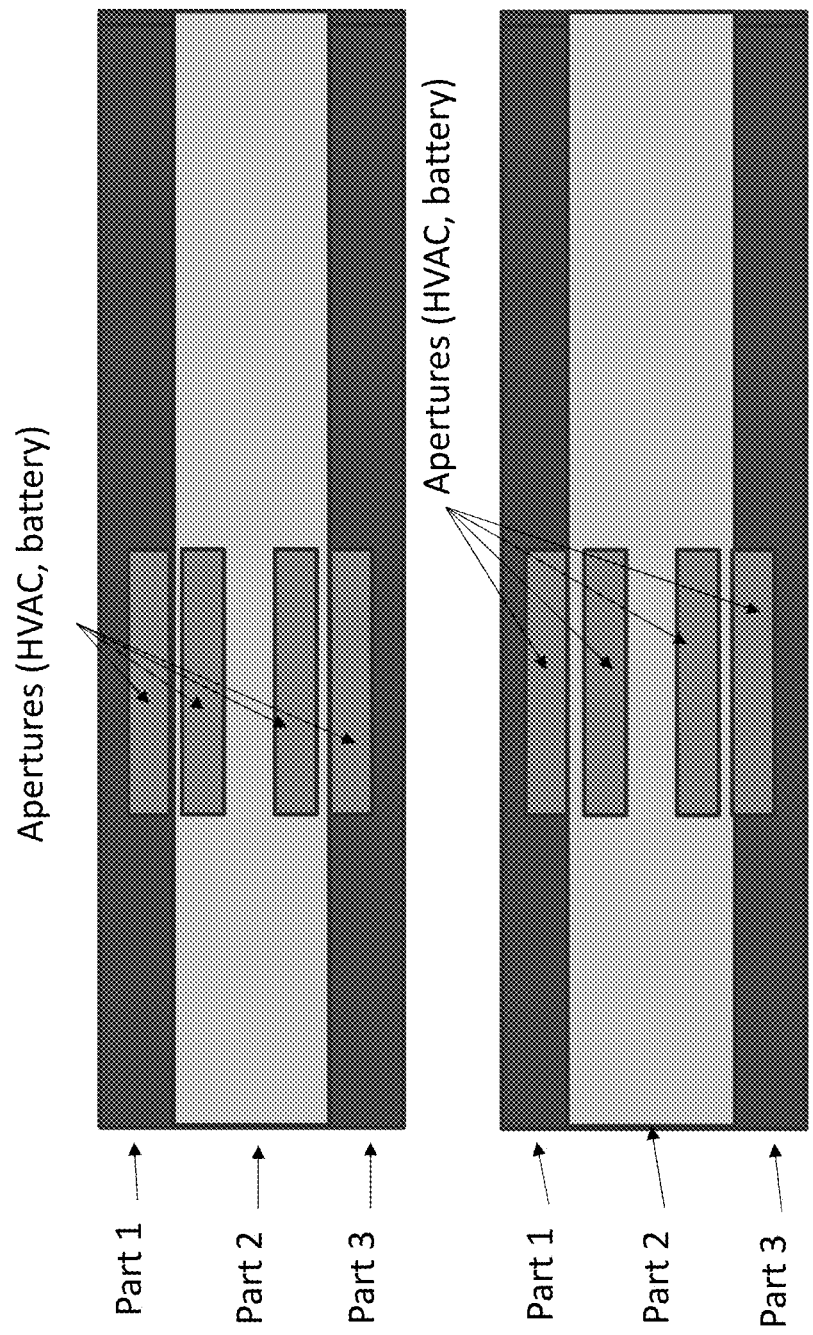

The exemplary embedment in FIG. 48, is similar to the embodiment shown in FIG. 47, but with the relative size of the second part is larger, such that two of the apertures (for HVAC, batteries, etc.) are located within the second part (in the FIG. 47 embodiment all apertures were in the first and third parts).

Figure 49:
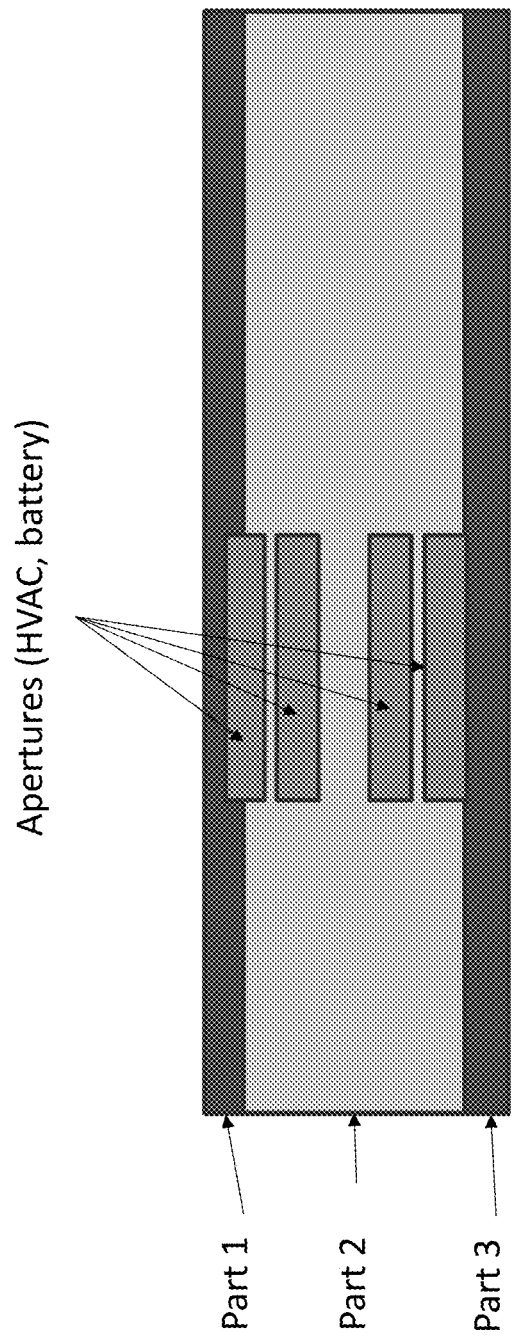

The exemplary embedment in FIG. 49, is similar to the embodiment shown in FIG. 48, but with the relative size of the second part is larger still, such that all apertures (for HVAC, batteries, etc.) are located within the second part. This embodiment can be employed for a six foot arch roof design having a one foot corner section at the sidewall(s).

Figure 50:
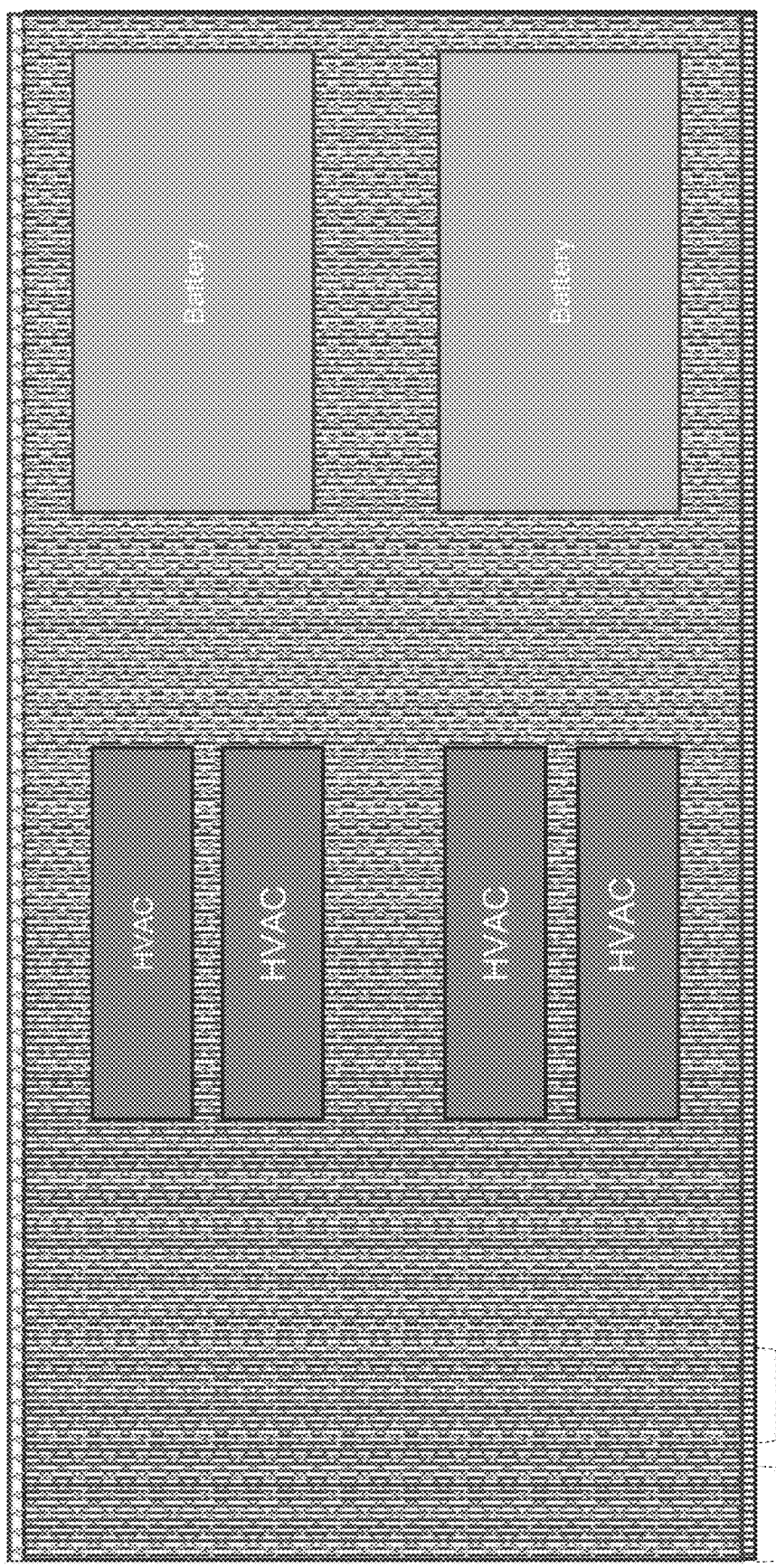

The exemplary embodiment in FIG. 50 depicts an alternating pattern, or "zebra" striping, of reinforcements that are woven at an orientation that is perpendicular to the pultrusion direction. This embodiment can also include the central reinforcing (e.g. carbon) strip, as described in connection with FIGS. 47-49. A variety of configurations can be employed, e.g. a 56' spacing throughout the pultruded part to facilitate alignment.

Tapping Plate

Figure 51:
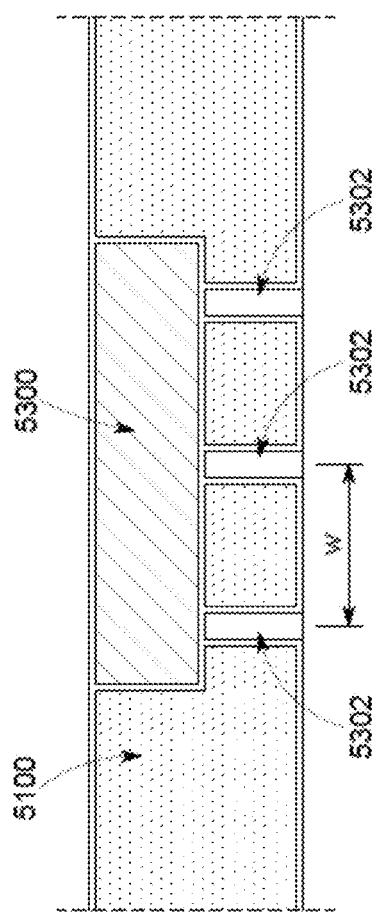

In accordance with yet another aspect of the disclosure, a reinforcing plate can be incorporated into the pultruded component. In the exemplary embodiment shown in FIGS. 51-53, a rigid tapping plate 5300 can be included within the core 5100. The tapping plate 5300 can be sandwiched between the outer skins, and nested within a complimentary shaped recess within the core, as shown in FIG. 51. The tapping plate can be formed of metal or any other suitably rigid material (e.g. glass wound polyurethane, etc.); metallic tapping plates can be advantageous in that they can serve as conductors of heat during the pultrusion process. Extending below the tapping plate 5300 are rigid (e.g. metal) pins 5302 which extend from the bottom surface of the tapping plate to the opposing side of the foam core 5100 (the pins can remain within the foam core and under the skin, or alternatively penetrate through the skin).

Figure 52:
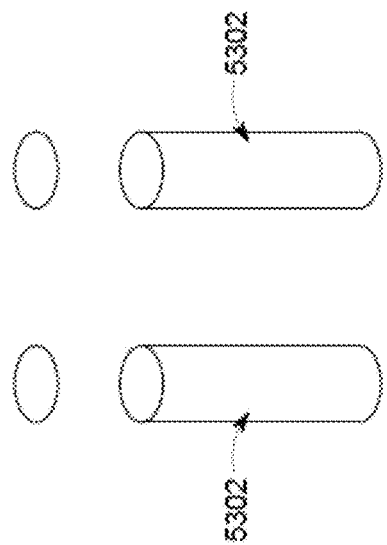
FIGS. 51-55 are exemplary embodiments of additional pultrusion, and reinforcement incorporating, techniques in accordance with the present disclosure.

The tapping plate 5300 and pins 5302 serve to reinforce the core and transfer any external load (compressive, tensile, shear, and/or torsional) applied thereto without deforming the surrounding core material 5100. In the embodiment shown, three pins 5302 are employed an each equidistantly spaded a distance "w" apart. Also, the pins are shown to be cylindrical (as shown in FIG. 52 which depicts a top view of the pins showing the circular surface area, and a front view showing the side of the cylinder.) However, alternative number/sizes of pins can be employed as desired, and the pins can be clustered as needed to provide the requisite degree of rigidity and load capacity to prevent foam core damage.

Although the pins 5302 are shown at right angles or perpendicular to the tapping plate 5300, the pins can be oriented at varying angles as desired. Also, the pins 5302 can be used in isolation (i.e. in embodiments in which no tapping plate is included) and transfer any force directly through the component. Moreover, in some embodiments the tapping plate 5300 can be bored (e.g. drilled) to form apertures or recesses for receiving (e.g. threaded coupling) the pins 5302. In some embodiments the tapping plate can include sensors, e.g., for detecting moisture and temperature of the body panel and able to send a reading or alarm if a threshold value is exceeded. Also, the sensors can be proximity sensors or motion detection sensors which, e.g. detect hand gestures of external passenger wishing to open the doors to board a bus, and are in electrical communication with a motor and gear for operating the vehicle doors.

Figures 53, 54:
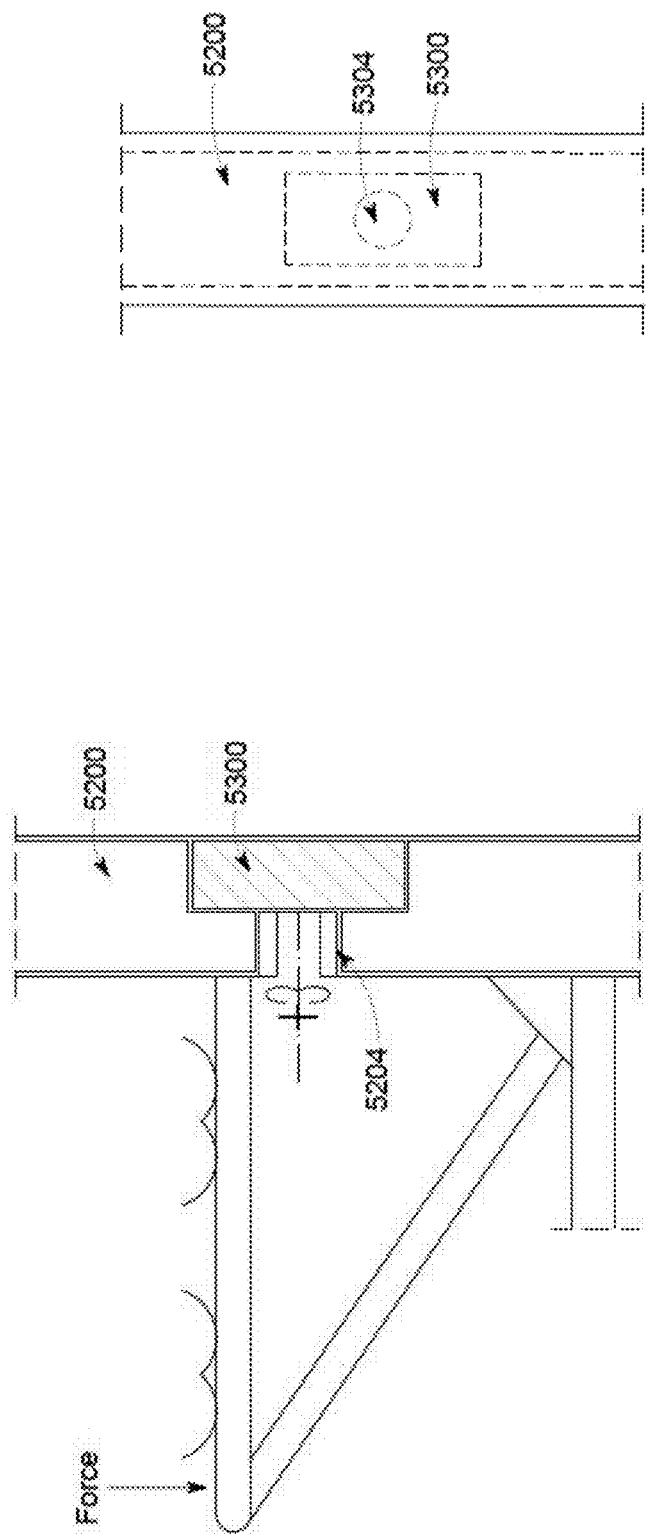

Additionally or alternatively, the tapping plate can be located within the pultruded pillars 5200 described herein, as shown in FIG. 53-54. Similar to the core-embedded tapping plate embodiment described above, the reinforcing tapping plate can be configured to absorb impact from external forces applied to the pultruded pillars 5200. In the exemplary embodiment shown in FIGS. 53-54, a force F (e.g. approximately 150 Kg) is applied to an edge of a structure (e.g. seat, shown here in cross-sectional view) spaced from the tapping plate 5300, with the seat having a reinforcing bracket buttressed to the floor. The force F creates a moment or rotational force exerted on the seat, which is transferred to the rigid tapping plate 5300 through bushings 5304. In some embodiments the bushings allow for some displacement (e.g. telescoping bushings) of the seat from the tapping plate 5300.

Figure 55:
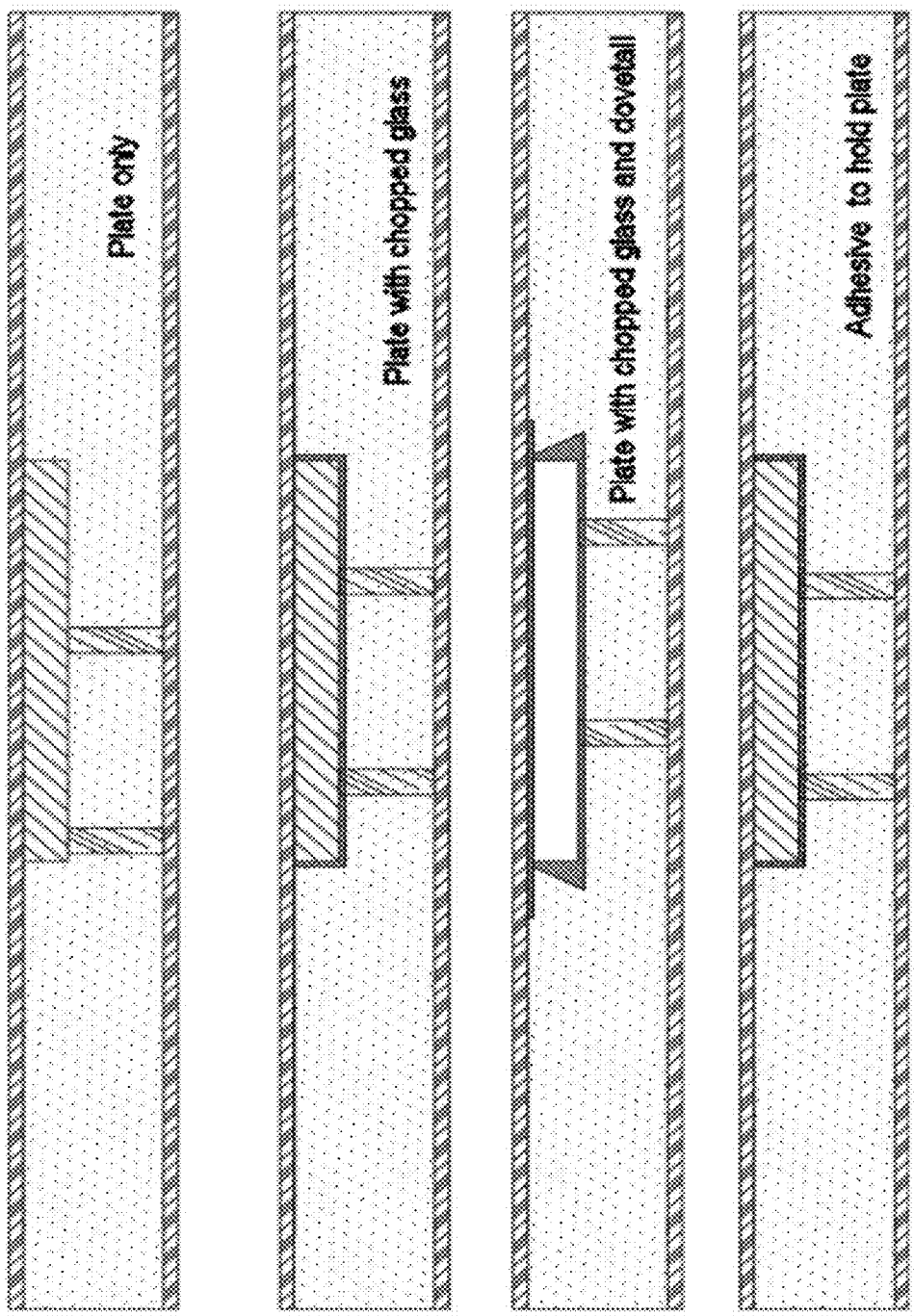

FIG. 55 depicts additional exemplary embodiments of a reinforcing tapping plate within a foam core. The pins can be pultruded in advance and then inserted within the foam core. Various other materials and bonding techniques can be employed to enhance the bond of the tapping plate within the core, and thus increase rigidity. For example, chopped glass can be included and distributed around the surface of the tapping plate that engages the foam core to increase surface area friction between the plate and core. Furthermore, the tapping plage can be formed with dovetail design to increase engagement with the core material. Also, an adhesive can be applied between the tapping plate and core material to include a chemical bond in addition to a mechanical bond. Although rectangular tapping plates are illustrated in the exemplary embodiments, alternative shapes/sizes can be employed as desired.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A method of forming a composite vehicle component comprising:
   pultruding a plurality of reinforcement structures, each reinforcement structure having opposing inner and outer surfaces defining a thickness therebetween, each reinforcement structure having a first edge and an opposing second edge extending between the thickness;
   providing a plurality of core members, each core member having opposing inner and outer surfaces defining a thickness therebetween, each core member having a first edge and an opposing second edge extending between the thickness, wherein the plurality of core members includes foam;
   positioning each core member of the plurality of core members between adjacent reinforcement structures, interlocking a first edge of a reinforcement structure with a first edge of a core member;
   displacing the interlocked core members and reinforcement structures simultaneously; and
   pultruding the interlocked reinforcement structures and core members together to apply an inner skin layer onto the inner layers of the reinforcement structures and core members, and an outer skin layer onto the outer layers of the reinforcement structures and core members.

2. The method of claim 1, further comprising forming an opening in at least one of the inner skin layer and outer skin layer, wherein the opening is positioned between adjacent reinforcement structures.

3. The method of claim 1, wherein at least one of the plurality of core members includes a window formed therein.

4. The method of claim 3, wherein the window includes a sacrificial coating disposed on at least one of the inner or outer surfaces, the sacrificial coating facilitating removal of at least one of the inner skin or outer skin layers of pultruded material.

5. The method of claim 1, wherein at least one of the reinforcement structures is hollow.

6. The method of claim 1, wherein at least one reinforcement structure is disposed parallel to at least one core member.

7. The method of claim 1, wherein at least one reinforcement structure is disposed perpendicular to at least one core member.

8. The method of claim 1, wherein at least one of the reinforcement structures is rectangular.

9. The method of claim 1, wherein the vehicle component has a non-planar profile.

10. The method of claim 1, wherein the vehicle component is a sidewall of a bus, formed as an integral component from a front location proximal to a front wheel of the bus to a location distal of a rear wheel well of the bus.

11. A method of forming a composite vehicle component comprising:
    pultruding a plurality of reinforcement structures, each reinforcement structure having opposing inner and outer surfaces defining a thickness therebetween;
    providing a plurality of core members, each core member having opposing inner and outer surfaces defining a thickness therebetween, wherein at least one of the plurality of core members includes a transparent window;
    positioning a core member with the transparent window between adjacent reinforcement structures;
    pultruding the reinforcement structures and core members together to apply an inner skin layer onto the inner layers of the reinforcement structures and core members and an outer skin layer onto the outer layers of the reinforcement structures and core members; and
    removing at least a portion of at least one of the pultruded inner skin layer or outer skin layer from the transparent window.

12. The method of claim 11, wherein transparent window is made of plastic.

13. The method of claim 11, further comprising:
    pultruding a first set of reinforcement structures and core members together to form a first composite vehicle panel;
    pultruding a second set of reinforcement structures and core members together to form a second composite vehicle panel;
    forming a connector, the connector having a first pair of sidewalls defining a first channel and a second pair of sidewalls defining second channel;
    inserting the first composite panel in the first channel of the connector; and
    inserting the second composite panel in the second channel of the connector.

14. The method of claim 13, wherein the first channel of the connector is oriented perpendicular to the second channel of the connector.

15. The method of claim 13, wherein forming the connector includes forming a third pair of sidewalls defining a third channel and a fourth pair of sidewalls defining a fourth channel, each of the first, second, third and fourth channels of the connector are orthogonal to each other.

16. The method of claim 13, wherein at least the first composite panel is releasably coupled to the connector.

17. The method of claim 13, wherein the connector includes a closed cell between the first and second composite panels.

18. The method of claim 13, further comprising dispensing adhesive through at least one aperture disposed within at least one of the sidewalls of the first channel, the adhesive dispensed after the first panel is inserted to engage the inner edge of the connector channel.

19. The method of claim 16, wherein at least one of the first and second channels of the connector includes an inner edge extending between the sidewalls.

20. The method of claim 19, wherein the first panel is inserted until an edge of the first panel engages the inner edge of the connector channel.

\* \* \* \* \*